United States Patent

Dellheim

[15] 3,707,725

[45] Dec. 26, 1972

[54] PROGRAM EXECUTION TRACING SYSTEM IMPROVEMENTS

[72] Inventor: John L. Dellheim, Poughkeepsie, N.Y.

[73] Assignee: International Business Machines Corporation, Armonk, N.Y.

[22] Filed: June 19, 1970

[21] Appl. No.: 47,705

[52] U.S. Cl. ..............................444/1,340/172.5

[51] Int. Cl. ..........................G06f 11/04, G05b 17/02 G06f/9/18

[58] Field of Search ........340/172.5, 146.1; 235/153; 444/1

[56] References Cited

UNITED STATES PATENTS

| | | | |
|---|---|---|---|
| 3,213,427 | 10/1965 | Schmitt et al. | 340/172.5 |
| 3,286,239 | 11/1966 | Thompson et al. | 340/172.5 |
| 3,343,141 | 9/1967 | Hackl | 340/172.5 |
| 3,348,211 | 10/1967 | Ghiron | 340/172.5 |
| 3,366,929 | 1/1968 | Mullery et al. | 340/172.5 |
| 3,415,981 | 12/1968 | Smith et al. | 235/153 |
| 3,509,541 | 4/1970 | Gordon | 340/172.5 |
| 3,518,413 | 6/1970 | Holtey | 235/153 |
| 3,548,384 | 12/1970 | Barton et al. | 340/172.5 |
| 3,551,659 | 12/1970 | Forsythe | 235/153 |

*Primary Examiner*—Paul J. Henon
*Assistant Examiner*—Jan E. Rhoads
*Attorney*—Hanifin and Jancin and Bernard M. Goldman

[57] ABSTRACT

A tracing program ethod that copies into an area within a tracing program each instruction to be executed and traced in a manner which makes each traced instruction subservient to the tracing program. A hardware instruction counter of the computer system addresses the tracing program, rather than the program being traced. A programmed instruction counter controlled by the tracing program maintains the address within the traced program of its next instruction to be executed and traced. While being traced, the traced program is effectively executing its data using the same instruction sequence that it would use on the same data as if the tracing program was not in the system and as if the traced program was alone operating on its data.

The tracing method can control the entire computer system while tracing the programs that are being executed by the system. The tracing method can wholly or partially trace a program by sampling it over a cycle determined by time or by instruction count, or by an overriding manual control. When not tracing, the tracing program can go into a quiescence state, therein it retains control of the system in preparation for later tracing, but permits a speedup in the execution of subservient instructions.

The tracing method requires neither machine interrupts, nor modifications to the hardware or to the traced program code, for control of the computer system.

The tracing m thod provides data for each traced instruction in a form that can be subsequently analyzed by a disclosed trace analysis program so that the output from a single run of the tracing method can be used any number of times for varying types of analyses.

12 Claims, 32 Drawing Figures

INVENTOR
JOHN L. DELLHEIM

BY Bernard M. Goldman
ATTORNEY

TRACING OF INSTR.-O COMPLETED

VARIABLE LENGTH TRACED INSTRUCTION RECORD FORMAT
(TRACE RECORD 7D)

VARIABLE BLOCKED OUTPUT RECORD FORMAT

INSTALLATION TAILORING (TIER. 14 CONTINUED)

(TRACED INSTRUCTION EXECUTION ROUTINE CONTINUED)

(POST-EXECUTION TIER CONT.)

FIG. 7D (TIER CONT.)
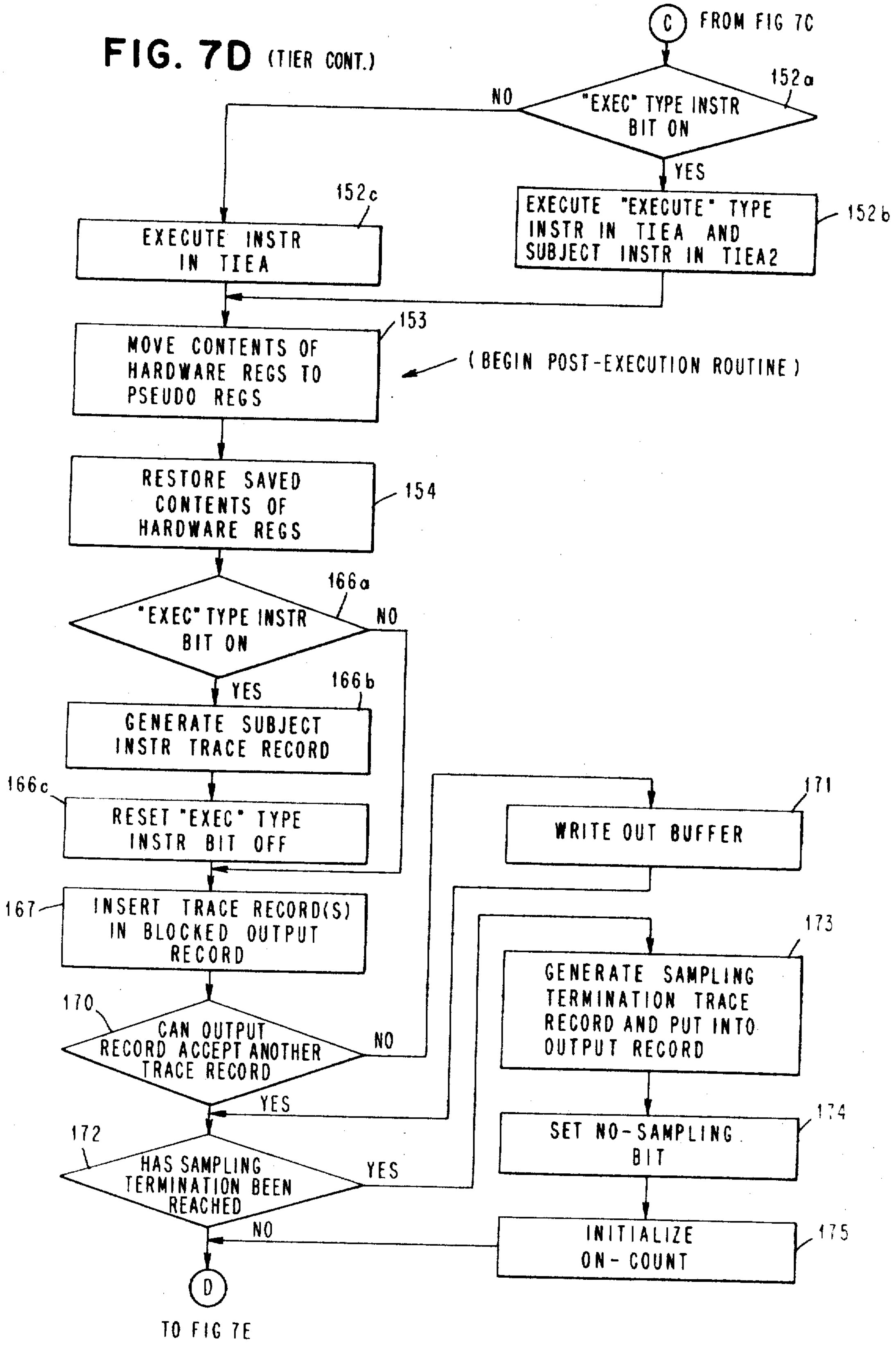

PATENTED DEC 26 1972 3,707,725

SHEET 15 OF 25

PATENTED DEC 26 1972 | 3,707,725

SHEET 16 OF 25

PROGRAM EXECUTION TRACING SYSTEM IMPROVEMENTS

This invention relates generally to computer program tracing methods and systems.

Previously, tracing programs have been known for over a decade in the computer programming arts. Many types of tracing programs are currently available for programs that can operate different types of computing machines. However, the general name, tracing program, covers diverse areas in the examination of computer programs. One tracing program may be strikingly different from another, and each may be useable for a different purpose. Some tracing programs only specialize in a particular type of situation, event, or kind of information. Most prior tracing programs are not user-directed and are not flexible; they can not be tailored to a particular computer installation or to a particular program execution. Termination sampling and tracing initialization could not be user-directed in prior tracing programs without impacting the execution of the program being traced when providing complete and continuing data.

Those prior tracing programs which attempted to generalize out of the specific tracing situation category were either simulation-type tracing programs or modeling-type tracing programs. A simulation-type tracing program assumes the existence of predetermined systems characteristics. A modeling-type tracing program is based on the probabalistic and mathematical deliniations. The prior tracing programs are based on simulation or modeling and not on actual execution, such as the current invention is.

Some prior tracing programs were limited in their tracing function during execution to branch points only, interrupt points only, predetermined sequences of instructions, or other prespecified events.

Prior tracing programs operate relatively at very slow rates; for example, it is common when outputting all traced data for such prior programs to take, on the average, 100 times longer than the untraced execution time. Most prior tracing programs overlay their output areas which they used for buffering to an output device, or they do not use any I/O device, i.e., the results remain in main storage.

Most prior known tracing programs run a separate trace operation for each required analysis; this is avoided by the subject invention.

Prior trace programs are not fully table driven in order to control the execution of the instructions being traced.

Most prior known tracing programs operated at least partially under control of some other program, while in the subject invention, the tracing program totally controls all other programs on the computing system on which it operates.

The primary object of the invention is to trace every executed instruction and interrupt which is performed by any stored program while processing any actual data. The invention has the following objects:

1. To trace the actual executed sequence of instructions in a computer system.

2. To trace the execution of a program without any distortion to the program.

3. To trace the execution of a program without changing or affecting the sequence of execution of the object code in the program.

4. To trace the execution of a program without changing or affecting the source code or object code.

5. To trace the execution of a program without the insertion of any special instructions for the purpose of assisting the tracing.

6. To trace the execution of a program without the insertion of any special source code macro-instruction for the purpose of tracing.

7. To trace the execution of a program without the deletion of any instruction for the purpose of assisting the tracing.

8. To trace the execution of a program without requiring any special interrupts for tracing purposes.

9. To trace without any limitation as to (a) branch points, (b) preselected events, (c) preselected instruction, or (d) preselected sequences of instructions.

10. To trace the execution of a program without requiring any modifications to the hardware in the computer system.

11. To write out tracing data in a unique variable logical record format and a unique variable physical record format while tracing.

12. The invention may be implemented for the instruction set of any computing system.

13. The invention can be used on any computer system without requiring any hardware testing, or measuring devices.

14. Usage of the tracing function can be controlled in the invention by: (1) external operator intervention at any time during execution, (2) tracing program self-initialization, or (3) user-specified cycle based on time or instruction count.

15. The invention separates the analysis of the traced results from the tracing of the executed instruction.

16. The invention may permit a single tracing run through an executed program to collect all required data. The collected data can be subsequently analyzed by an analyzing program in unlimited ways without any need for retracing of the executed program.

17. The invention provides accurate trace data at a faster rate than any known prior tracing program.

18. The invention can provide complete trace data on every executed instruction, including its operation code, its location in storage, its operand addresses, the length of the data processed, interrupt codes and its location relative to the executed instructions, and the point in the execution where the tracing output is switched off.

19. A program implementing the invention can be easily used with little little no operator intervention, little operator training, and little training by the user and interpreter of trace results.

20. The invention can be used to obtain the instruction execution sequences of two independently traced programs, each using the same data. Later comparison of these instruction execution sequences can be made to determine similarity or identity by the later operation of an analyzing program. This comparison can be used to determine prima facia copyright infringement by permitting comparison between the execution sequences of a copyrighted program and an accused infringing program.

21. The invention involves a system which includes an analyzing method which can generate any type of analysis from trace data and as many analyses as are required by only using the output of a single program run.

22. The invention includes an analysis program which can process, analyze, edit and tabulate user-directed data produced by the tracing program subject to varying control parameters. Control parameters may be changed for different analyses of the same traced data without reversion to any other runs of the tracing program.

23. Examples of analyzing program uses are (a) detection of computer-accessing bottlenecks, (b) memory hierarchy studies, (c) datum width analyses, (d) "page" size for optimal memory paging operations, (e) particular memory address usage, (f) instruction (operation code) usage, (g) instruction feature usage, (h) storage involvement, (i) usage of contemplated operation codes, (j) frequency of use of any of (d)–(i), (k) instruction sequence timing evaluations, (l) interrupt detection and analyses, (m) time sequencing of events, (n) instruction set validity (o) fetching analyses, and (p) multiple instruction execution levels.

24. The invention permits a single, one time, execution of a traced program under control of the tracing program to generate an output trace tape (or equivalent other I/O device, such as disk). The output tape may be used any number of times as input to the analysis program without regard to different types of analysis reports required of the traced program, without ever requiring the traced program to again be retraced with the same data.

25. The invention permits plural output reports to be generated concurrently with a single run of the input trace tape.

The foregoing and other objects, features and advantages of the invention will be apparent from the following more particular description of the preferred embodiments of the invention illustrated in the accompanying drawings of which:

Figure 4A:
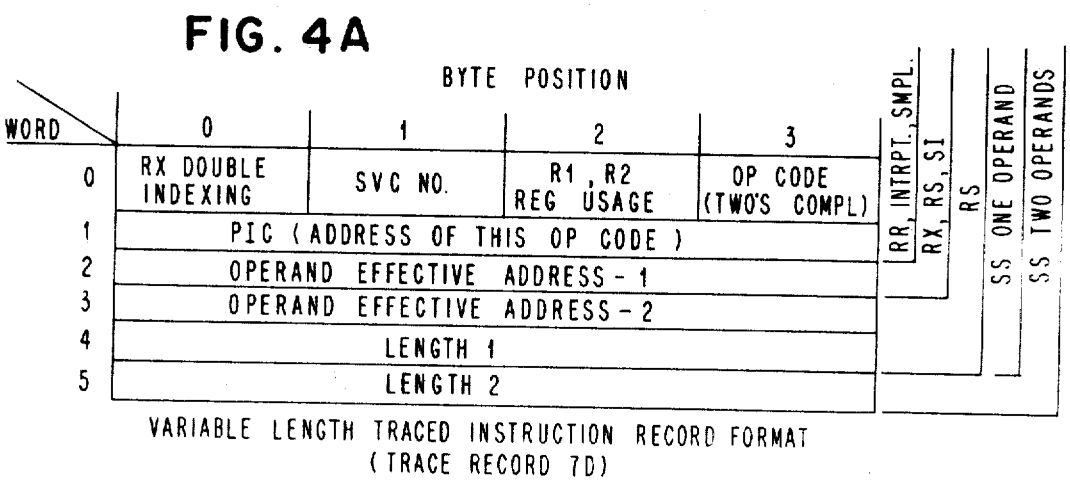
Figure 4B:
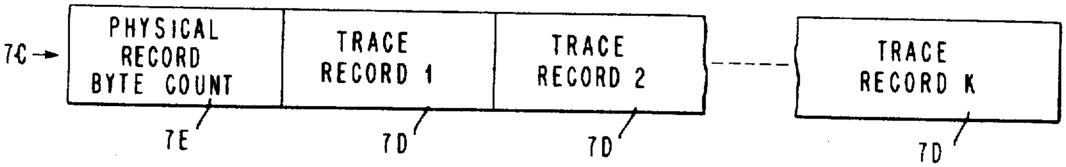
Figure 5:
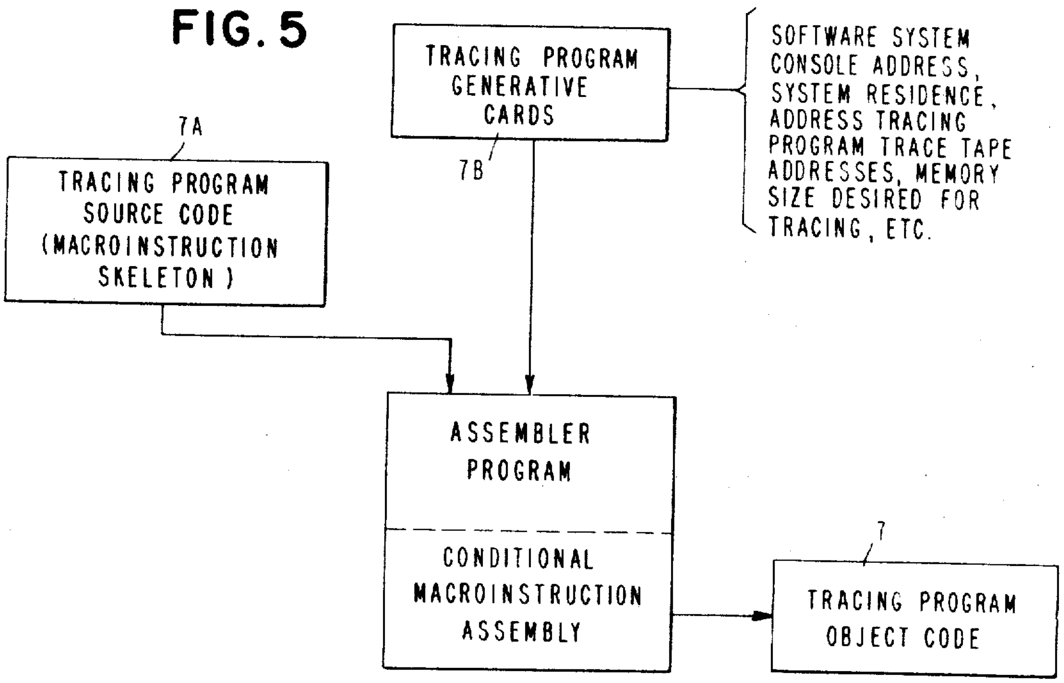
Figure 6:
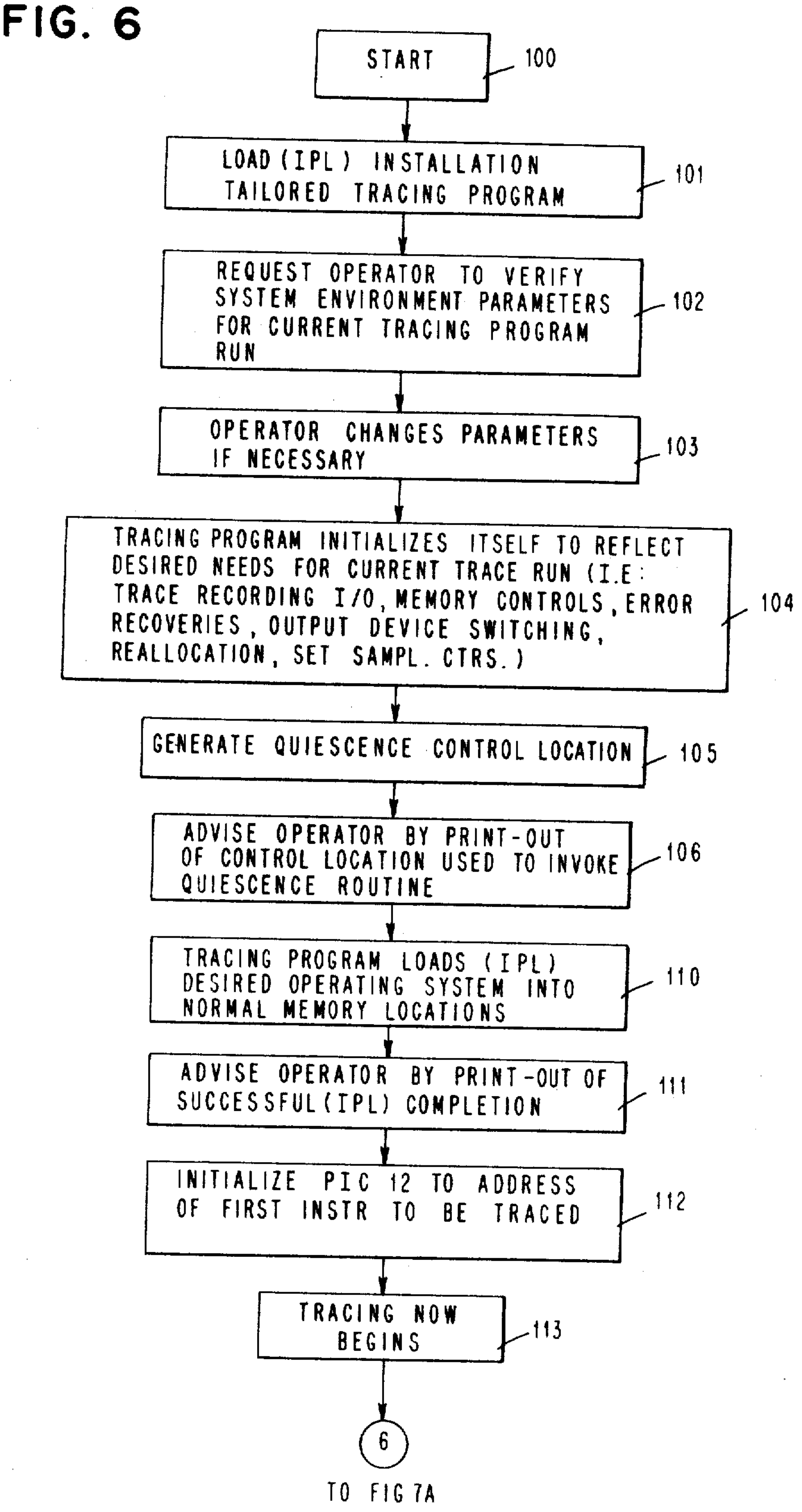
Figure 8:
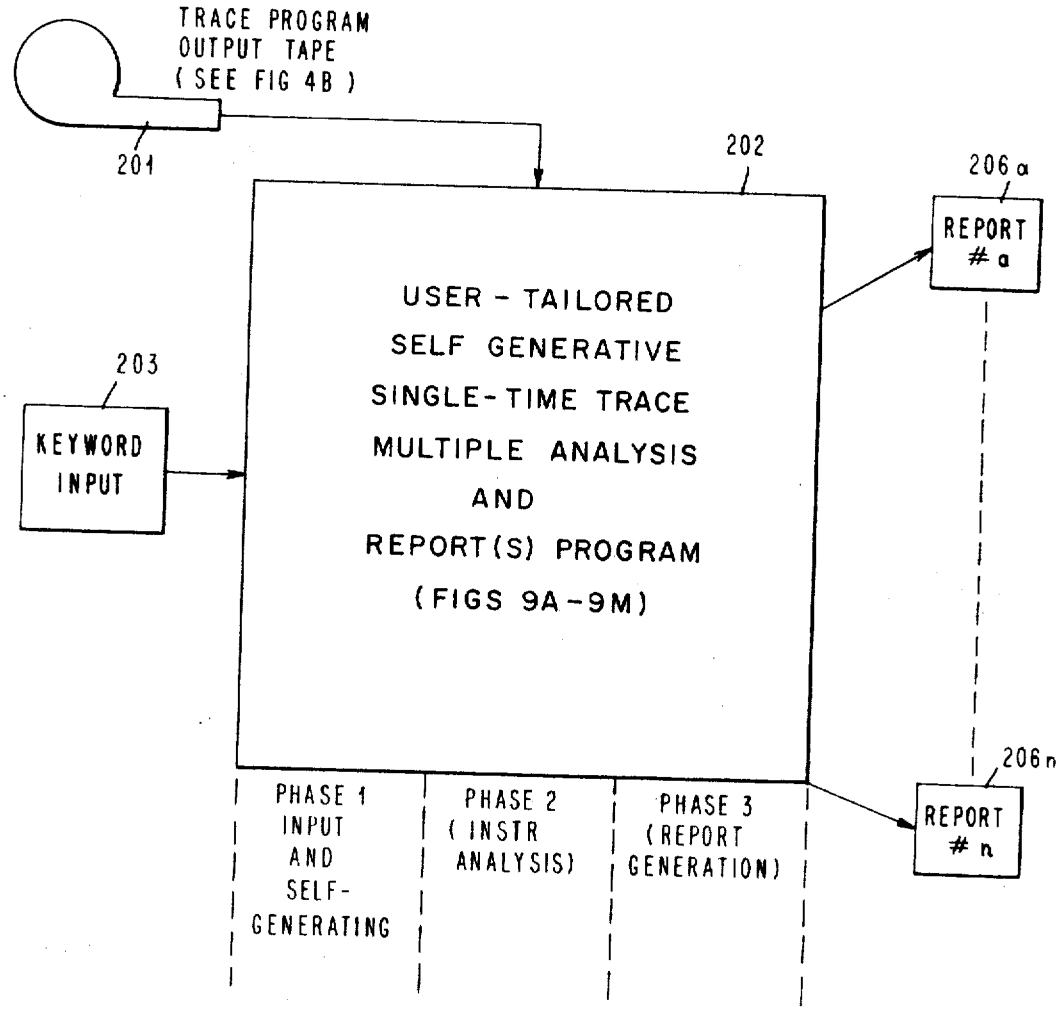

FIGS. 3A–E illustrate sequential states for the main components of the invention while tracing the first two instructions within a program being traced;

FIG. 4A represents the formats available for a trace record, and the type of analysis information contained therein for a particular instruction being traced;

FIG. 4B shows the variable length blocked output record format which contains a plurality of trace records as they might be recorded onto an I/O device;

FIG. 5 represents a method of tailoring a particular tracing program to a particular computer installation;

FIG. 6 shows a method for initializing a particular tracing program for a particular run; and FIGS. 7A–D illustrate flow diagrams for a particular embodiment of the tracing method part of the subject invention;

FIG. 8 illustrates a trace analysis programming system in which an analysis program is analyzing traced information and generating output reports;

FIGS. 9A–M illustrate flow diagrams for a particular embodiment of an analyzing method with the subject invention.

This invention provides an unique tracing program which controls all other programs on a computer system including the supervisory-operating system programs, if present. This invention "fools" the hardware instruction counter in the computer system with respect to the program being traced by causing the hardware instruction counter to always point to an instruction in the tracing program, and never to an instruction in the traced object code. Thus each traced instruction is copied into the tracing program before its execution.

The traced object code is in fact being executed in its normal sequence although its instructions are not being executed in place while being traced. During tracing, they are respectively moved one instruction at a time immediately prior to their execution to a special work area within the tracing program, where they are executed. During execution, the hardware instruction counter will point to it within the tracing program. After execution, the hardware instruction counter points to the instruction immediately following the traced instruction, which will be the next instruction in the tracing program. Hence, the tracing program retains control of the system after execution of each traced instruction, and the traced program never gets control of the system during the tracing process.

A major advantage of this invention is that the sequence of execution of the instructions in the object program being traced is not disturbed by the tracing process, and hence the traced program is executed in the same sequence as if the tracing program were not there.

The address of the next instruction to be fetched from the object program being traced is contained in a pseudo instruction counter (PIC), which is maintained by the tracing program. The pseudo instruction counter is maintained and updated by the tracing program, so that it always points to the next instruction in the traced program. The PIC contains the address of the next instruction which is to be taken from the traced program into the tracing program's work area for next execution.

The invention provides highly variable information to assist both the hardware and the software system designer. Specified programs, jobstreams, or even operating systems themselves, are traced once by the invention. The output from the invention contains all data necessary for all analyses by a special analysis program.

This single-trace concept permits the desired analyses of data at a later time, subject to changing parameter influence. The output of the invention can be analyzed an indefinite number of ways to attain optimum solutions to specific design problems.

The invention furnishes information on all instructions actually executed, and transfers the data to an I/O device, such as magnetic tape, for later analysis.

Actual instruction execution, as opposed to instruction simulation, has the advantage of preserving the intricate timing and sequential balances inherent in a computer system. However, a price must be paid for this positive factor — performance time. Tracing of programs has always been associated with substantial performance degradations. Factors of 100–150 to one are not uncommon in prior trace programs. However the invention has an average degradation within the range of 3–13 to one (depending on the degree of CPU-channel contention existing in the program being traced).

The invention runs as a monitoring program. Any specified operating system (OS/360, DOS/360, etc.) can be run under the control of the invention. Problem programs run naturally under the supervision of the specified operating system. In this manner, tracing could be visualized as an onion, with the outer controlling layer composed of a tracing program; the next layer composed of the controlling operating system; and all adjacent layers composed of problem programs, and hardware.

Figure 1A:
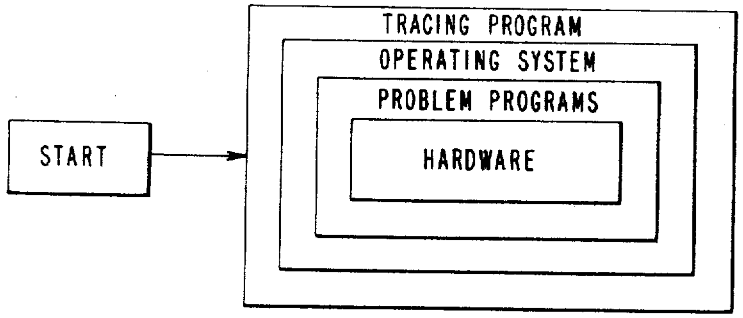
FIG. 1A represents the controlling relationship of the tracing program (in which the invention is embodied) within a computer system containing all required hardware and software.

FIG. 1A very generally illustrates the control relationships among the different programs and hardware found in this invention.

The invention provides the option of sampling so as to substantially improve tracing performance. Sampling is carried out through the selection by the user, of the number of instructions to be traced, and of the number of instructions during which tracing is to be quiescent. (For tracing purposes, an interrupt is considered an instruction.)

Figure 1B:
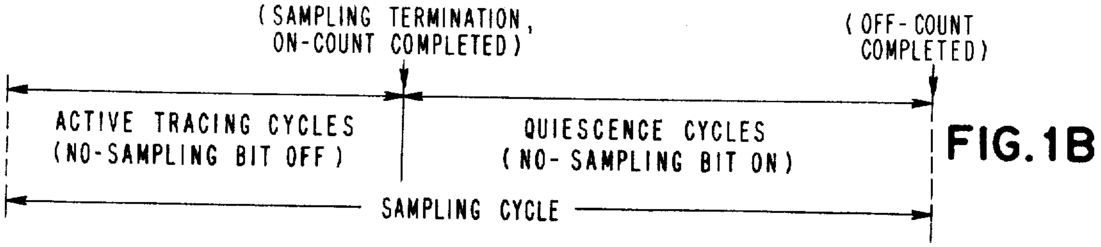
FIG. 1B is a timing layout of a sampling cycle which may be used within the subject invention.
Figure 1C:
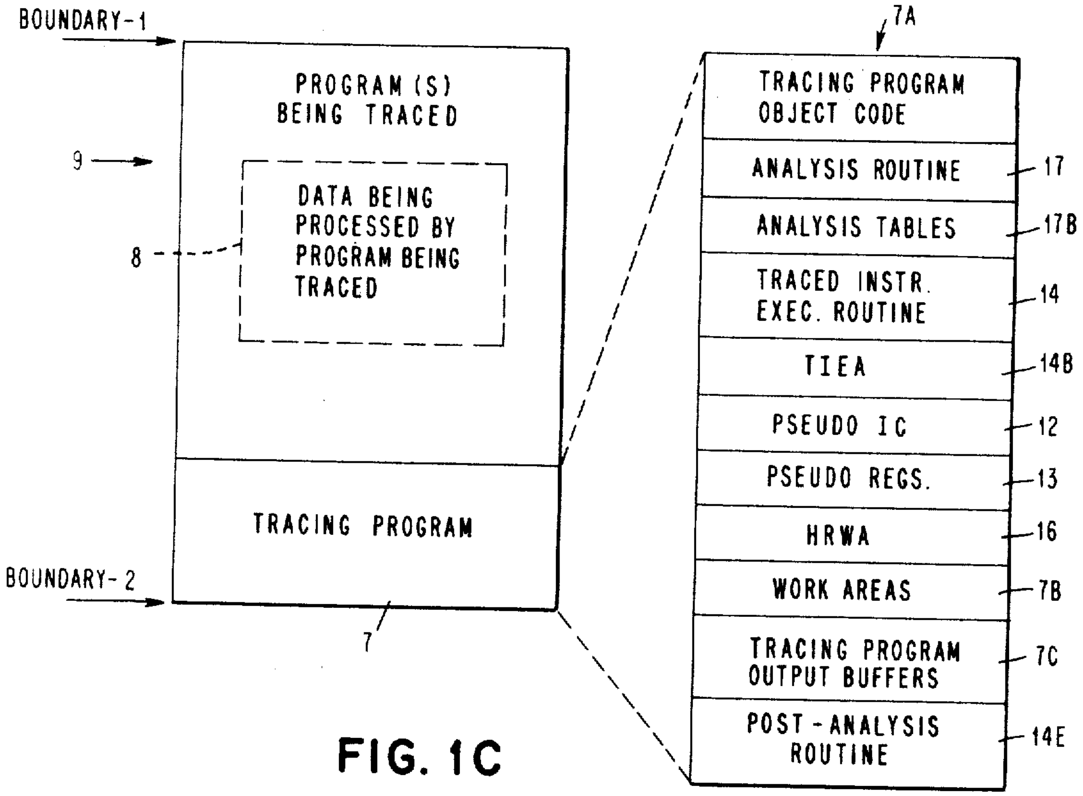
FIG. 1C represents a typical memory map of a tracing program embodiment in relation to program(s) to be traced and data to be processed by the program(s) to be traced.

FIG. 1C illustrates a typical memory map within a computer system having the traced program 9 and the tracing program 7. Thus most of the memory area is occupied by the program 9 being traced. In another part of the memory is the tracing program 7. Within the tracing program 7 is found the tracing object code 7A, the analysis routine 17, analysis tables 17B, TIER 14, TIEA 14B, the pseudo instruction counter 12, pseudo registers 13, the work areas 7B, HRWA 16, the tracing program output buffers 7C, and the post-analysis routine 14E. For example, the tracing program and its associated areas and buffers might occupy 24,000 bytes maximum of core storage.

Figure 2:
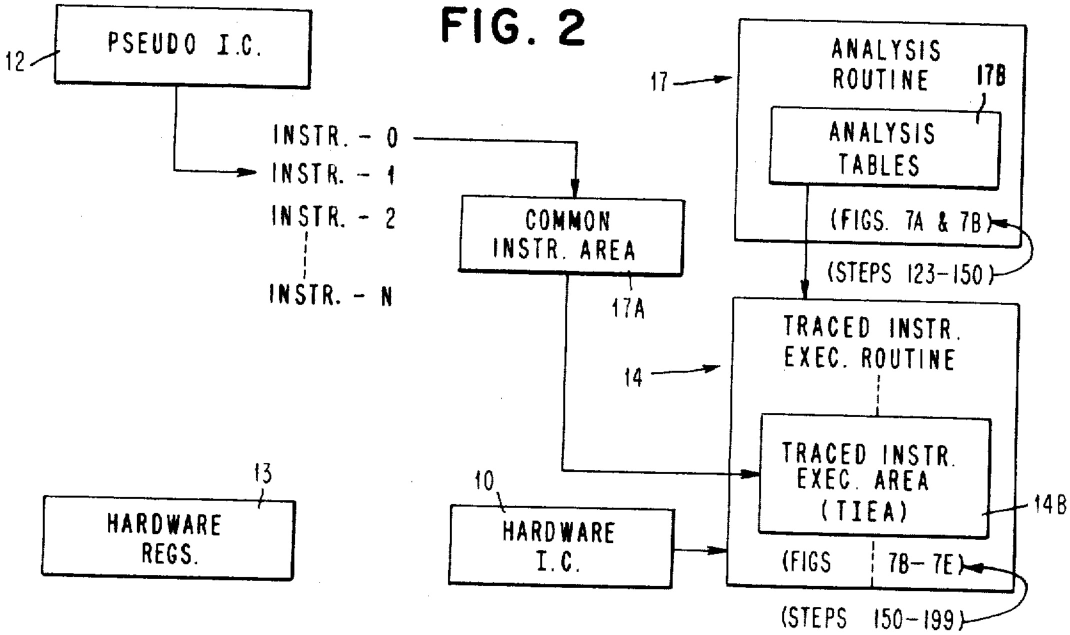
FIG. 2 illustrates an instruction copying operation within the environment of the invention involving the transferring of an instruction from the traced program into the tracing program for execution and trace analysis.

An overview of an important dynamic aspect of the invention is represented in FIG. 2. The object program 9 instruction stream being traced is viewed as comprising the respective instructions: INSTR.-0, INSTR.-1, . . . , INSTR.-N. The next instruction to be executed in the traced program will always be the instruction having the address found as the contents of the pseudo instruction counter (PIC) 12.

In FIG. 2, it is assumed that INSTR.-0 is currently in execution. Accordingly the PIC content initially addresses INSTR.-0. Upon completion of tracing for INSTRUC.-0, the PIC 12 will address the next instruction, INSTRUC.-1, in the traced program.

Initially the instruction INSTR.-0 was transferred by the tracing program 7 to the traced instruction execution area (TIEA) 14B where instruction INSTR.-0 was executed.

Upon completion of execution of each traced instruction, (HIC) 10, the hardware instruction counter in the machine, points to the address of the next tracing program instruction that follows the traced instruction in TIEA 14B.

The instruction to be traced is initially transferred from the object program 9 to a common instruction area 17A where its operation (OP) code is examined by an analysis routine 17 that selects the TIEA 14B to which it should be moved. A particular TIER 14 and TIEA 14B are chosen by the analysis routine 17 as a function of the particular type of operation code in the instruction being traced. Each particular instruction type in the computer system instruction set is represented in the tracing program by a traced instruction execution routine (TIER) 14. Each TIER 14 has its own TIEA 14B. Then the instruction is executed in the chosen TIEA 14B.

The hardware instruction counter (HIC) 10 is set by the analysis routine 17 to address the beginning of the selected TIER 14 into which the instruction being traced has been inserted from the common instruction area 17A. Now TIER 14 is ready to begin its operation of analyzing and executing the current instruction in the object program 9 being traced and executed.

One of the functions of the TIER 14 is to save the current settings of hardware registers 11 used by the tracing program 7 by transferring their contents to a hardware register work area (HRWA) 16. To maintain the integrity of the program being traced, the contents of appropriate pseudo registers 13 used by the traced program 9 are transferred to hardware registers 11 in preparation for the execution of the next instruction to be traced. The instruction in TIEA is now executed. The pseudo registers 13 are then reloaded with the post-execution settings of the hardware registers 11.

To maintain the integrity of the tracing program, the hardware registers are now restored from the HRWA 16, and an analysis of the execution is then performed.

Then the PIC 12 is stepped to address the next instruction to be traced and executed. This next instruction is fetched into the common area 17A using the address in the PIC 12, and the process is repeated for this next instruction, and so forth, until the entire program 9 has its execution completed and traced.

The traced program 9 has its instruction stream represented in FIGS. 3A-E as the execution sequence of instructions in the traced program 9. The execution sequence is not generally the serial sequence of instruction written by the programmer, in that the instruction stream consists of the instructions selected during execution using actual data. There is no simulation involved in the execution of this instruction stream. In FIGS. 3A–E, the traced program instruction stream is represented by the sequence of instructions (Instruction-0 . . . Instruction-N).

Figure 3A:
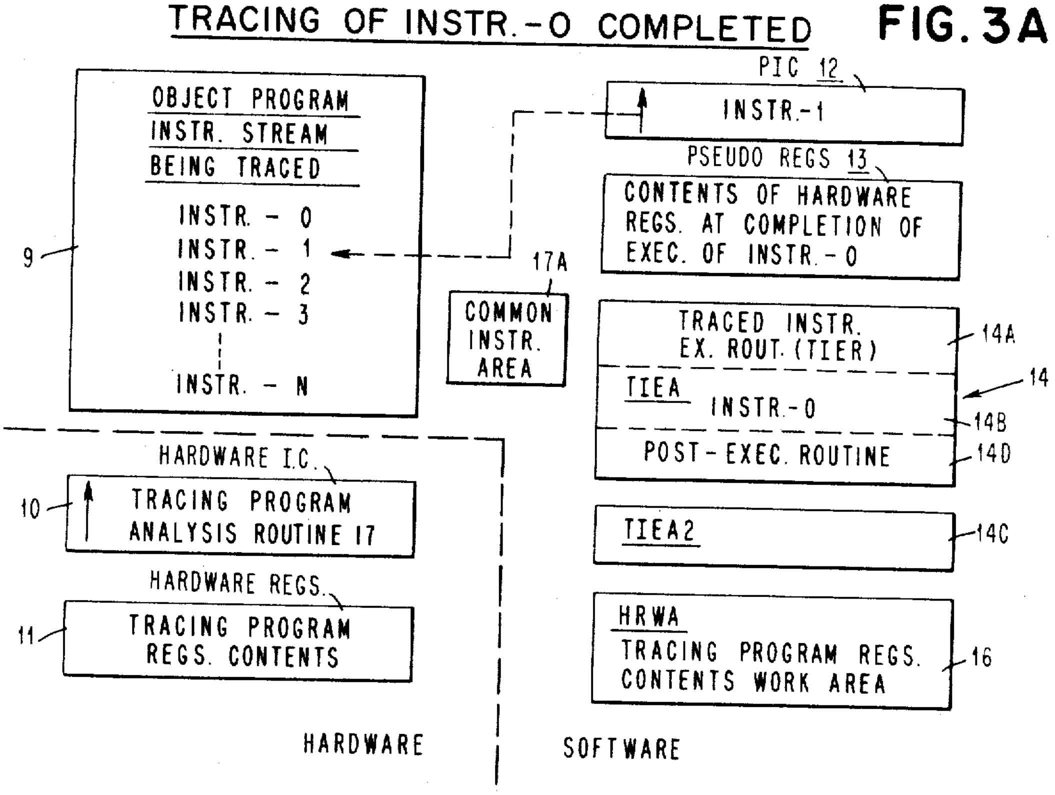

FIG. 3A illustrates the state of various counters and work areas after Instruction-0 has been traced and before Instruction-1 is traced. This example, although taken with respect to Instruction-0, is applicable to any instruction in the program being traced which had its execution just completed.

In FIG. 3A, HIC 10 contains the address of the next instruction to be executed in the tracing program 7. The hardware registers 11, may comprise sixteen general purpose registers and four floating point registers. At this point in time (completion of tracing Instruction-0), their contents have been saved; the contents were moved to the pseudo registers 13 in memory. Pseudo registers 13 will now contain the same contents as were in hardware registers 11 upon completion of execution of Instruction-0. The tracing program register contents previously saved in the hardware register work area (HRWA) 16 were then restored into the hardware registers 11 from the HRWA 16.

The PIC 12 is now stepped up to the address of Instruction-1 within the traced program 9.

TIEA 14B contains Instruction-0. There is also a (TIEA-2) 14C which is only used whenever the instruction in TIEA 14B is a non-sequentially addressed instruction, such as a branch or "execute" instruction type.

In FIG. 3A, at the end of Instruction-0 execution, HIC 10 was restored with the address of the analysis routine 17. After the completion of tracing Instruction-0 in FIG. 3A, Instruction-1 is obtained and examined; this is represented in FIG. 3B.

Figure 3B:
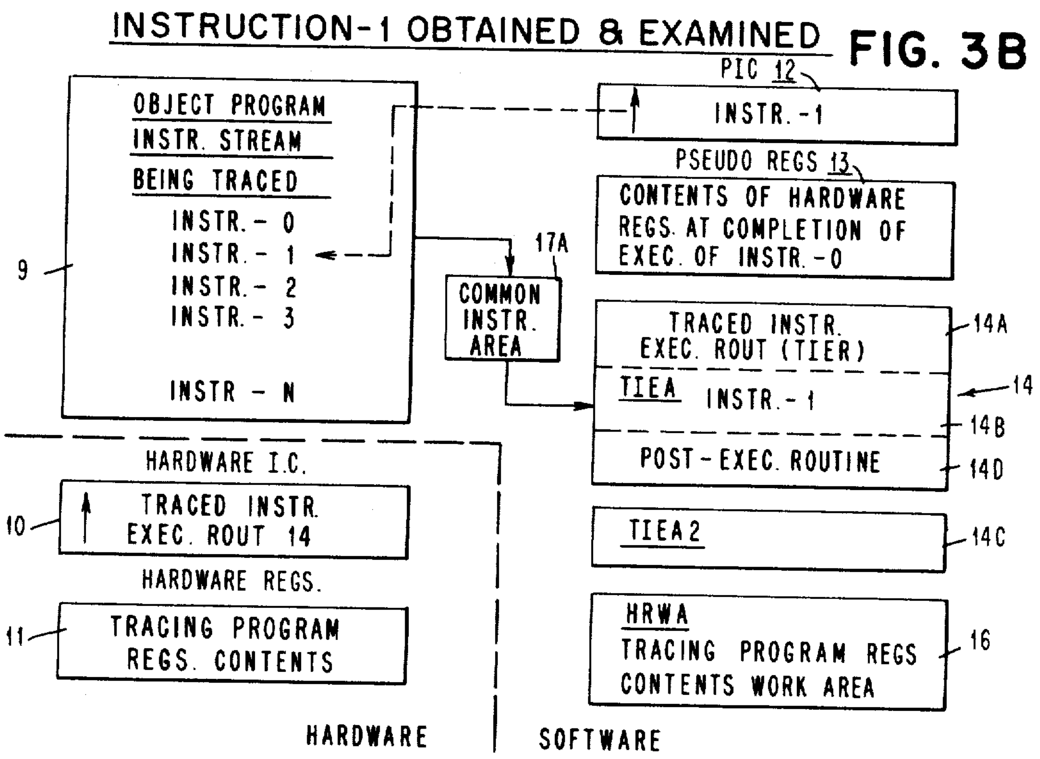

In FIG. 3B, analysis routine 17 causes a fetching of the next instruction in the traced program 9, which is Instruction-1, by using the current address in PIC 12. Instruction-1 is transferred to the common area 17A by the analysis routine 17 which examines its OP code. The OP code examination determines which TIER 14 within the tracing program 7 should be used to examine and execute the particular instruction type found in the common area 17A. Thereby the analysis routine 17 chooses this address from analysis tables 17B and loads that address into HIC 10 to transfer control from the analysis routine 17 to the correct TIER 14.

Then TIER 14 is entered at its beginning and its execution is started. As TIER 14 is executed, it causes a transfer of the Instruction-1 from the common area 17A into the TIEA 14B within the TIER 14.

Initially the TIER 14 examines the contents of the pseudo registers 13 for generating the effective storage operand addresses to check them against the upper and lower boundary addresses of the tracing program 7. If it falls within the tracing program 7, the execution of this instruction is inhibited, and an addressing error interruption is forced. The interrupt is then handled by a normal programming procedure, and tracing continues. If the operand addressing is not offensive to the tracing program, execution of Instruction-1 will be permitted.

Then TIER 14 executes Instruction-1 within TIEA 14B. During the execution, the hardware registers 11 are set by the execution of Instruction-1, as a function of the data 8 operated upon by Instruction-1.

Figure 3C:
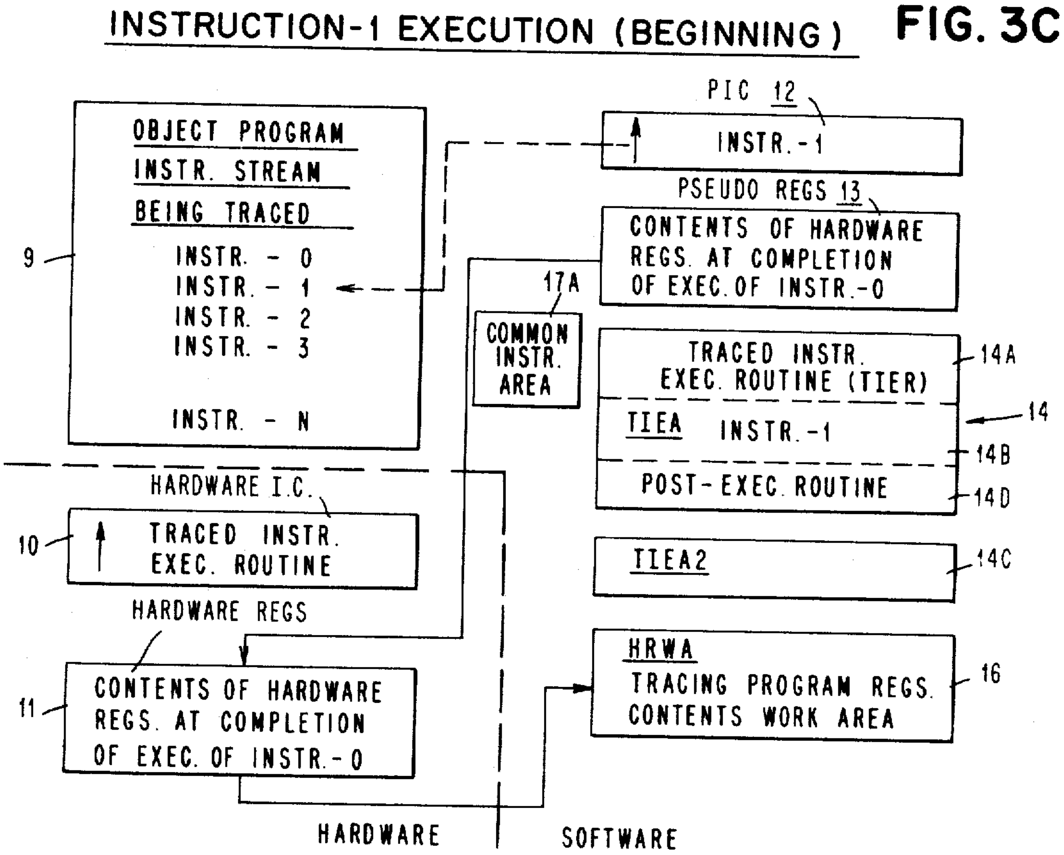

FIG. 3C illustrates the state of events which exists at the beginning of execution of instruction-1. Firstly in FIG. 3C, the contents of the hardware registers 11 (which initially contain the tracing program results) are stored into the HRWA 16. Then the hardware registers 11 are loaded with the contents of the pseudo registers 13 and thereby contain the contents of the identical hardware registers 11 that existed at the completion of execution of Instruction-0.

Then the Instruction-1 in TIEA 14B is executed, which causes the results of its execution to exist in the hardware registers 11.

In the event that the instruction residing in TIEA 14B is an "execute"-type instruction, the subject of this "execute" instruction would be executed in TIEA-2 14C. The common instruction area 17A may be used as TIEA-2 14C for the subject instruction after area 17A has been used as the common instruction area for an "execute"-type instruction. The subject instruction in such case would have been copied into TIEA-2 by the portion of the TIER 14A which executed prior to executing Instruction-1.

In the event that Instruction-1 is a conditional-branch type of instruction, then other special handling is provided in the beginning part of the TIER 14A. This special handling involves storing the condition code of the last traced instruction which was executed. This prior storing of a traced instruction's condition code is done by the post-execution routine 14D during the examination of the prior instruction which had set the condition code in the traced program 9.

Figure 3D:
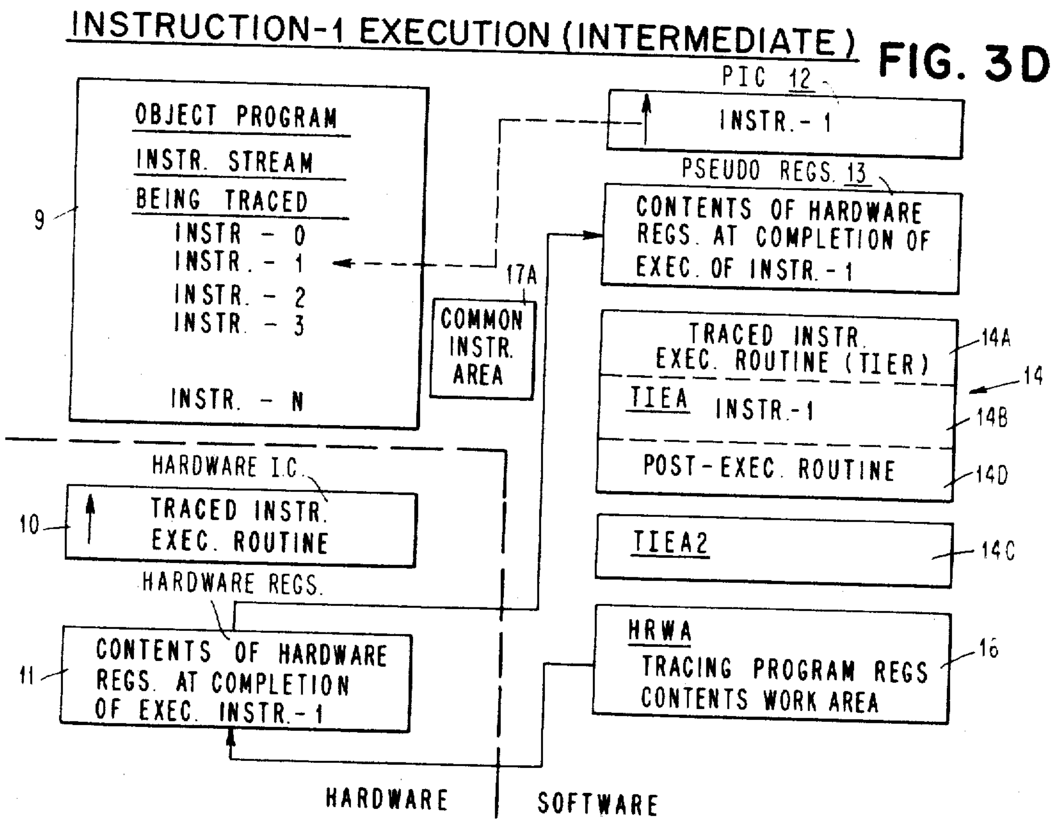

In FIG. 3D, immediately following the execution of Instruction-1, intermediate operation of post-execution routine 14D is considered. The first step in FIG. 3D is the saving of the contents of the hardware registers 11 (containing the results of the execution of Instruction-1) by transferring their contents to the pseudo registers 13. Then the hardware registers 11 are loaded with tracing program register contents found within the hardware register work area 16. Thus the hardware registers 11 are reinvoked for use by the tracing program.

Accordingly the hardware registers 11 are at all times used for the tracing program 7, except for the short interval during which the traced program uses registers 11 to store the results of execution of the instruction in TIEA 14B. This short interval exists from the time immediately following the saving of the hardware register contents for the tracing program 7 until the instant immediately following the execution of the traced instruction in TIEA 14B when the contents of the hardware registers 11 are restored to their condition immediately preceding the execution of the instruction being traced.

At the end of the operations shown in FIG. 3D, any condition codes which may have been generated by the execution of the instruction being traced, which is Instruction-1, are saved in a work area 7B which may be appended to the HRWA 16.

Then PIC is updated to reflect the address of the next instruction in the object program to be executed and traced; this is Instruction-2.

Figure 3E:
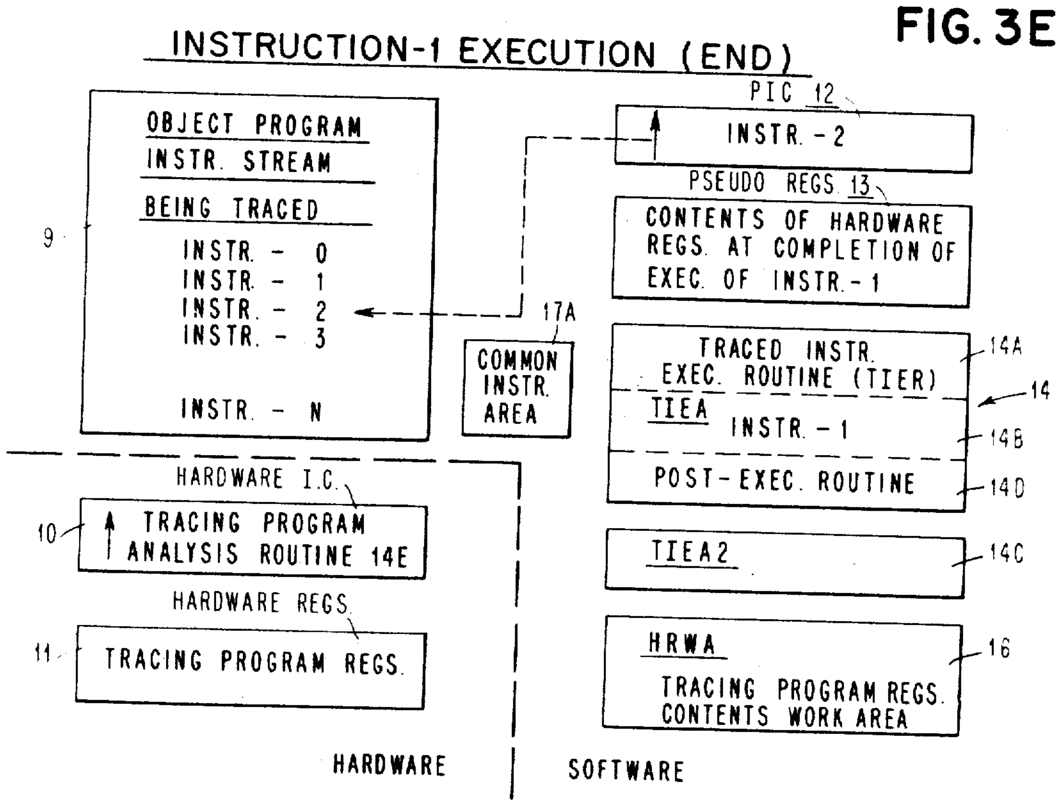

At the end of the TIER post-execution routine 14D, a branch instruction is provided which causes the tracing program post-analysis routine 14E to be entered. Accordingly this branch address is placed in the HIC 10 as shown in FIG. 3E. The post-analysis routine 14E prepares and edits the traced data. It also transfers the data (trace record in FIG. 4A) to an output buffer area 7C where it is accumulated within a variable-blocked output record (shown in more detail in FIG. 4B) for writing on an I/O device.

In more detail, the post-analysis routine 14E prepares the trace record data by generating a variable logical record for each instruction executed and traced in TIEA 14B or in TIEA-2 14C.

The trace record format is shown in FIG. 4A. The number of bytes used for a particular traced and executed instruction varies within the trace record depending upon its instruction type, i.e., RR, RS, RX, SI, SS, or whether a sampling (SMPL) limit has been reached, or if an interrupt (INTRPT) has just been processed. Thus FIG. 4A shows the memory map which represents the magnetizations in core storage that will occur for any trace record that represents a particular executed and traced instruction.

Byte 0 in word 0 indicates if double indexing is used. Word 0 byte 1 indicates the SVC number when an SVC instruction is being executed. Byte 2 contains the addresses of the registers used in an RR type instruction. Byte 3 is the OP code of the instruction being executed and traced in 2's complement notation.

Word 1 is used to post the PIC 12 setting that indicates the location of the OP code in this traced program 9. In other words, word 1 contains the address of the instruction executed and traced as it existed in its original object program, and not its address of the TIEA 14B. The form of the address in word 1 may be either the true core address or a symbolic address of the traced instruction.

Word 2 contains the effective address of one operand in the instruction, if any. Word 3 contains the effective address of the second operand in the instruction, if any. Word 4 contains the number of bytes for data addressed by effective address 1, if any, and word 5 contains the number of bytes for data addressed by the effective address 2, if any.

Also in FIG. 4A, examples of particular fields for the trace record used with different types of instructions (RR, RS, RX, SI, SS1, SS2), sampling (SMPL) termination, and interrupt (INTRPT) are represented. Accordingly the trace record for any particular instruction being traced and executed can vary in length from four bytes for a sampling termination (SMPL) up to 24 bytes for an SS instruction type with two operands.

FIG. 4B illustrates a variable blocked output record which is generated in the tracing program output buffer area 7C. When a buffer in area 7C is filled, it is written on a selected I/O device, such magnetic tape or disk, etc. The first word in the output record contains an initial count field which has posted into it the number of bytes in this particular output record. This count field might, for example, be two bytes having any number of bits which can accommodate a maximum of 4,096 bytes of data in the output record. The first trace record immediately follows the count field and contains a variable number of bytes as previously described for the trace record format in FIG. 4A. Trace record 2 follows trace record 1 etc, until the last trace record K which may be contained in the allocated buffer area 7C.

After each trace record is transferred to the output record, the count field is updated to represent the current number of bytes in the output record. Accordingly after the last trace record is transferred into the buffer area 7C, the last posted count represents the final count of bytes that will be written onto the I/O device. There may be any number of buffer areas, for example two might be found to be convenient, so that while one buffer area is being written out, the other buffer area is being inputted with trace records.

Output record information includes sampling termination and interrupt handling, as well as information about the particular instructions executed in the program being traced. An interrupt trace record is written whenever an interrupt is handled to completion. The system's priority of interrupt handling involves masking all interrupts until a particular point in the execution of the post-analysis routine 14E has been reached. When this point is reached, all pending interrupts are handled, but priority of interrupt handling is first given to the interrupts generated by the tracing program 7, and then priority of lesser extent is given to the handling of all other pending interrupts such as might occur during a multi-programming environment, such as from I/O, SVC's, machine-interrupts, program-interrupts, specification-interrupts, etc.

It is pointed out that interrupts are handled as interrupts by the tracing program 7 and are not simulated, such as occurs with prior types of tracing programs.

At another point in the post-analysis routine 14E, a test is made as to whether or not any sampling termination has been reached in the course of tracing, so that a corresponding trace record can be prepared and written with respect to any such sampling termination.

The sampling features found in the invention permit tracing to be done on various types of selected circumstances at the discretion of a user. Thus tracing can be done on a 100 percent basis or it can be restricted to particular sampling periods in terms of time, or it can be restricted to a particular number of instructions to be traced followed by a particular number of instructions on which no tracing will be done (on a periodic basis), or it may be done under console control that determines when tracing shall begin and when it shall end. The sampling termination is indicated by a trace record and accordingly such trace record would also indicate the beginning of the next sampling sequence of instructions being traced and executed.

FIG. 5 illustrates how the tracing object program 7 is tailored to a particular installation. For this purpose a general tracing program 7A is designed to use macro-instruction skeletons for generating the installation tailored object program 7. The macro-instruction skeleton 7A includes generators for the particularized tracing program object code 7, (including tracing program analysis routine 17, TIER 14, post-analysis routine 14E, analysis table skeleton 17B, PIC skeleton 12, the pseudo register skeleton 13, work area skeletons 16 and 7B, and the output buffer skeletons 7C, among others).

The tracing program generative cards 7B specify the fundamental parameters that tailor a given tracing program system to a given installation. The tracing program generative cards 7B include parameters describing the software system, the console address, the anticipated operating system's residence address on an I/O device, addresses anticipated for usage by the tracing program when it writes out trace data on I/O devices, memory size available for the program being traced and the tracing program 7, and other commonly known parameters for specifying the environment for a software-hardware system.

The tracing source macro-instructions 7A and the generative cards 7B are inputted to an assembler program which includes conditional macro assembly routines, such as the IBM OS/360 ASSEMBLER-F program. Then execution is started for the assembler with these inputs so as to provide a conditional macro assembly wherein the macro instruction skeletons are expanded and generated to provide the tracing program object code 7 unique to the particular installation. The installation will thereafter operate with this object code 7 as long as it maintains the same parameters originally specified. If the installation is such as to require plural parameters under different operating conditions (such as DOS/360 at one time and OS/360 at another time), a separate conditional macro assembly is done to tailor the tracing program object code 7 for each set of system parameters.

Further tailoring of the program may be needed for a particular run at the installation for which the generalized parameters were selected during the installation tailoring.

FIGS. 6 through 7D show a flow diagram which represents the sequence of acts needed to run a particular trace operation. The steps in FIG. 6 initialize the object code of the installation-tailored tracing program into the unique object code needed to trace the programs on a particular system.

IN FIG. 6, the particularization is started at step 100, which enters step 101 which loads the installation-tailored tracing program into the memory of the computer being used. This in essence is an IPL (Initial Program Load) of the tracing-program's object code, which resulted from the operations in FIG. 5.

Execution of the initialization program begins as soon as the installation-tailored tracing program is loaded into memory. It begins by executing a "write to operator" routine that prints out its identification on the console typewriter of the hardware system. This is followed by a printout thereon of the system environment controls specified by the generative cards step 7B in the installation tailoring program in FIG. 5.

This printout may for example appear in the following form: typ = 009, RDR = OOC, PUN = 00D, PTR = 00E, TAPEA = 282, TAPEB = 283, IPL = 290.

In step 102, the operator can check the addresses to verify the system environment parameters for the current tracing program run. If any changing is required, step 103 permits the operator to change the parameters by typing them in (only the changes are typed). The typing is completed when the operator enters an EOB (end of block) in the standard form to signal to the system that it should continue. This step 103 is the last operator intervention needed to be provided, unless the operator desires to quiesce the tracing functions at certain future points by optional manual intervention.

Included in the initialization processes are: initialization of the parameters into the tracing program I/O routines, memory control routines, error recovery routines, output device switching routines, and output device reallocation routines, etc.

Step 104 is executed when the tracing program initializes itself to reflect the desired needs for the current trace run on the basis of operator verifications and/or changes. This includes initializing internal counters, work areas, trace instruction execution areas, etc.

Step 105 generates the address of a word location in memory. The setting of this location controls the quiescent or active state of the tracing program. If all of its bits are zero, the active state exits. If any bit at the word location is set on, the quiescent state exits for tracing program operation.

With step 106, a printout is made of the address generated in step 105 to advise the operator of the control location in memory which can be used at any time to invoke a quiescence routine in the tracing program. The quiescence routine suppresses any output created by the tracing operation, but it continues the control of the entire system under the tracing program. For example the printout may appear as "ADTR30I Sampling Bypass Address: 07E117".

The execution of the tracing program continues with step 110 which loads (IPL's) the required operating system into its normal memory location. That is, the operating system is loaded into the memory locations where it would ordinarily reside in the absence of the tracing program.

When step 110, is completed for the operating system, step 111 causes a printout, such as "IPL now in progress from 290". This indicates that the IPL is successfully completed from the specified IPL device which may be the system's residence disk device.

Before tracing begins, step 112 sets PIC 12 with the address of the first instruction in the operating system to be executed. Normally this first instruction is the first instruction in the nucleus initialization program of the operating system, or monitor, or supervisor, which are all names identifying essentially the same thing. For example, in OS/360 this program is called Nucleus Initialization Program (NIP).

Accordingly the content of PIC 12 addresses the first instruction to be executed, and tracing now can begin using this address.

Step 113 then is entered; and from this point forth in its execution, the tracing program is transparent to the operator, the operating system, and the problem programs being traced.

Figure 7A:
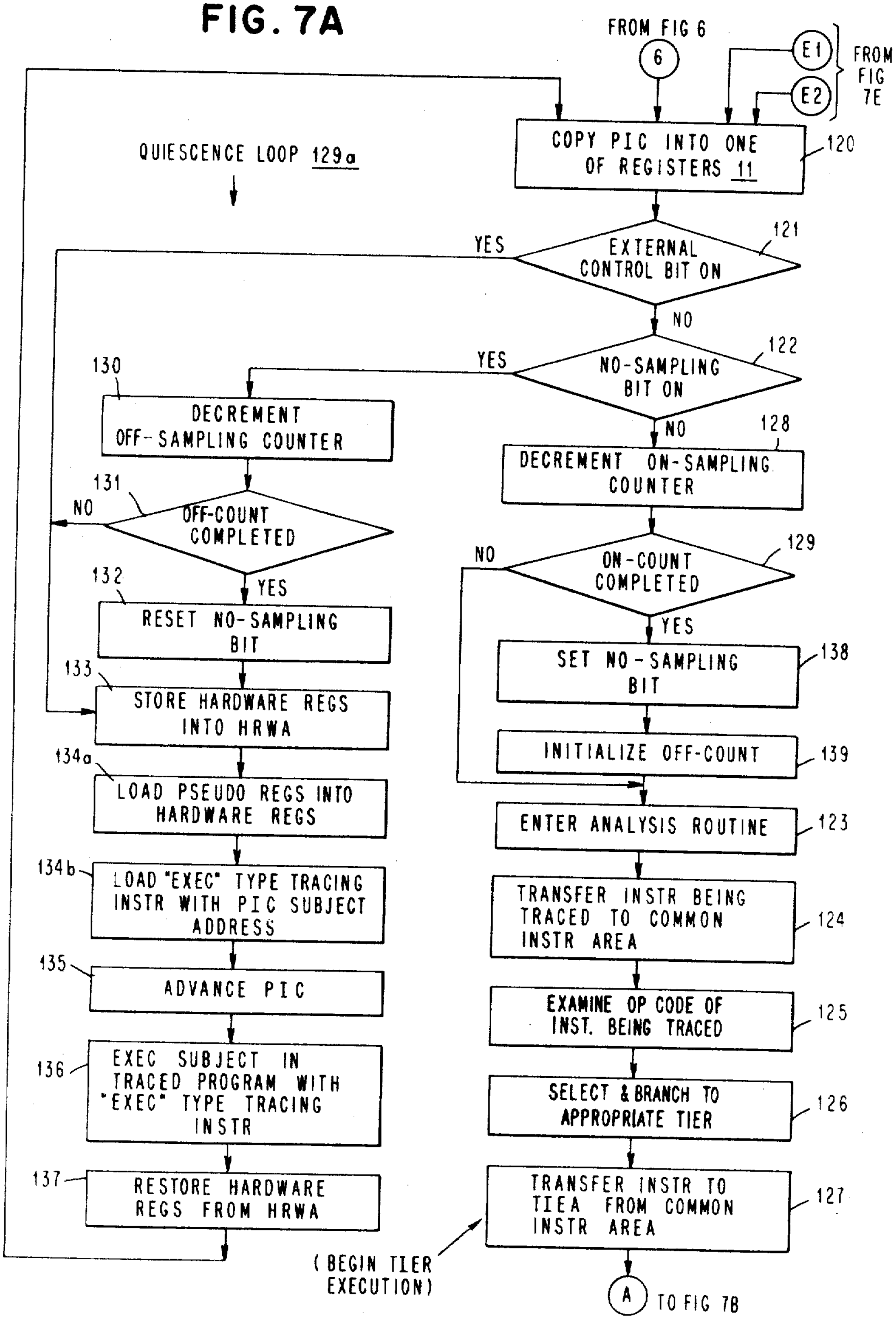

In FIG. 7A, step 120 sets one of the hardware registers 11 to the content of PIC 12.

Step 121 operates in response to the setting of an external control bit, which is a programmed bit or byte in main storage which can be set by an asynchronous external actuation in real time during the execution of the tracing program. The external control bit is preferably set by a real time manual input, generally by manual key-entry by the computer system operator at a system console typewriter.

If the external control bit is set to its on-state, a quiescence loop 129 is entered to end active tracing until later reactivated. But if the external control bit is set to its off-state, step 122 is entered to enable control by a no-sampling bit, which controls the use of sampling during the program executions. Sampling is the periodic activation and deactivation of the quiescent state and the active tracing state, respectively. Quiescence is the non-active tracing state where no trace output is provided but during which the tracing program retains control of the system.

FIG. 1B illustrates the sampling cycle, and the way it relates the active tracing cycles (iterations of steps 120–122, 130–137).

Step 122 is executed to test the state of a no-sampling control bit. If this bit is off, then the no-sampling control is off, and step 123 is entered.

Steps 128, 129, 138 and 139 are housekeeping steps executed during the tracing cycle. Steps 128 and 129 control the active tracing part of a sampling count by a predetermined amount when it is entered. If sampling is done on an instruction count basis, the decrement may be one, representing the last executed instruction. Or if sampling is done on a time basis, the decrement by step 128 may be the execution time for the last instruction. Step 129 senses when the count is completed, which signals the end of an active tracing cycle. If the count is completed, step 129 takes its YES exit to steps 138 and 139, which initialize the conditions that cause a quiescence cycle to be entered for execution of the next traced instruction upon the next traced instruction's iteration of step 122. Thus step 138 sets the no-sampling bit to an on-state, and step 139 initializes the off-count which will be used during operation of the quiescence loop 129*a* to determine the length of the quiescence cycle i.e. the number of iterations of loop 129*a*. After step 139 is performed, step 123 is entered to complete the trace analysis for the last instruction in the active tracing cycle.

On the other hand, if step 129 finds that the on-count is not completed, its NO exit is taken to step 123 to continue the active tracing.

Step 123 is entered to begin execution of analysis routine 17 by entering step 124 which causes the instruction addressed by the current content of PIC 12 to be fetched, using the index set up by step 120. This instruction is transferred to the common instruction area 17A previously referenced in FIGS. 3A–3B.

Step 125 is entered to examine the instruction being traced in the common instruction area 17A. This is done by examining the OP code in analysis tables 17B. The OP code of the instruction provides a relative displacement (i.e. index) in one of the analysis tables 17B to obtain the address of a traced instruction execution routine (TIER) 14, among plural TIER's. A branch is then taken to this address to execute step 126 which transfers control to the appropriate TIER 14 for the particular instruction being traced. The TIER routines differ in the length of their TIEA 14B and functions due to the different operation codes.

The operation codes in instructions of a computer system, such as any IBM S/360, indicate the variable length of the instruction by their first two bit positions, i.e. whether the instruction is two, four, or six bytes in length.

The length of the TIEA 14B in the selected TIER is determined by the length of the instruction to be traced, so that the next byte that follows the traced instruction constitutes the next instruction within the tracing program 7.

Then the selected TIER 14 is entered and its initial part 14A begins execution with step 127 transferring the instruction from the common area 17A to TIER 14B.

Figure 7B:
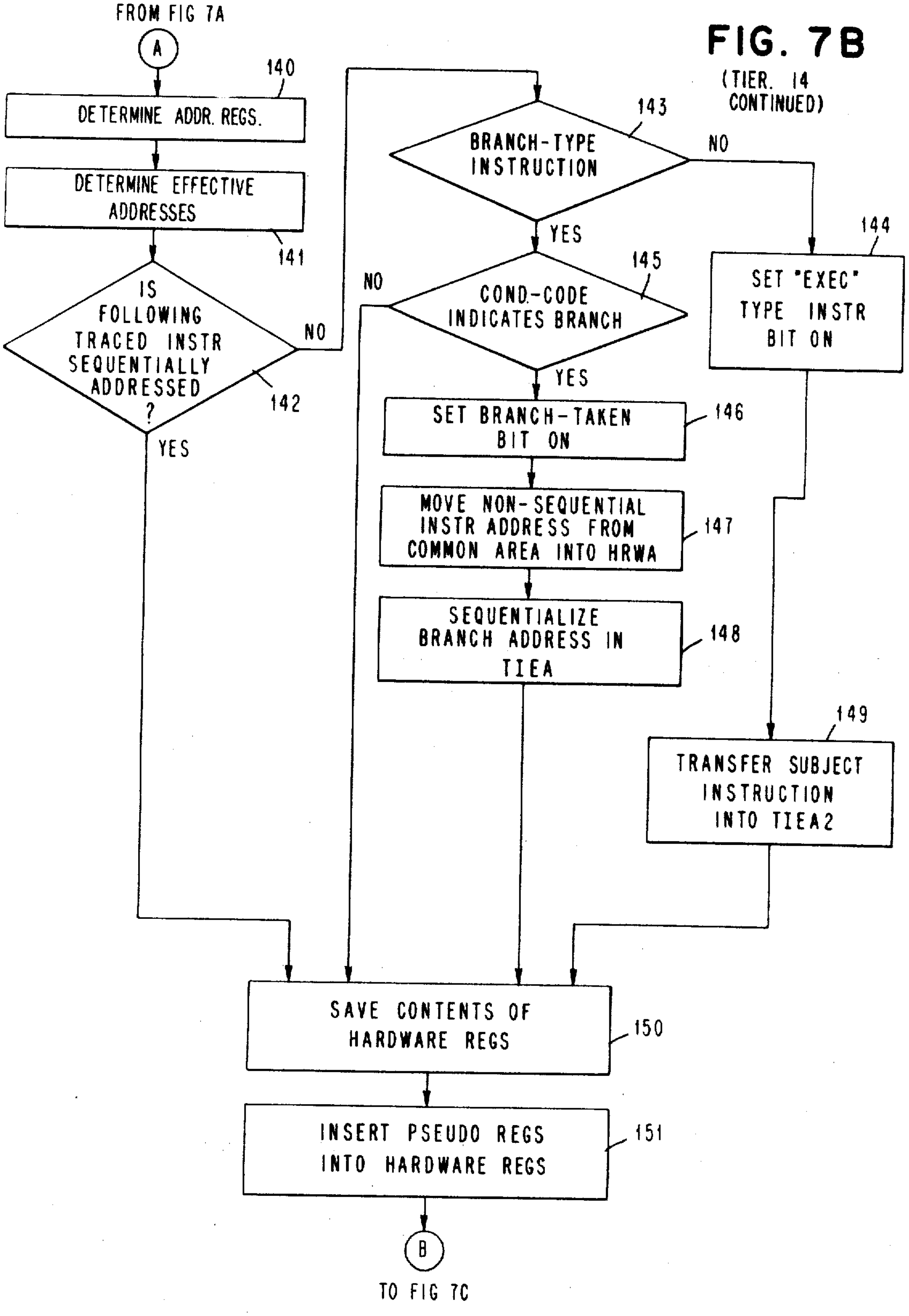

In FIG. 7B, TIER 14A execution is continued with step 140 which analyzes the instruction in the TIEA 14B. This analysis may, for example, involve the determination whether multi-index registers might be used during the execution of the instruction being traced. For example, on an RX type of instruction the index register, X, and/or the base register, B, may be invoked by the executed instruction, whereas only the base register B may be invoked by some other instruction.

Upon completion of step 140, step 141 is entered to examine pre-execution data. In this particular step, for example, an attempt is made to determine what happens to the registers used by the instruction and what could happen to the data 8 being processed by the particular instruction. As an illustration with an instruction such as the TRT (translate and test), the machine has to know the location of the data, the displacement factor provided to the instruction, and the location of the obtained translated data. In this example, all of the information must be established prior to the execution of the instruction being traced so that the tracing program can furnish complete output data for a trace record (see FIGS. 4A and 4B).

Next step 142 is entered to examine the operation code of the instruction in TIEA 14B to determine if its following instruction to be traced is located at the next sequential instruction address, or if it is a non-sequentially addressed instruction. The NO exit from step 142 signals a non-sequentially addressed instruction will follow, and step 143 is entered. Step 143 distinguishes between branch-type instructions and "execute"-type instructions, both being followed by a non-sequentially addressed instruction.

Steps 142–149 act in a particular way to enable the tracing program to maintain control of the system under the special conditions of non-sequentially addressed instructions. Steps 142–149 manipulate the non-sequentially acting instructions in a manner which prevents the execution of the traced program from ever obtaining control of the hardware instruction counter operation, which would be tantamount to having the traced program obtain control over the system.

The two types of non-sequentially addressing instructions, i.e. "execute" and branch, act in different ways and need to have the instruction following them traced in a somewhat different manner. The "execute" instruction and its subject instruction are both executed concurrently, and each has a trace record generated during the single iteration of the active loop 128–199.

However a branch instruction is executed alone and traced during the current iteration of the active loop 128–199. A branch instruction is followed non-sequentially only if the branch is taken, which is determined by the current setting of the condition code, as set by execution of a preceding instruction.

Thus step 144 sets on an "execute" instruction bit if step 143 finds that the non-sequential type instruction is not a branch-type instruction. Then step 149 transfer the subject instruction of the "execute" instruction into TIEA2, and step 150 is entered to prepare for concurrent execution of the "execute" instruction in TIEA and its subject instruction in TIEA2, which is later done by step 152*b*.

On the other hand, if step 143 finds the operation code in TIEA is for a branch-type instruction, step 145 is entered to test the current condition code to see if it indicates the branch should be taken. If no branch is to be taken, step 150 is entered to in preparation for normal execution.

However, if step 145 indicates a branch is to be taken, step 146 is entered to set on a branch-taken bit. But maintenance of control by the tracing program requires later execution of the next non-sequential instruction without the branch actually being taken, since the real branch operation would cause the tracing program to lose control of the system. Steps 146–148 assure control is maintained by the tracing program. Step 147 copies the non-sequential address for the next instruction from the branch instruction in the common area. Step 148 changes the branch address in the same instruction in TIEA to the next sequential address, which is the address of the next instruction in the tracing program to be executed, i.e. the hardware instruction counter is thereby stepped to the address of the next tracing program instruction when the branch is taken, and step 150 is entered.

On the other hand, if step 142 finds that the following instruction is a sequentially-addressed instruction, the YES exit is used to directly enter step 150 in FIG. 7B.

In FIG. 7B, step 150 saves the contents of the hardware registers 11 by transferring their contents to the hardware work area (HRWA) 16. The tracing program has been in execution when step 150 is reached, and the hardware registers 11 are then being used for the execution of the tracing program 7; and accordingly their contents reflect the current execution state of the tracing program 7. Step 150 frees the contents of hardware registers 11 for the execution of the traced program 9.

Step 151 is entered to set up hardware registers 11 for execution by the traced program 9 by restoring the contents of these registers to their state existing when the traced program was left after the execution of its last instruction. Hence by this transfer, the execution of traced program 9 is continued as if it were never discontinued.

Figure 7C:
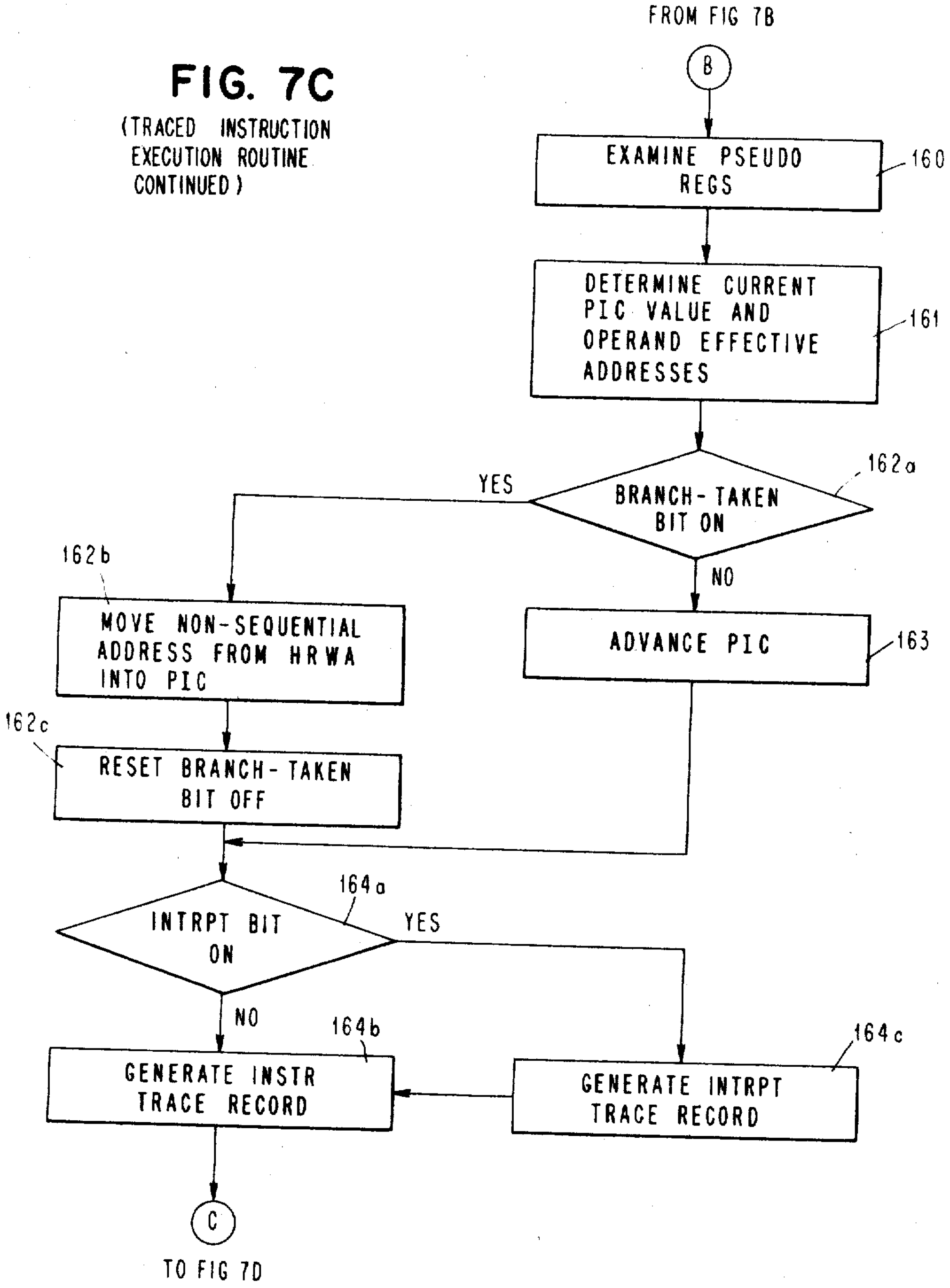

Exit B is taken from FIG. 7B to FIG. 7C.

Then step 160 in FIG. 7C is entered to continue the execution of TIER 14 with its post-execution routine 14D. The post-execution routine at this point is analyzing the pseudo registers 13 to determine information which will generate the trace record 7D for the last-executed traced program instruction. Step 160 accordingly examines the contents of the pseudo register 13 for this purpose. This involves changing the form of the data found in the pseudo registers 13 into the general form required in FIG. 4A as required to generate the corresponding trace record 7D.

Then step 161 stores the current PIC content as the address for the last executed instruction currently found in TIEA 14B, for placement into word 1 of the trace record format found in FIG. 4A. The operand effective addresses, if any, may be computed from the information in the pseudo registers 13 and TIEA 14B, if the address there is in symbolic form, such as where the values in the pseudo registers 13 contain the values of X and B, if any, and TIEA 14B contains the value of D, if any, which are used to compute the single value effective address in the manner commonly done in the IBM S/360 computer systems. These computations may be temporarily stored into the hardware work area (HRWA) 16 for later insertion into the trace record, along with other items.

Step **162*a* then tests the branch-taken bit to see if it is on. If the branch is not to be taken, the NO exit is taken from step 162*a* to step 163 to signal that the next sequentially addressed instruction is next to be executed. Then step 163 generates the address for the next sequentially-addressed instruction. To do this, the address currently in the PIC 12 has added to it the length in bytes of the instruction which was executed, as is indicated by the first two bits of the instruction now in the TIEA 14B**, if it is an IBM S/360 instruction.

On the other hand, if step **162*a* indicates that a branch is to be taken, its YES exit is taken to step 162*b*. Step 162*b* loads the non-sequential address for the next instruction (previously stored into HRWA 16 by step 147) from HRWA 16 into PIC 12. Now PIC 12 is set-up with the non-sequential address of the next instruction, which is to be accessed during the next iteration of loop 121–199. Then step 162*c* is entered to reset the branch-taken bit to off-state, and step 164*a* is entered. Accordingly at this point, PIC 12** is set to the address of the next traced instruction to be executed, regardless of whether the such instruction is sequentially addressed.

In FIG. 7C, step **164*a* is entered to prepare for generating the trace record from the data stored in the work area 7B by step 161 in the post-execution routine 14D, and to generate any interrupt trace record, if any non-tracing program interrupt had been handled on the last iteration, as indicated by step 183** setting the interrupt bit on.

Step **164*a* tests if the interrupt bit is on. If not on, step 164*b* is entered to generate a trace record 7D for the traced instruction in TIEA just executed, in the form shown in FIG. 4A, and step 152*a* is entered. If the interrupt bit is on, step 164*c* is entered to generate an interrupt trace record 7D according to the format in FIG. 4A. After the interrupt trace record is generated, step 164*b*** is entered to generate the trace record for the instruction in TIEA, which is the first instruction executed following a handled interrupt.

Step **152*a* FIG. 7D is entered to determine if only the instruction in TIEA is to be executed, or if both instructions in TIEA and TIEA2 are to be executed. The latter occurs only for an "execute" instruction in TIEA, and the former occurs for all other instructions. Thus step 152*b* is entered if an "execute" instruction is in TIEA to execute it and its subject instruction in TIEA2. If the instruction in TIEA is not an "execute"-type, then step 152*c*** is entered to execute only the instruction in TIEA, which may be a branch-type or any sequentially accessing instruction.

After execution of the traced-program instruction by step **152*b* or 152*c*, the execution of the traced program 9 is discontinued, and the execution of the tracing program 7 is again continued by steps 153 and 154. In order to continue the execution of the tracing program, and in order to later pick up the execution of the traced program, the contents of the hardware registers 11 are transferred by step 153 to the pseudo registers 13 to save the execution status of the traced program 9** existing at this time of its discontinuance.

Then the hardware registers 11 are restored with their state in the tracing program 7 by transferring the saved register contents in HRWA 16 back to the hardware registers 11 to execute step 154. The transferred contents in HRWA 16 were previously saved by step 150 using an indexed store multiple instruction. Step 151 was performed with an indexed load multiple instruction. Also similar indexed instructions are used to perform steps 153 and 154.

In order to maintain base addressing capability while switching between tracing and traced program executions on any IBM S/360 computer, a pointer to the base address of the tracing program was previously stored in a standard predetermined location accessible at any time by step 150 using an intermediate type instruction.

Following execution of the traced instruction in TIEA 14B by step 152*c*, the base address for the tracing program is restored as part of step 153, so that addressability for the tracing program can be maintained. These operations are performed as part of steps 150 and 153 through the movement of the pointer into and out of the standard predetermined storage location; this processing does not require any machine interrupt, or any intervening ancillary routines or instructions. By avoiding any machine interrupt, the substantial risk of loss of control by the tracing program is avoided; that is, another pending interrupt with higher priority handled at this point could give control to a program foreign to the tracing operation, with resulting loss of control. Also interrupt handling involves much time loss because of the substantial recovery procedures which are invoked by interrupt handling.

Step 166*a* is entered after step 154 is completed.

Steps 166*a*, *b* and *c* control the generation of the trace record for any instruction in TIEA2 which was just executed as the subject of an "execute" instruction in TIEA. Thus step 166*a* tests the "execute" instruction bit for on-state. If off, the NO exit is taken to step 167. But if ON, an "execute" instruction was last executed in the traced program, and the YES exit is taken to step 166*b* to generate the subject instruction's trace record. Then step 166*c* resets the "execute" instruction bit to off state.

It may be noted that a zero test of the TIEA2 area could be used instead of setting and testing the "execute" instruction bit at steps 144, 152*a*, 166*a*, and 166*c*.

Step 167 moves the trace records generated by any of steps 164*c*, 164*b*, 166*b* and 173 into the variable blocked output record 7C currecntly being generated, like that shown in FIG. 4B. The byte count in record 7C is updated by adding the number of bytes in every current trace record 7D to the byte count field 7E in record 7C shown in FIG. 4B.

Then step 170 in FIG. 7C determines if the output record is full. This is done by comparing the updated byte count field 7E with a maximum record byte count in work area 7B. For example if each output record 7C is to have a 4,096 byte maximum, a comparison of current byte count 7E is made against the value 4,072. The value 4,072 is less than 4,096 by the maximum number of bytes which could occur in the next trace record 7D, so that no overflow can occur beyond 4,096 bytes. In this case, the record 7C is outputted if the updated byte count 7E is equal to or greater than 4,072.

If step 170 indicates that an overflow might occur with the next trace record 7D, then its NO exit is taken to step 171 wherein the variable blocked output record 7C is written from output buffer 7C to the output device specified by the user. Step 171 enters step 172.

On the other hand if step 170 finds that the current output record 7C can not overflow on the next trace record 7D, the YES exit is taken to step 172. Step 172 determines if a sampling termination has been reached which would end an active tracing cycle. Sampling may have been specified in step 104 in FIG. 6 by the user during initialization of the tracing program 7 being run. Step 172 finds that sampling termination has been reached, during the current iteration due to step 129 having signalled a completion of the on-count, or due to step 121 sensing the setting on of the external control bit. Then step 173 is entered to generate and insert a sampling-termination trace record 7D into the variable blocked output record 7C, which will record where the active tracing cycle ended during execution.

Then housekeeping steps 174 and 175 are performed in preparation for entering a quiescence cycle. Step 174 sets the no-sampling bit to its on-state, which is the bit previously referred to with respect to step 122; the on-state will terminate the active tracing cycle with the current traced instruction, and will cause the quiescence cycle to be entered after step 122 is next entered. Then step 175 in FIG. 7D is entered from step 174 to initialize the on-count, which prepares the next operation of the active tracing cycle, which will follow when the quiescence cycle (about to be entered) is completed. This alteration between the active tracing cycle and the quiescence cycle is controlled in FIG. 7A. The on-count and off-count are independent of each other and either may be set to any value. Thus the on-condition for active tracing can be maintained between 0 percent and 100 percent of the execution time or count.

Figure 7E:
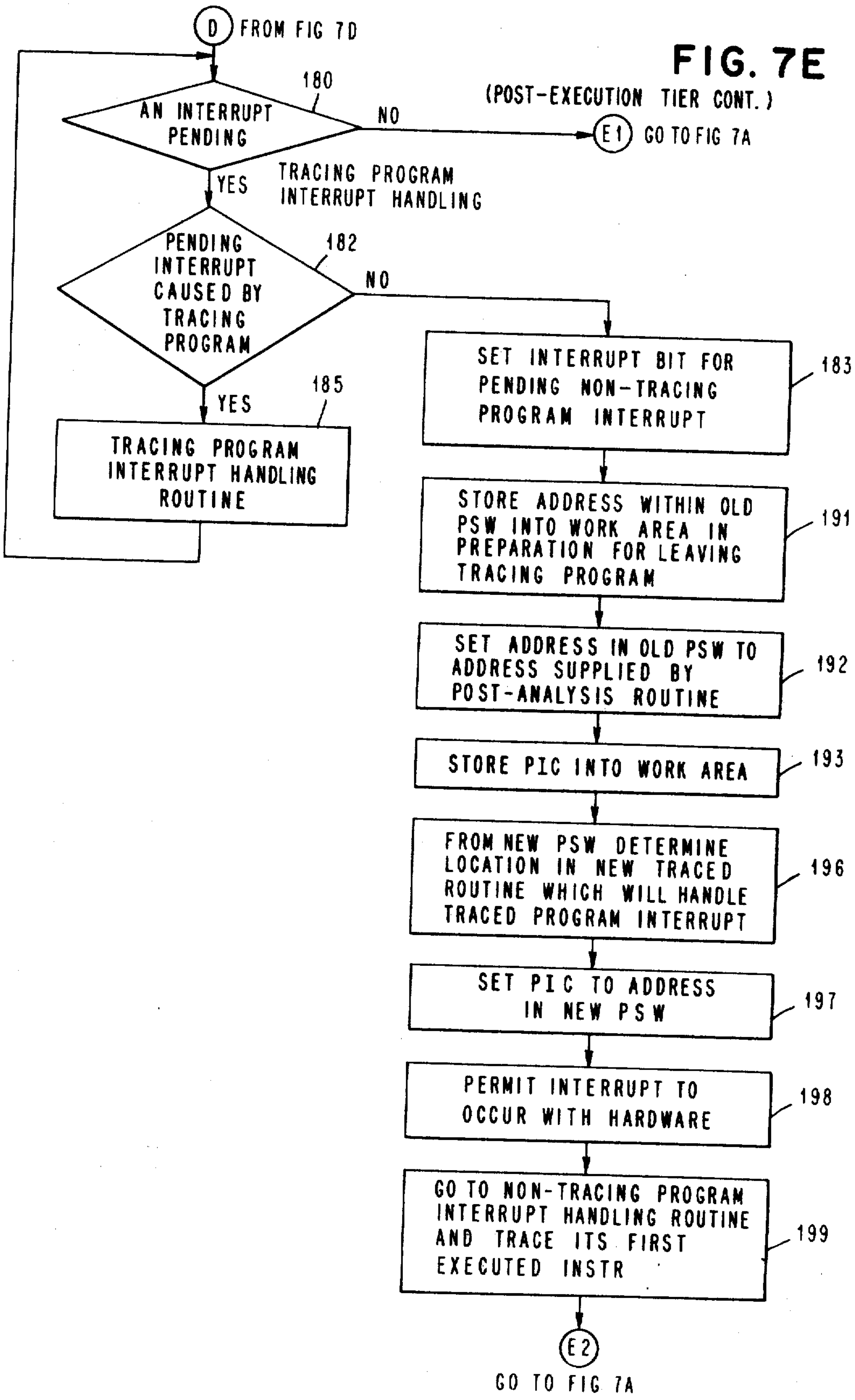

On the other hand if step 172 finds that there is no sampling termination yet, the NO exit is taken from step 172 to step 180 in FIG. 7E.

In FIG. 7E, step 180 is entered to determine if any interrupt is pending from whatever source such as programming interrupt, I/O interrupt, SVC interrupt, machine check interrupt, etc.. Step 180 examines all of the interrupts indicated by the computer system hardware. If no interrupt is pending, step 180 takes its no exit via branch point E1 to step 120 in FIG. 7A.

However in FIG. 7E, if any interrupt is pending, the YES exit is taken from step 180 to step 182. When step 182 is entered, it examines the pending hardware interrupts to determine which occurred as a result of some action by the tracing program 7. If it determines that an interrupt was caused by the tracing program 7, it takes its YES exit to step 185. In step 185, tracing program 7 handles its own interrupt through its interrupt handling routine, which is similar to standard interrupt handling routines such as found in the OS/360 Primary Control Program. Upon completion of handling this interrupt by step 185, tracing program 7 unconditionally branches to step 180 to determine the existance of any other pending interrupt. It is possible for the tracing program 7 to sequentially handle plural interrupts.

If as a result of the tracing program 7, another interrupt is pending, steps 182 and 185 will reiterate. If on the other hand step 182 finds that a non-tracing program interrupt is pending, it takes its NO exit to step 183.

Step 183 sets an interrupt bit to identify any pending non-tracing program interrupts, which will be handled by the normal non-tracing program interrupt handler found in the system, for example an OS/360 interrupt handler.

Controls are set by subsequent steps in a manner which permits the tracing program 7 to gain control back as soon as the interrupt has occurred. This is done by going to FIG. 7A. The traced program will then be this non-tracing program interrupt handling routine, since it sequentially occurs next during the execution process when a non-tracing program interrupt occurred. Accordingly the next instruction to be traced will be the first instruction in this interrupt handler, which for example might be in the operating system.

In order to handle such a situation, step 191 stores the address within the old PSW (Program Status Words) into work area 7B in preparation for temporarily leaving tracing program 7. Upon the interrupt, the old PSW will contain the address of the last instruction executed by tracing program 7. However this would be a wrong address because the proper return address to tracing program 7 is the beginning of analysis routine 17. Step 192 changes the address in the old PSW by the post-analysis routine 14E posting the correct return address into the old PSW. Then step 193 stores the address in the PIC 12 into the work area 7B, so that the traced program now interrupted can resume execution at its point of interruption at a much later time.

In step 196, the address in the new PSW determines the location in traced program 9 to which the interrupt will transfer control. This will be to the first instruction in the interrupt handler.

Accordingly step 197 sets PIC 12 to the address in the new PSW, which is the address of the next instruction to be executed and traced, i.e. the first instruction of the interrupt handlingprogram. Then step 198 is entered. This is where the interrupt is permitted to occur as a function of the hardware. Then step 199 represents the next instruction to be executed and traced, which is the first instruction in the non-tracing program interrupt handling routine.

Then exit E2 is taken from FIG. 7E to FIG. 7A to enter step 120, which may begin another iteration for the execution and tracing of the next instruction according to the active iteration cycle 120–199, which has been explained.

However a passive or quiescent iteration cycle is available during periods when a traced output is not required, but where a traced output may be required later. To permit later activation of tracing, a quiescence loop 129*a* is entered which continues the tracing program control over all program execution in the system. If the tracing program relinquishes control to ordinary execution by the traced program, circumstances can arise which may prohibit the tracing program from again gaining control. In the latter case, an IPL (initial program load) must be initiated to gain control. Thus in this embodiment, either the active loop or the quiescence loop is used to permit continuous control by the tracing program over the entire system from the time an IPL is initiated.

Quiescence loop 129*a* permits execution at a maximum speed under control of the tracing program by avoiding most of the steps found in the active iteration loop 120–122, 123–199. Thus the quiescence execution cycle, for example, may run at three times the instruction execution time as the active execution cycle on the same computer system. The quiescing of tracing by external control permits the precise determination of the initiation of a trace, as well as termination of the trace function. Accuracy of external control can, under some conditions, be determined to an instruction in the traced program.

The operator at the direction of the program analyst can indicate at any time during execution of the traced program 9 through external control, such as by console manual key entry, whether tracing is to be quiesced. The quiescing of tracing by external control permits the precise determination of the initiation of a trace, as well as termination of the trace function. Accuracy of external control can under some conditions be determined to an instruction in the traced program.

Step 121 controls the path taken as a result of the setting on of the external control bit. If no external intervention has been applied, the external control bit will remain off, which is its initialized state. When reset in off state, the NO exit from step 121 is taken to step 122. The no-sampling bit controls the operation by step 122 in the manner previously explained.

However if the external control bit has been set to its on-state by the operator of the computer system at any time prior to step 121 being reached, step 121 takes its YES exit to step 133 in the quiescence loop 129*a*. This bypasses the initial steps in loop 129*a*, i.e. its no-sampling bit control steps 130, 131, and 132 to speed up the execution of loop 129*a*.

Accordingly the on-state of the external control bit causes it to over-ride all control by the no-sampling bit, whether on or off. Since step 132, for resetting the no-sampling bit is bypassed, the no-sampling bit retains its prior setting until after the quiescence loop 129*a* has completed its operation under control of the on-state of the external control bit.

The use of the quiescence loop 129*a* is also controlled by any of the types of sampling information which may have been entered during initialization in FIG. 6 at either steps 104, 105 or 106. As previously explained, sampling may be entered by the operator from his console during execution under tracing program control, or initializing sampling parameters may have been entered in machine-readable form at step 104 to automatically cause sampling either during periodic time periods or during periodic instruction counts. Of course there need not be any samplings performed at all, in which case the active cycle is always used. The embodiment chooses between the active loop and the quiescence loop by the state of the no-sampling bit. Its setting is controlled by operation of step 172–175 in FIG. 7D to signal the termination of a sampling period or count.

The state of the no-sampling bit after steps 172–175 is tested on the next iteration by step 122 which chooses between the active loop or the quiescence loop. The quiescence cycle is entered when step 122 finds the no-sampling bit on, in which case it takes the YES exit to step 130.

Then step 130 decrements a counter which controls the termination of the sampling period or count. For example, if sampling termination or activation is a periodic function of a number of executed instructions, step 130 would decrement the current instruction count by one. On the other hand, if sampling termination or activation is a function of the expiration of a time period, the counter would be decremented by an interval of time equal to the execution time for the last executed instruction. The particular interval of time is obtainable from a table giving the time for each executed instruction. But if the sampling is controlled by the operator, the operator intervention forces step 130 to complete the count, thereby ending its decrementing operation and indicating a termination or activation of a sampling period. This provides overriding control by the operator.

After step 130 has decremented the sampling counter in whatever fashion is appropriate at this point step 131 is entered to determine if the count has been exhausted, i.e. if it has reached a predetermined value which will indicate that sampling should be resumed. In this case, the YES exit from step 131 enters step 132 which resets the no-sampling bit thereby indicating that sampling should be resumed. Step 132 then proceeds to step 133.

On the other hand, if step 131 finds that the sampling count is not completed, it takes the NO exit to step 133.

In preparation for the instruction execution step 136, it is necessary to use the hardware registers 11 with the information on the last discontinued point in the execution of the traced program found in the pseudo registers 13 and PIC 12. At this time the hardware registers 11 reflect the current state of the tracing program 7. Accordingly step 133 stores the tracing program register contents in the hardware registers into the HRWA (hardware register work area) 16. Then step 134*a* loads the content of pseudo registers 13 into the hardware registers 11 where their contents may be more efficiently manipulated.

The address from PIC 12 locates the instruction to be executed during the current iteration of quiescent loop 129*a*. However to prevent loss of control by the tracing program, that instruction is indirectly executed as the subject instruction of an "execute" instruction. Hence the hardware instruction counter only addresses the "execute" instruction within the tracing program, and never addresses the executed instruction in the traced program. Then PIC 12 is advanced by step 135 to the address of the traced instruction to be executed during the next iteration; such address may be sequential or non-sequential.

Then the current instruction in the traced program is executed as the subject of an "execute" instruction, as addressed by the last transferred PIC content (found now in a hardware register) as an index for accessing and executing the current instruction in the traced program 9 at the location of that instruction in the traced program 9. Hence the traced instruction is not moved to any common area, or to any TIEA as is done when tracing output is generated. The quiescence loop consists of a minimum of operations needed to permit the tracing program 7 to retain control over the system.

After execution by step 136 of the traced program instruction, step 137 is entered to restore the hardware registers 11 from HRWA back to their state in the tracing program 7 at the point where it was discontinued after step 133. Thus the tracing program 7 is ready to continue its execution after step 137.

Then step 121 is reentered by the tracing program 7 copying the content of the PIC 12 into one of the hardware registers. This PIC value addresses the next traced instruction due to its advance by step 135. Then step 122 tests if the no-sampling bit is still on, which is a function of steps 131 and 132 in the quiescence loop. If the no-sampling bit is still on, the quiescence loop is reentered and recycled. And this occurs until step 131 finds that the count has been completed. Thus eventually step 122 will find the no-sampling bit is off, and the NO exit will be taken from step 122 to step 123 for entering the analysis routine 17, thereby resuming the full tracing operation of the system.

The tracing operation continues as long as required, while concurrently providing blocked output records 7C on an I/O device medium, such as on magnetic tape. Thus it contains a trace record on every instruction executed in the traced program(s), every interrupt caused by the traced program(s), and every sampling termination for the traced program(s). This complete output record of the trace can thereafter be used as an input to make any kind of an analysis required without having to re-run the tracing program with the same data.

FIG. 8 illustrates an overall block diagram of a trace analysis and report system which receives the single-time traced output from the tracing program and analyzes it according to the requirements of a particular user for concurrently generating one or more reports. Thus in FIG. 8 magnetic tape 201 represents the output generated by the programming system described in FIGS. 7A–E. Tape 201 provides the input to a program 202 which is user-tailored and operates from the single-trace input data to provide multiple analyses and multiple output reports. A keyword input 203, which may be contained in a deck of punched cards, is read into the system to input the user requirements for tailoring program 202 to the user needs for generating particular types of output reports required. Program 202 is shown in detail in FIGS. 9A–9M.

With the keyword input 203, the user parameters are inputted to the program 202 which thereupon uses the parameters to self-generate the tailored program using macro-instruction and subroutine procedures. In this manner the program 202 is self-generative based on user specified keyword input 203; and program 202 is thereby tailored to the requirements of the particular user for generating desired reports 206*a–n*.

Program 202 comprises three phases: Phase 1 is the input and program self-generation phase in which keyword input 203 is received and the overall program is self-generated on the basis of insertion of the keyword parameters. Phase 2 is the instruction analysis phase, in which the tailored program analyzes the trace records on input tape 201. Phase 3 is the report generation phase in which the output of phase 2 is edited to the report form required and the reports 206*a–n* are generated and printed on an output device as the output of the analysis and report system.

Analyzing program 202 is shown in detail block form in FIGS. 9A–M.

Figure 9A:
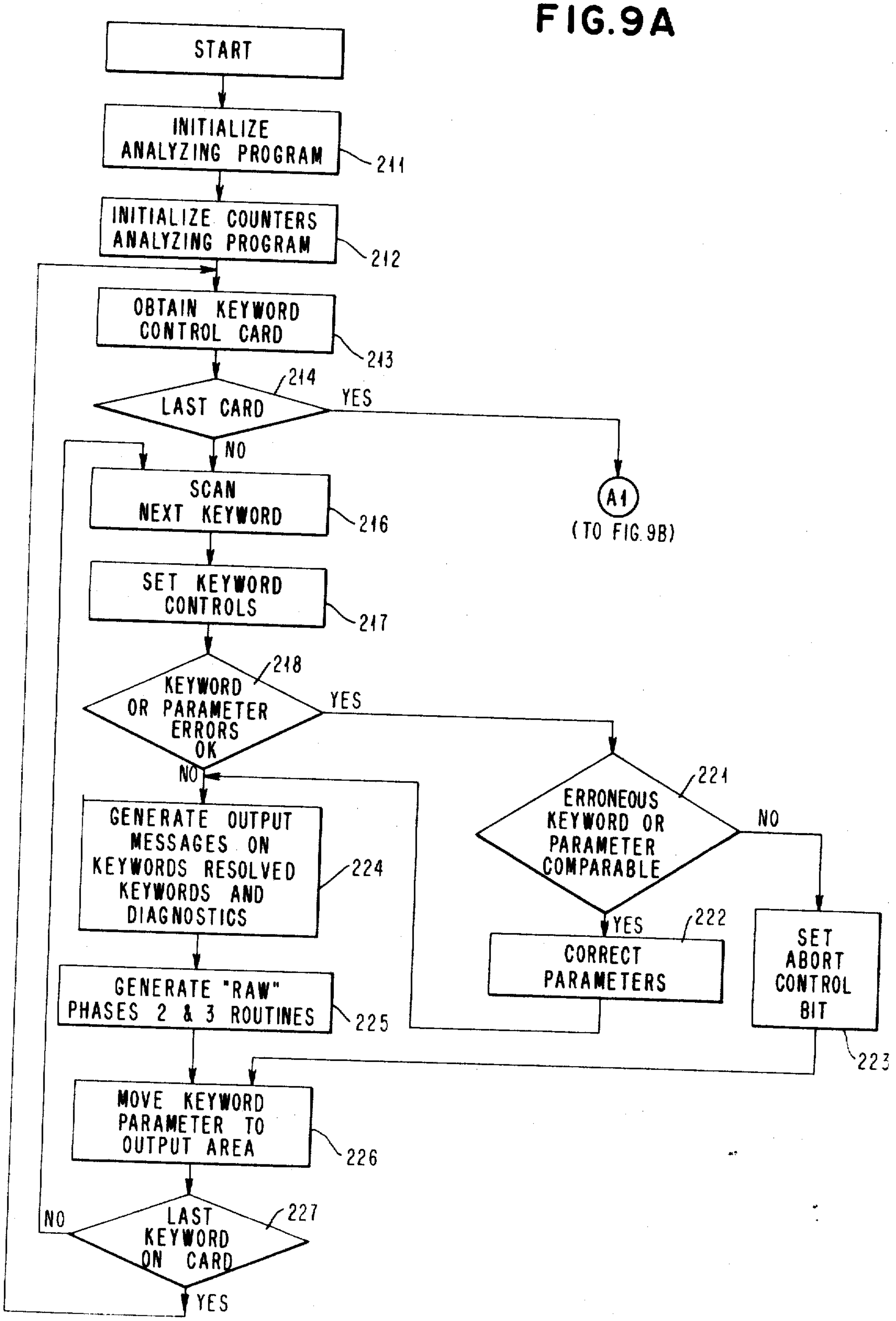

In FIG. 9A, the program is started by first causing its loading and basic initialization. Step 211 initializes phase 1 of the program by setting up switches in memory, clearing counters, initializing values in other counters, setting up read-in and write-out areas, and initializing the required control constants. Step 212 is then entered to provide other initialization used by all three phases, including the initialization of counters, area controls, pointers and pointer tables, interface data, and defining input and output buffers and data sets.

After initialization, the program is ready to begin the inputting, analysis and preliminary generation of code for the analysis of keywords and the generation of code for phases 2 and 3. Thus step 213 is entered to obtain one keyword control card, which may contain one or more keywords in free form. Each keyword specifies a particular parameter which calls a routine in a manner similar to a macro-instruction skeleton. A macro-instruction skeleton results in a macro-instruction expansion containing the effect of the keyword parameters. However, unlike a macro-instruction, in program 202 this process occurs during the object phase rather than during the assembly phase. The following provides examples of keywords and their effect upon the analysis program 202 as dependent on specific user requests for generating unique analyses and reports.

TABLE I (KEYWORD SUMMARY)

| KEYWORD = PARAMETER(S) | PARAMETER EXPLANATION |
|---|---|
| DEFAULT, | |
| REQUEST=OPCODE,IC,EFFECTIVE ADDRESS,LENGTHS, | |
| TIME= {40, 50, 65, 75, 9020,} | where the parameter identifies S/360 machine model for which time is to be traced. |
| PRINT {TAPE, or ONLINE,} | {ALL, or SUMMARY,} |
| SKIP= XXXXXX, | where XXXXXX is a six-position right-justified decimal value, with leading zeros or blanks, |
| PROCESS=XXXXXX, | where XXXXXX is a three position right-justified decimal value, with leading zeros or blanks, |
| VOLUMES=XXX, | where XXX, is a three position right-justified decimal value, with leading zeros, to a maximum of **255** |
| OPTYPES=RR, RS,RX,SI,SS,EXEC OBJECT, UNDEFINED OPS, | |
| INSTRUCTIONS= | {ALL, STANDARD DECIMAL DIRECT, PROTECTION FLOAT POINT,} |
| INSTRUCTION COUNT= | {ALL, NONE SAMPLE, OPS USED, OPS NOT USED,} |

REQUEST INSTRUCTIONS=op.code,op.code, . . . op.code,
op. codes are two positions in hexadecimal notation to a maximum of 255 op. codes REQUEST PAGES = XXXXXX, YYYYY, ZZZ,
where XXXXXX is a six-position right-justified hexadecimal address with leading zeros denoting the starting location of the first page; where YYYYY is a five-position right-justified decimal value, with leading zeros or blank specifying the size of the desired page in bytes; and where ZZZ is a three-position right-justified decimal value, with leading zeros or blanks, specifying the number of pages desired to a maximum of 511 pages.

RELOCATE= algorithm code,

REQUEST ADDRESSES=
address, address, . . . ,address,
where address is six positions in hexadecimal notation to a maximum of 255 addresses.

REQUEST RANGES=
address (low)-address (high), address (low)-address (high), . . .–. . . ,address(low)-address (high),
where address is six positions in hexadecimal notation to a maximum of 511 sets of addresses .(period) used as the control card data set terminator. The period (.) must appear as the last character on the last control card.

TABLE II (EFFECT ON OUTPUT OF KEYWORDS)

DEFAULT, Provides:
OPCODE,
IC,
EFFECTIVE ADDRESS, (effective addresses one and two)
LENGTHS, (lengths for operand fields one and two)

REQUEST= Provides:
Any combination, or any one, of allowable sub-parameters (except that onlyone TIME= . . , option is permitted).

PRINT= . . . ,ALL, Provides:
Print data set that furnishes options associated with either DEFAULT, or REQUEST= . . . , PRINT= . . . , SUMMARY, Provides:
Suppression of either DEFAULT, or REQUEST= , Options, and Provides only end-of-run summary reports.

SKIP=XXXXXX,
(to a maximum of 999,999 records) provides the passing over and non-processing of the number of physical records indicated by XXXXXX. The value of XXXXXX is six-positional, decimal, is right-justified with leading zeros or blanks. (The END OF RUN print out will provide a count, however, of all records read including those skipped.)

PROCESS=XXXXXX,
(to a maximum of 999,999 records) provides the processing of the number of physical records indicated by XXXXXX. The value XXXXXX is six-positional decimal and is right-justified with leading zeros or blanks.

VOLUMES=XXX,
(to a maximum of 255) indicates the number of trace tape volumes that are expected to be processed. The default value of XXX is 001. The value XXX is three positional decimal and right-justified with leading zeros.

OPTYPES= . . . Provides:
Data for the specified subparameters. (EXEC OBJECT) separately identifies the involvement of each operation code that was the subject of an execute instruction.

UNDEFINED OPS,
Identifies the involvement of any "currently" nondefined operation code within the System/360 instruction set. (The use of any contemplated instruction can be determined with this option.)

INSTRUCTIONS=ALL, provides:
Involvement of instructions, segregated by set for:
standard instructions
decimal instructions
direct control instructions
protection feature instructions
floating-point feature instructions.

INSTRUCTIONS=(other than ALL,) provides:

Data on the specified sub-parameters.

INSTRUCTION COUNT=ALL, provides:
Usage and non-usage, of each operation code (suitably segregated), specified by the OPTYPES= and/or INSTRUCTIONS=Sub-Parameters.

INSTRUCTION COUNT=NONE, by-passes the summary reports for all options other than REQUEST ADDRESSES=, REQUEST INSTRUCTIONS=and REQUEST RANGES=, INSTRUCTION COUNT=OPS USED, Provides:
Data only on those instructions (specified by the OPTYPES=and/or INSTRUCTIONS=subparameters) that were not executed while the tracing program was in control.

INSTRUCTION COUNT=SAMPLE, provides:
Information that identifies the point at which sampling terminated, (subject to the tracing program control card option) began and ceased.

REQUEST INSTRUCTIONS=provides:
Data on the execution of the individually identified operation codes specified as sub-parameters in this option. This option is punched as:

REQUEST INSTRUCTIONS=XX,XX, . . . XX,
(to a maximum of 255) where XX refers to the operation code in hexadecimal notation.

REQUEST ADDRESSES=provides:
An access count for each address location identified as sub-parameters in this option. The counts indicate the frequency of use of each specified address location.
This option is punched as:
REQUEST ADDRESSES XXXXXX,XXXXXX, . . . ,XXXXXX, (To a maximum of 255) where XXXXXX refers to a storage location address in hexadecimal notation.

REQUEST RANGES=provides:
A count of all memory accesses in the ranges specified as sub-parameter sets in this option. The counts indicate the frequency of use of the respective ranges.
This option is punched as:
REQUEST RANGES=XXXXXX — XXXXXX, XXXXXX—XXXXXX, . . . XXXXXX—XXXXXX, (To a maximum of 511 sets of addresses) where the first six X's represent the lower boundary and the second six X's represent the upper boundary of the range in hexadecimal address notation.
Output counts for the REQUEST INSTRUCTIONS=, REQUEST ADDRESSES =, and REQUEST RANGES=, options are printed in decimal notation up to 2,147,483,647. Counts in excess of this figure are provided in hexadecimal notation to a maximum of FFFF FFFF FFFE.

REQUEST PAGES = XXXXXX,YYYYY,ZZZ permits a maximum of 511 pages (ZZZ), of width to a maximum of 99,999 (YYYYY) bytes, and starting at address XXXXXX (hexadecimal).

RELOCATE = algorithm code, provides relocatability analyses subject to the stated algorithm.

TABLE III

(EFFECT OF MUTUALLY EXCLUSIVE KEYWORDS)

The following keywords are mutually exclusive. Except for the sets indicated at the end of this section, the exclusive keyword met first directs the output of the analysis program. Presence of mutually exclusive keywords results in an error message but does not abort the run unless multiple errors are jointly present.

(1) MUTUALLY EXCLUSIVE KEYWORDS
DEFAULT, and REQUEST =
PRINT=TAPE, and
PRINT=ONLINE, ALL, and
SUMMARY,
INSTRUCTIONS=ALL, and
INSTRUCTIONS=
STANDARD, or DECIMAL, or DIRECT, or PROTECTION, or FLOAT POINT,
INSTRUCTIONS=ALL, and INSTRUCTION COUNT=
OPS USED, or OPS NOT USED,
INSTRUCTION COUNT=ALL, and INSTRUCTION
COUNT=NONE, or SAMPLE, or OPS USED, or OPS NOT USED,
REQUEST PAGES=, and REQUEST RANGES=,

TABLE IV

(RESULT OF CERTAIN KEYWORD CONFLICTS)

DEFAULT, and REQUEST=,DEFAULT, is set.
PRINT=TAPE, and PRINT = ONLINE,PRINT=ONLINE,is set.
PRINT=, , , ALL, and PRINT=. . . ,SUMMARY, ALL, is set.
INSTRUCTIONS=ALL, and INSTRUCTIONS=. . . ALL, is set.
INSTRUCTION COUNT=ALL,and INSTRUCTION COUNT=NONE, ALL, is set.
INSTRUCTION COUNT=. . . ,OPS USED, and INSTRUCTION COUNT=. . . , OPS NOT USED,That option encountered first is set.
REQUEST PAGES =, and REQUEST RANGES =, REQUEST PAGES, is set.

Step 214 senses whether the last card in the keyword deck of cards has been reached. This is done in the conventional manner, and in this case tests are performed for an end of file condition from the card reader or for a period in the last card read. Assuming that the last cord has not be reached, step 216 through the NO exit of step 214 is entered. Step 216 scans the last card to determine the next keyword parameter. In general the keywords are syntactically defined by a comma separation, or by an equal sign. Also a keyword may span from the end of one card to the next card.

Step 217 is entered next to set the keyword controls. The keyword controls are programmed bits in a keyword control area which rare used in conjunction with a keyword table. The keyword table is initialized to include all valid keywords available in the language which a programmer may use to interface with the analyzing program. Among other things, the switches set up by the inputted keywords select keywords in the table and resolve any existing or potential conflicts between keywords chosen by the user. Thus when specified more than once, only the first specification of the keyword may be effective. If conflicting keywords are provided a particular one will be selected. Also if no keywords of the required critical type are given the program will automatically assign, by default, the required keywords to provide a basic analysis (which in effect provides all output data on instruction usage).

Step 218 is entered to determine if any parameter errors may exist. Such errors may or may not be catastrophic. For example, the types of errors checked for may be: correctness of spelling of keywords (and recovery, where possible, in the case of misspelling); an invalid combination of keywords provided (although the specification of the intent may be clear thereby permitting certain conflicting keywords to be ignored); syntactic errors; too many keywords beyond a numerical limit set in order not to tax allocated memory space or so that the program will not exceed storage size availability.

If step 218 finds that an error exists, its YES exit is taken to step 221 which determines if the erroneous keyword or parameter is correctable. If, for example, the error is an inversion of address limits the addresses are reverted to the correct sequence. If correction can be made, the YES exit is taken. Correction is done by step 222. When this keyword is corrected, step 224 is entered.

On the other hand if step 221 finds that the keyword or parameter is not correctable, its NO exit is taken to step 223 which sets an abort control. The abort control is a matter of setting a program bit in core storage. When the abort control is on it indicates that after all keywords scanning is completed, the control will be examined to determine if processing should be ended. Step 226 is entered after the setting on of the abort control bit.

If all parameters are correct, or were corrected, step 224 is entered to generate output messages stating the existing keywords, the resolved keywords, and diagnostics, if any, on the particular keyword handled.

Step 225 then generates "raw" phase 2 and 3 routines. This is done by the table of keywords which had a switch set as a function of keyword input or resolution. That keyword selected in the table by having its switch set provides a pointer to a routine. This routine is thereby accessed and in turn is executed to generate one, or more, "raw" unlinked routines for phases 2 or 3.

Step 226 moves the keywords, resolved keywords, and diagnostics, to an output area for eventual outputting to the user via a printer, tape or other I/O device specified by the user.

Then step 227 checks whether the current keyword is the last complete keyword on the card being processed. If not, indicating that more information may be processed, the NO exit is taken to step 216 to scan the next item on that card. Accordingly this process of scanning the next keyword occurs recursively until step 227 senses the last keyword on the card. In this case, its YES exit is taken to step 213 which obtains the next keyword control card and actions occur similarily for it as previously described.

Then step 214 is entered to test if the previously read keyword control card was the last card in the deck, as previously explained. If not, this card is handled by scanning its keywords in sequence with the reiteration of steps 216–227 per keyword in the manner previously explained. On the other hand if the last completely handled keyword control card was the last card in the deck, then step 214 takes its YES exit to FIG. 9B, where it enters step 231.

Figure 9B:
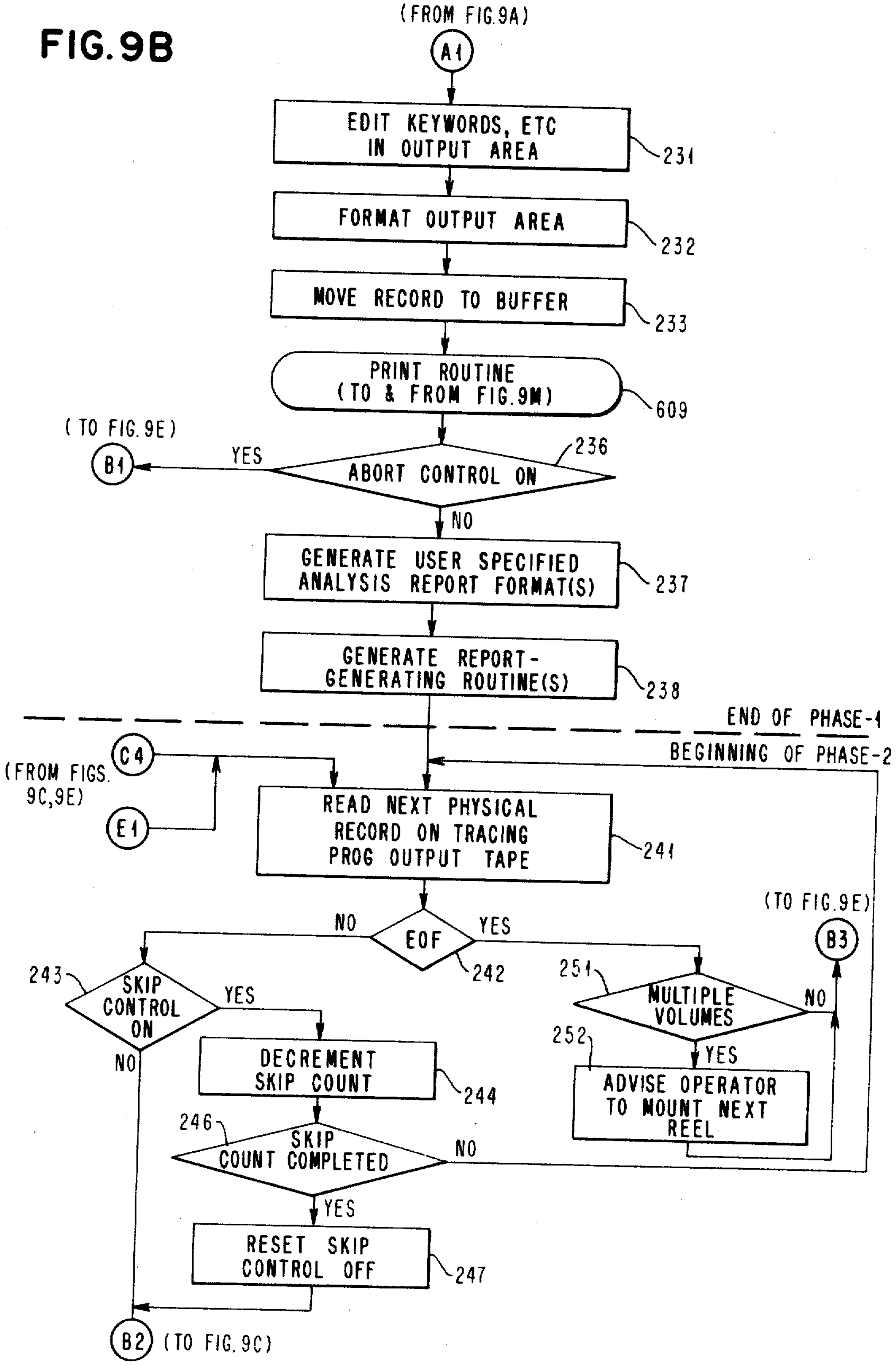

In FIG. 9B, step 231 edits the keywrods, resolved keywords, parameters, and diagnostics in the output area. This editing process acts to identically print the card information if there are no errors found in it. If there are errors found, the information is printed as modified and as originally specified along with a diagnostic message.

Then step 232 is entered to format the output record by placing the information in a prespecified message form. Then step 233 moves this information record to an output buffer area so it can be picked up by a print routine 609 shown in FIG. 9M. (Thus step 609 in FIG. 9B may be nothing more than a linking address which causes entry to the routine shown in FIG. 9M. The print routine on FIG. 9M will be explained in detail later.) In general the print routine causes the data in the buffer to be outputted to a device, such as a printer, magnetic tape, or disk.

Then in FIG. 9B step 236 is entered to determine if the abort control is on. The abort control bit would have been set by step 223 in FIG. 9A if step 221 had determined that an erroneous keyword, or parameter, was not correctable. If the abort control bit is set on, then the YES exit is taken to FIG. 9E to print step 609 (after step 327) and then to step 328 to end operation of the program.

Under normal circumstances in FIG. 9B step 236 finds the abort control bit off and takes the NO exit to step 237 where one or more user specified analysis report formats are generated. Then step 238 is entered to generate one or more report-generating routines for inserting the data into the formats generated by step 237.

This is the end of phase 1 which is the preparatory phase of the analyzing program. Phase 2 of the program is about to be enetered for actually receiving as input the traced records which were provided as an output of the tracing program during the single-trace run previously described and now available on tape 201 FIG. 8.

Thus step 241 is entered to read the next physical record on tape 201, which after the physical record byte count 7E (FIG. 4B) will initially be the first trace record 7D on that tape. The trace record 7D is read into a block in main memory to provide information on the first traced instruction. It is the information in this trace record 7D, and in the other trace records 7D, which will be operated upon by the report-generating routines to fill in the data for the user-specified analysis reports having the format generated in step 237. The first read physical record from tape 201 will generally contain a plurality of trace records. As previously explained, the physical records may comprise up to 4,096 bytes, while each trace record will include between four and 48 bytes.

Step 242 is entered after each physical record is read from tape 201 in order to test if an end-of-file record (EOF) has been reached. Whenever the EOF is reached, the YES exit is taken to step 251 to test if another volume of trace records was provided by the tracing program.

If step 242 finds that the EOF has not been reached, a condition that will normally not occur after the first record is read, its NO exit is taken to step 243 which tests if the skip control was set on.

Step 243 will find the skip control on if a SKIP keyword was entered at the user's option. The keyword and its associated parameter will specify the number of physical records which should be skipped in the course of analysis. The number of records to be skipped will follow an equal signal after the SKIP keyword as entered. Thus if the skip control is on, (as indicated by a bit switch set by the SKIP keyword and using a keyword entry in the keyword table) the YES exit is taken to step 244 to decrement the skip count. The skip count was initially received from a user inputted value (parameter) associated with the SKIP keyword.

Then step 246 tests if the skip count has been exhausted. If it is not exhausted the NO exit is taken from step 246 to step 241 to read the next physical record on the tracing program output tape 201. This may overlay the previously read record thereby destroying the first record and causing it to be skipped.

Figure 9C:
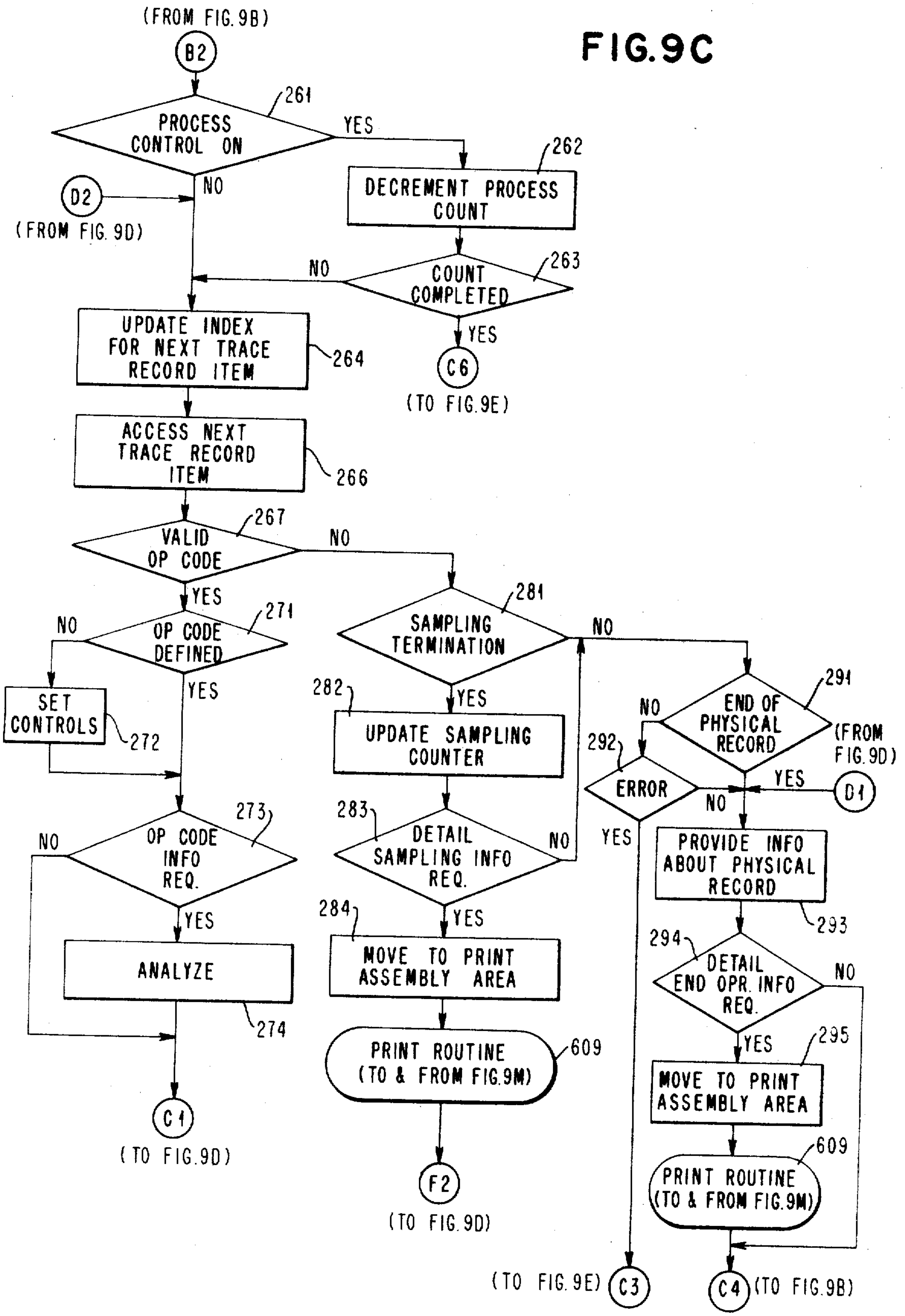

If step 246 determines that the skip count has been completed, its YES exit is taken to step 247 which resets the skip control bit off, and then exits to step 261 in FIG. 9C. However if step 243 had found the skip control off, then its NO exit would have been taken directly to step 261 in FIG. 9C.

In FIG. 9C, step 261 determines if the process control bit is on. The process control bit, like the skip control bit, is a binary switch programmed in core memory. It is used in conjunction with the PROCESS keyword entry in the keyword table. A number and an equal sign will be associated with the PROCESS keyword provided by the user. This number will indicate the number of physical records which are to be processed by the report-generating routines generated by step 238 to provide information in the formats generated by step 237 in FIG. 9B.

The value equated with the keyword PROCESS provided by the user as a parameter associated with the PROCESS keyword has been used to initialize a process count field. If the process control bit is on, the YES exit is taken to step 262 to decrement this process count by one to represent the current inputted physical record.

Then step 263 determines if the count is completed. Whenever the count is completed, the YES exit is taken to phase 3 of the program, FIG. 9E, for generating the reports and thereby completing the analysis output.

If step 263 finds that the process count has not been completed the NO exit is taken to step 264.

However if step 261 finds the process control off, (the user has not specified any process control keyword parameter) the NO exit to step 264 is entered in preparation for accessing the next item in the trace record, (which initially will be the first item).

Step 264 updates the index byte count for examining the next item in the trace record. Initially this index will be set to access the first field of the first trace record. (Which will be the operation (OP) code for the first trace record). This OP code will also indicate the length of the current trace record so that the next time step 264 is reached, its next updating will be controlled by the size of the current record as indicated by its OP code field. The relationship between the OP code field and the associated record size is indicated in FIG. 4A wherein the OP code type, indicated by the OP code, signals the length of the current trace record.

Step 266 access this OP code item as the first item in the trace record and step 267 determines if indeed it is a valid OP code in the instruction set being examined. If it is not a valid OP code, there may still be a valid trace record. (Such as a sampling termination record, or an interrupt record). Thus if it is not a valid OP code, the NO exit is taken from step 267 to step 281 to test if the record is a sampling termination record.

On the other hand, if it is a valid OP code, the YES exit to step 271 is entered to determine if it is an OP code defined in the instruction set for the machine being analyzed. If defined, the YES exit to step 273 is entered to determine if OP code information was requested by the user. But if step 271 signals that the OP code was not defined, the NO exit is used to enter step 272 to set the controls for OP code not defined. Then step 273 is entered.

Figure 9D:
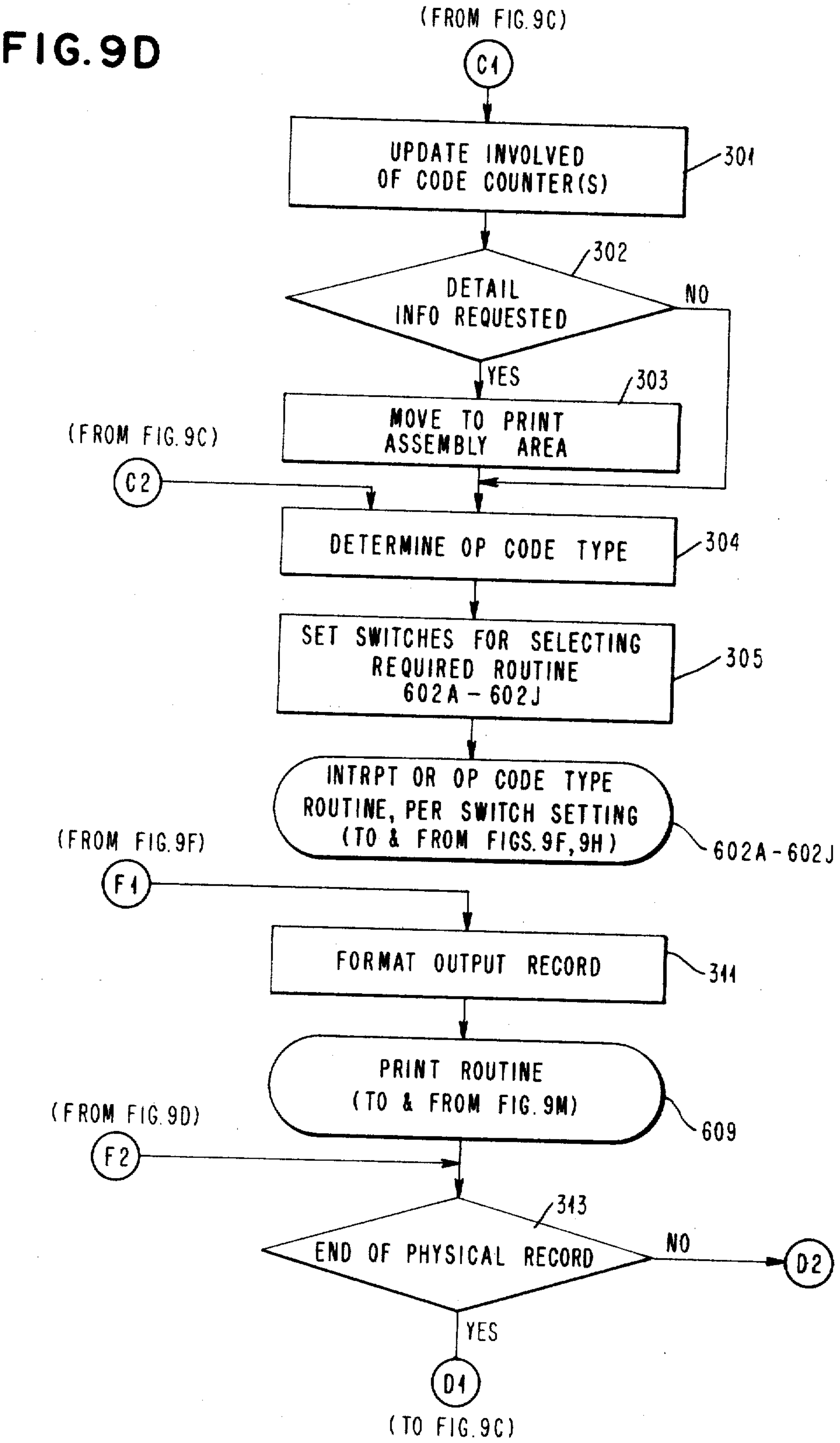

If step 273 finds that OP code information was requested by the user, its YES exit is taken to enter step 274 for analyzing the OP code information. Then step 301, FIG. 9D, is entered. However, if OP code information was not requested the NO exit is taken and the analyze step 274 is skipped so that step 301 in FIG. 9D is directly entered.

In FIG. 9D, step 301 updates the involved OP code counters, which may maintain a count of the number of times that the specified OP code, or the specified OP code types, are used during the execution of the program that was traced.

Step 302 in FIG. 9D is next entered to determine if a bit was set that results in the requesting of detailed OP code information. If set, the YES exit is taken to step 303 so as to move to the print assembly area OP code information on the particular instruction being analyzed. If the detail information bit is not set, the NO exit bypasses step 303, and step 304 is entered to determine the OP code type.

If step 281 in FIG. 9C is entered from the NO exit of step 267, the trace record may represent a sampling termination or an interrupt handling record. If step 281 determines that it is a sampling termination record, the YES exit is taken to step 282, where a sampling counter is updated. This is a programmed counter initialized originally to zero so that it can maintain a count of the number of sampling terminations encountered.

Step 283 is then entered to determine if the user had requested detailed sampling information via his keywords. If detailed information was requested, the YES exit is taken to step 284 to move the data to the print assembly area. Then the print routine 601 is entered on FIG. 9M and, when completed, causes a return to step 311 in FIG. 9D.

However it step 283 found that no detailed sampling information request had been made, this switch bit will retain its rest state and the NO exit will be taken to step 291 to test if the end of the current physical record has been reached by the current trace record. Similarily if step 281 determines that no sampling termination record exists, the NO exit to step 291 is entered to determine if the end of the current physical record has been reached. If it has not been reached the NO exit is taken and an error condition is tested for with step 292. If no error condition is found step 293 is entered by the No exit to provide information about the physical record. Step 293 is also entered by the YES exit of step 291 when an end of the current physical record has been detected.

Step 294 determines if there is detailed information required about the end of the physical record, as may have been requested by a keyword. If so requested, the YES exit is taken to step 295. In step 295 the detailed information is moved to a print assembly area. Then step 609 is entered to print the subject matter in the area. When step 609 is completed it returns control to step 241 in FIG. 9B for reading the next physical record from the tracing program output tape.

If no detailed information is required, step 294 takes its NO exit to step 241 in FIG. 9B for reading the next physical record.

Figure 9E:
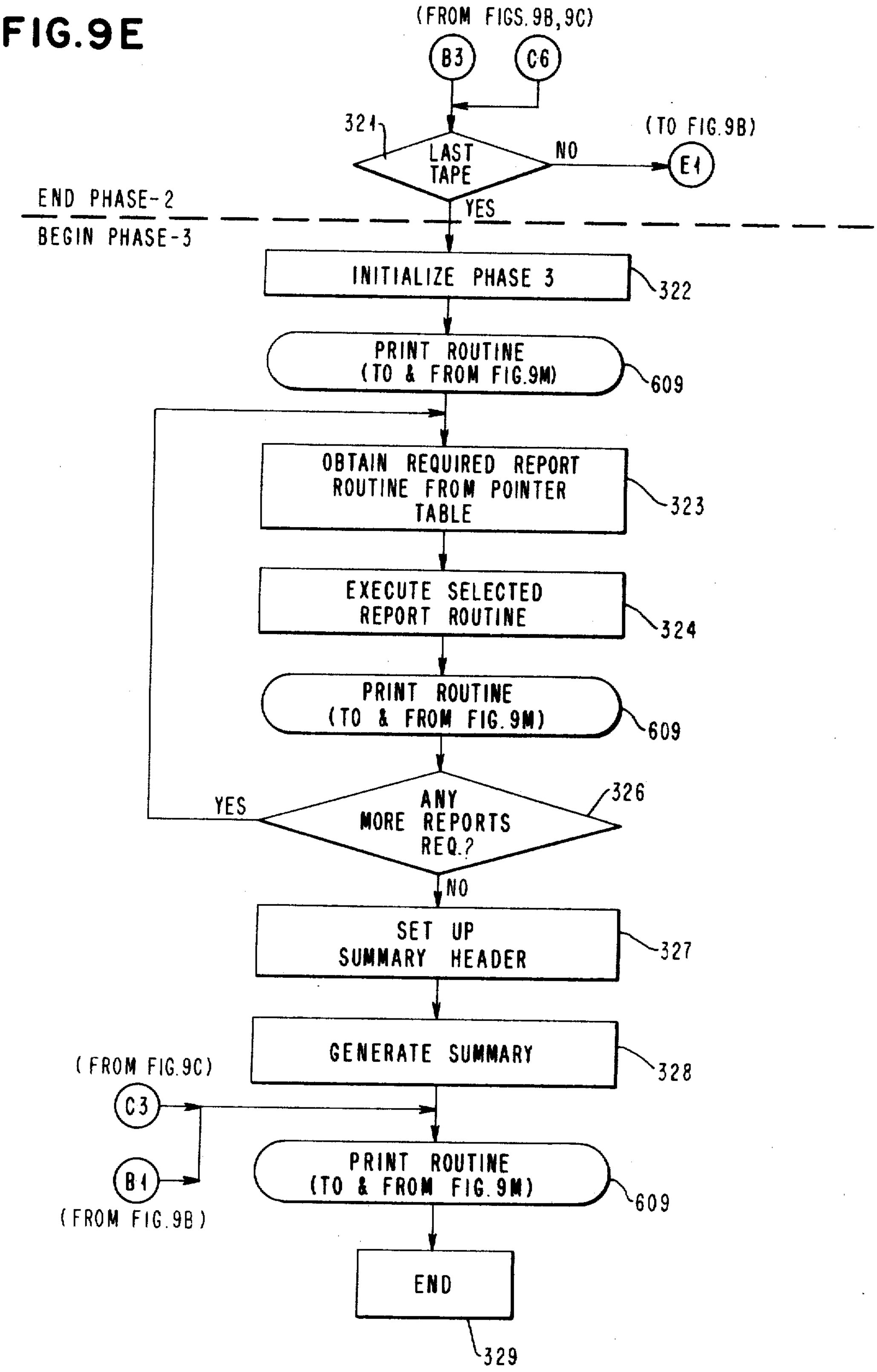

In the case where step 292 finds an error exits, its YES exit is taken to FIG. 9E where print routine 609 is entered to print out whatever is in the current buffer. Then step 329 is entered in the operation of the analysis program.

In FIG. 9D step 304 determines the OP code type and enters step 305 to set programmed switches for selecting a required routine. The selection is dependent upon the OP code type. The proper routine will be selected from one of the routines 602A – 602J. Then the next step is the entry and execution of this selected routine (which is one of 602A–J). These routines will be described in detail later. Let it suffice for now to state that return from these routines is to either step 311 or step 313 in FIG. 9D.

Return is to step 311 if detailed information was requested by the user specifying an ALL, keyword. On the other hand if the user specified the SUMMARY, keyword then no detail information was requested and step 313 will be entered.

Assuming that step 311 is entered, this step provides all of the information required by the format generated at step 237 in FIG. 9B during phase 1. This is the information which was provided by the particular routine 602A–602J that was selected and executed. The information was generated by particular routine 602A–602J and is formatted into an output record by step 311. Then step 601 is entered to print the format output record, or to output it otherwise on an I/O device such as magnetic tape for later printing.

Figure 9F:
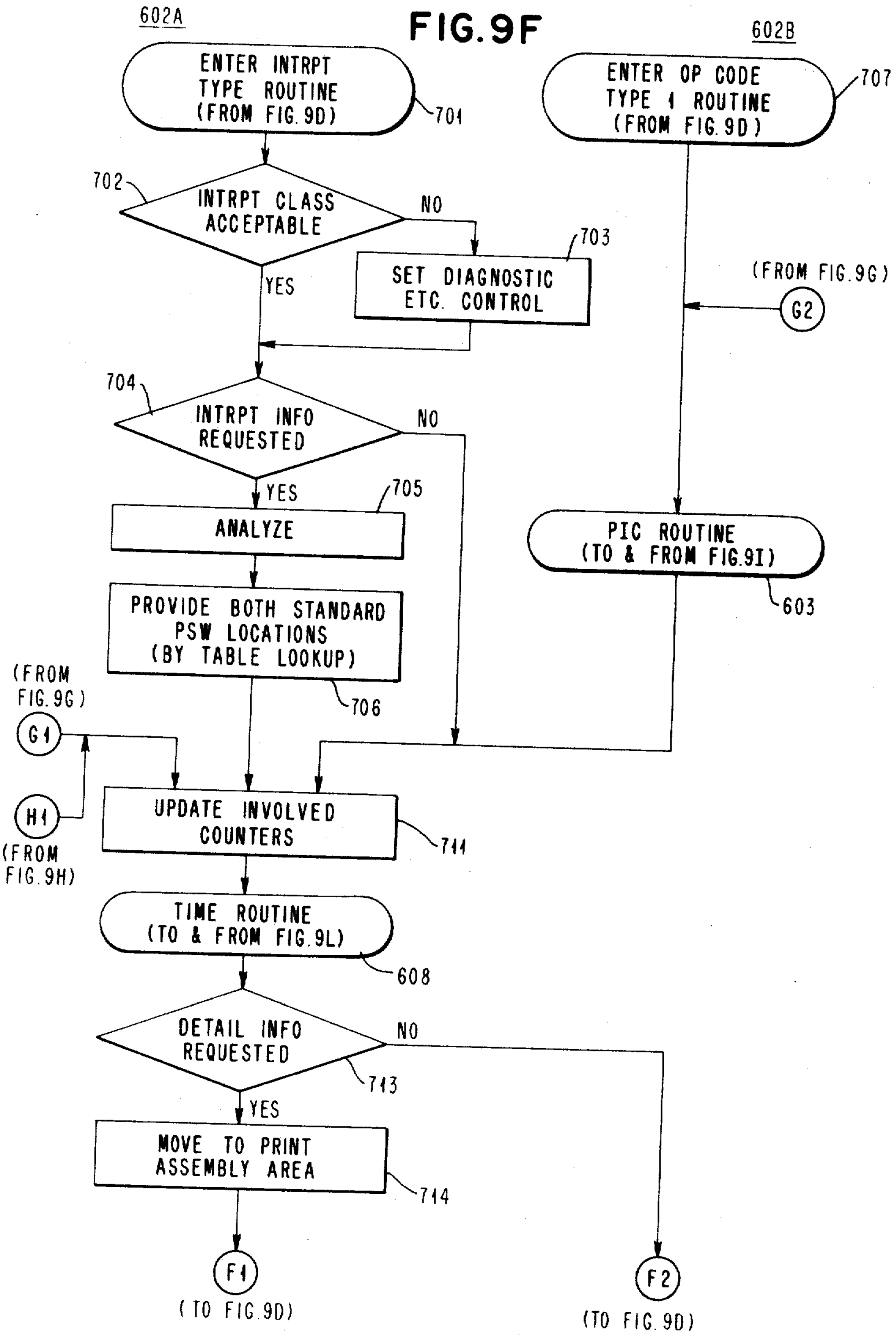

Step 313 is entered upon completion of the print routine 609 in the case that ALL, data were specified, or it is entered from step 713 in FIG. 9F if SUMMARY, data was specified. Step 313 tests to determine if the current trace record is the last in the current physical record. If it is not, the NO exit is taken back to step 264 in FIG. 9C to update the index for the next trace record item. If the last processed item is the last item of the trace record, then the next item will be the first item of the next trace record.

On the other hand, if step 313 in FIG. 9D found that the end of the physical record had been reached, then its YES exit is taken to step 293 in FIG. 9C to provide information about the physical record, as previously explained.

Thus when the method cycles back to either step 264 within a physical record, or step 293 at the end of each physical record, the process continues item by item, and trace record by trace record, until all trace records have been processed on the tape.

As shown by step 242 in FIG. 9B, indicating that an end of file has been reached on the current tape and step 251 showing that no more multiple volumes are to be processed, processing of trace tapes may cease. Furthermore the processing may end sooner, (that is before the EOF is reached) if a PROCESS=XXXXXX, keyword is provided. In that case processing quits when the number of records indicated by XXXXXX is reached even though that may be before the EOF is reached.

(This processing termination point is determined by step 263 in FIG. 9C when it determines that the count is completed. In this case its YES exit is taken to step 321 in FIG. 9E).

The YES exit from step 263 ends phase 2 processing and causes phase 3 to be entered. Similarily whenever step 251 in FIG. 9B uses its NO exit, phase 2 is ended and phase 3 is entered in FIG. 9E.

In FIG. 9E, step 321 initially tests if the current tape, which had just had its processing ended either by process record count or by EOF being reached, is in fact the last tape of a set. If step 321 finds that it is not the last tape, its NO exit is taken back to step 241 in FIG. 9B. By this time the operator has manually mounted any next tape specified by step 252 in FIG. 9B; and if it is not yet mounted, the system goes into (and remains) in a wait state until it is mounted and made ready.

Step 252 is entered when step 251 determines, on the basis of entries provided by the VOLUMES=keyword, that the input consists of more than one tape. Step 252 is entered through the YES exit of step 251. Step 321, after step 252 advises the operator to manually mount any next tape, is entered next.

If step 321 determines that the last tape has been processed its YES exit is taken to step 322. Thus the YES exit is the last operation in phase 2 and phase 3 is entered. Step 322 initializes it by performing the usual programming housekeeping routines of initialization (such as fetching the required routines from an intermediate storage unit into the required allocated positions in core memory in preparation for ultimate execution, initializing counters, clearing buffer areas, obtaining the required data produced by phase 2, etc.).

Then step 609 is entered from step 322 to cause execution of the print routine in FIG. 9M to output any data which may exist at this time in the print buffers as a result of the phase 2 operation, and to set up headers or labels for phase 3 in the print buffers for later outputting. Then step 323 in FIG. 9E is entered to obtain the location of the required report routine from a pointer table. This table comprises a listing of the respective reports required by the user as specified through the resolution of keywords in phase 1. These report entry locations in the table may be taken sequentially beginning with the first report position. Each report entry in the table contains a pointer to the report routine which generates that particular report. This table of report entries was set up by step 238 in FIG. 9B during phase 1 operation. Also step 238 generated the particular routines which the pointers address in the table.

Then step 324 executes the selected report routine by having it enter via the printer selected from the table in step 323.

After the report routine is executed, step 609 is entered from step 324 to output the particular information generated as a result of the execution of the report routine 324. The operation of the print routine may overlap the execution of the report routine.

Step 326 is entered to determine if any more reports are required. This is done by examining the table to see if an entry is contained after the current entry. If there is, the YES exit is taken back to step 323 where the next pointer to the next report routine is taken and that report routine is executed by step 324 and printed or outputted by step 609. Step 326 then examines if still more reports remain.

Ultimately all reports will have been printed, outputted, and the NO exist will be taken from step 326 to step 327, where summary headers are set up in the print buffer for labeling the summary report which will be printed out as a finale to the program operations. The summary report is always printed out and is not related to the SUMMARY, keyword (which only controls the operation of steps 323 and 324 thereby reducing the amount of the printed data to something less than would be obtained by the ALL, keyword which provides all detail data and summary data).

Then step 328 is entered for generating the summary data. (This is an overall summation of operations that occurred within the more detailed reports, such as for example a count of all instructions processed by the analysis program, the number of physical records read and processed by the analysis program, the number of sampling cycles which were counted during the segment of time being analyzed by the analyzing program, and the total CPU time for the specified CPU for which the analysis is being run. The CPU time factor would be obtained if a TIME=keyword was used so as to obtain the amount of time required to execute the analyzed program on any CPU. This need not be the CPU model on which this program was executed by the tracing program. (For example, the tracing program might have been executed on a S/360 Model 40 and the keyword may have requested the amount of time that such execution would require on an S/360 Model 91. The CPU time provided by the summary report would thereby give the amount of time on a CPU model 91 in nanoseconds.)

After the last print routine 609 is completed step 329 is entered in FIG. 9E to end the operation of the analyzing program.

The entire analyzing program has now been disclosed. However, certain routines referenced have not been described in detail. This will now be done using remaining FIGS. 9F–M.

FIGS. 9F–J illustrate the methods of analysis for the interrupt type routine and the OP code routines that process different classes of operation code.

Each of these ten types of routines is selected on the basis of the OP code filed in the trace record. In the case of an interrupt type trace record, the OP code field contains a particularly selected invalid OP code (such as, for example, all ones). The classes, or types of instructions, needing special routines are as follows:

| TYPE NUMBER OF ROUTINE | OP CODE TYPE | REF. NO. |
|---|---|---|
| Interrupt | Interrupt type | 602A |
| 1 | RR instructions | 602B |
| 2 | RX instructions | 602C |
| 3 | RS instructions that do not involve data shifting, but that involve data transfer (exclusive of LM and STM). | 602D |
| 4 | LM and STM instructions | 602E |
| 5 | RS Shift instructions | 602F |
| 6 | SI instructions that carry data | 602G |
| 7 | SI instructions that involve access to a storage location other than within the involved instruction byte stream. | 602H |
| 8 | SS instructions that invoke a single-length parameter | 602I |
| 9 | SS instructions that involve dual-length parameters | 602J |

In FIG. 9D, after step 305 has set the required switches for the selection of the required routine, a pointer table is entered by means of a displacement determined by the OP code field in the trace record being processed. The table contains pointers to the respective type routines required as a function of the OP code. Thus if any valid OP code is found, a pointer will provide an address to a particular routine. All OP codes of the same type will have the same pointers in order to enter the same routine. If an OP code is invalid, or undefined in the instruction repertoire, a pointer is provided which will direct to a routine (not shown herein) which may obtain special operations for such invalid OP codes. This may include examining for the possibility of a read error, or other error, which might have contributed to the existance of the invalid OP code. In the latter case it may be possible to recover by correcting the error.

In FIG. 9F, the interrupt type routine 602A is entered via the pointer previously mentioned in connection with step 305 in FIG. 9D. (It may be pointed out here that step 305 would choose the entry point of any of these OP code type routines 602A–J). Thus when step 701 is entered, step 702 is in fact the first step entered, since step 701 is nothing more than an identifying label for the routine. If step 702 determines that the interrupt class is acceptable, its YES exit is taken to step 704. On the other hand, if the class is not acceptable, the NO exit is taken to step 703 which sets controls that are bit positions indicating that certain diagnostic or other conditions may be required for eventual printout. Step 704 tests a field which indicates whether interrupt information has been requested as a function of the keyword input and of the resolution of inter-reacting keywords. If it was requested, step 704 takes its YES exit to step 705 which analyzes a particular interrupt information (such as the type of interrupt handled) and special conditions which may have been recorded in the trace record pertaining to that particular interrupt. Then step 706 provides both the standard new and old PSW (program status word) locations involved in the interrupt. This is done by table lookup for the particular interrupt since the old and new PSW's are fixed for a particular interrupt class. If the interrupt is an SVC interrupt then the particular interrupt code needs also to be provided as part of the analysis.

Step 711 is entered to update the involved counters. These counters depend upon the type of interrupt handled and count the number of times that this particular type of interrupt class has occurred. Other counters are involved in step 711, such as address counters, instruction counters, etc.

If the NO exit was taken from step 704, wherein no interrupt information was requested, step 711 is entered directly from step 704.

Next step 608 is entered. This is the time routine, FIG. 9L, that computes CPU times when requested.

Step 713 is next entered to determine if detailed information has been requested. If it is, step 714 is entered via the YES exit to move the analyzed data to the print assembly area for later output. Then an exit is taken to step 311 in FIG. 9D, as previously explained.

On the other hand, in FIG. 9F, if step 713 finds that no detailed information was requested, its NO exit is taken to step 313 in FIG. 9D. FIG. 9D thereafter operates in the manner previously explained. It is in this manner that interrupt trace records are handled and analyzed.

Type I routine 602B is entered at 707, which is a label causing entry into the PIC routine 603. (The PIC routine 603 is shown in detail in FIG. 9I.) The PIC routine determines various characteristics about the pseudo instruction count, which is the address of the traced instruction within the traced program while it was being traced. When completed the PIC routine 603 returns to enter step 711. From this step 711 it proceeds in the manner explained in regard to the interrupt type routine 602A.

Figure 9G:
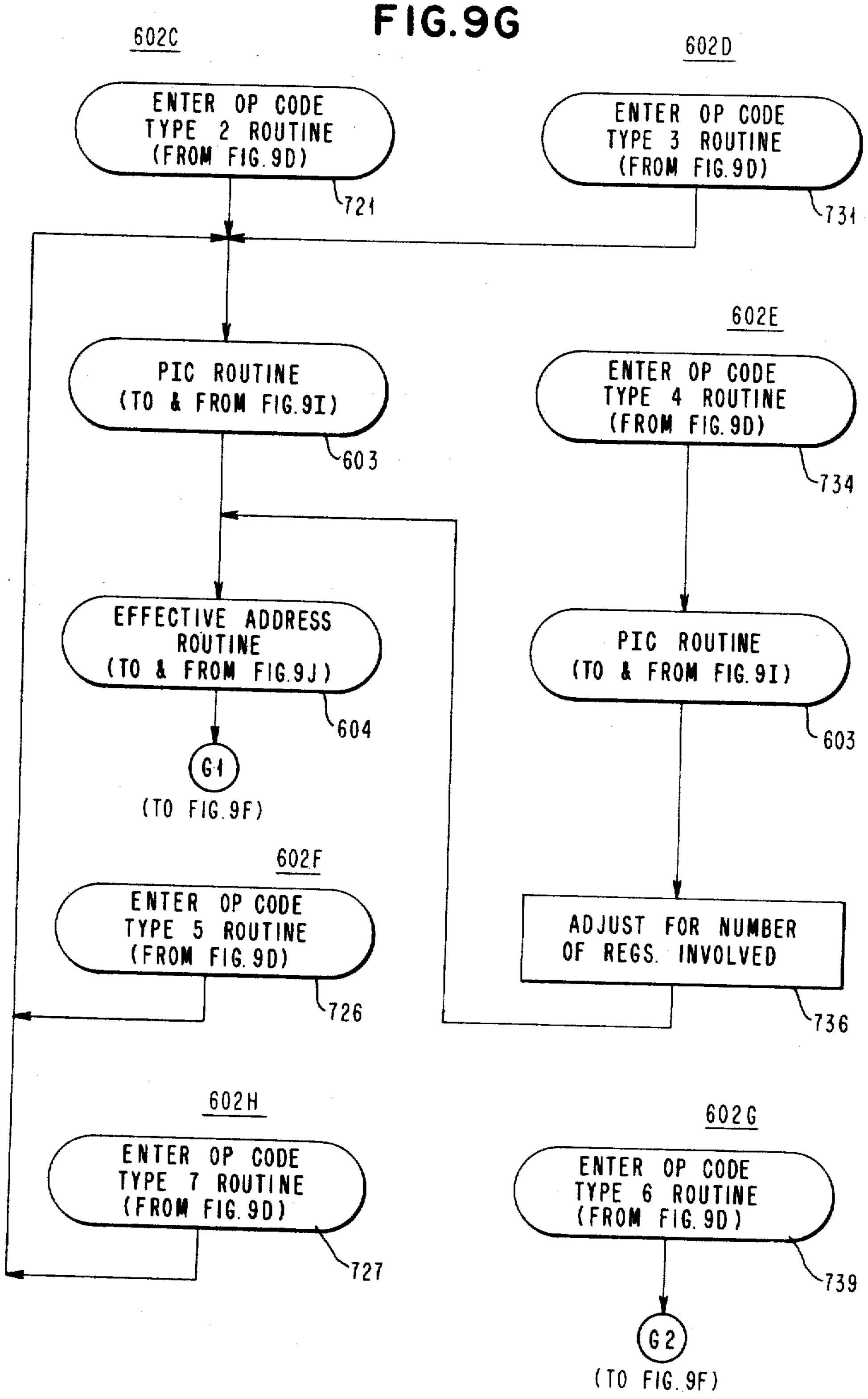

FIG. 9G illustrates entries into the routines for OP code types 2–7 labeled 602C–602H. Routine 602C is entered at label 721 which begins execution of the PIC routine 603 in FIG. 9I. After its execution, it enters the effective address routine 604 shown in FIG. 9J. The effective address routine 604 returns to step 711 in FIG. 9F and the processing is thereafter performed as previously described.

Routines 602D, F, and H, all operate identically to routine 602C.

Figure 9H:
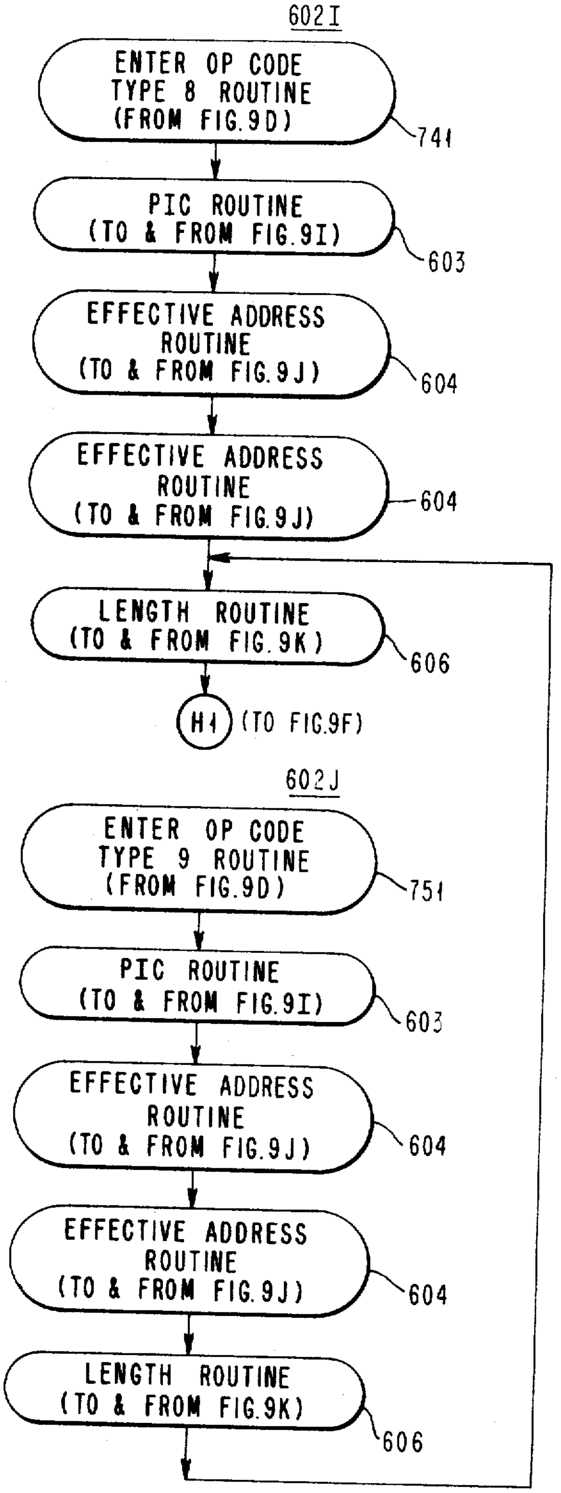
Figure 9I:
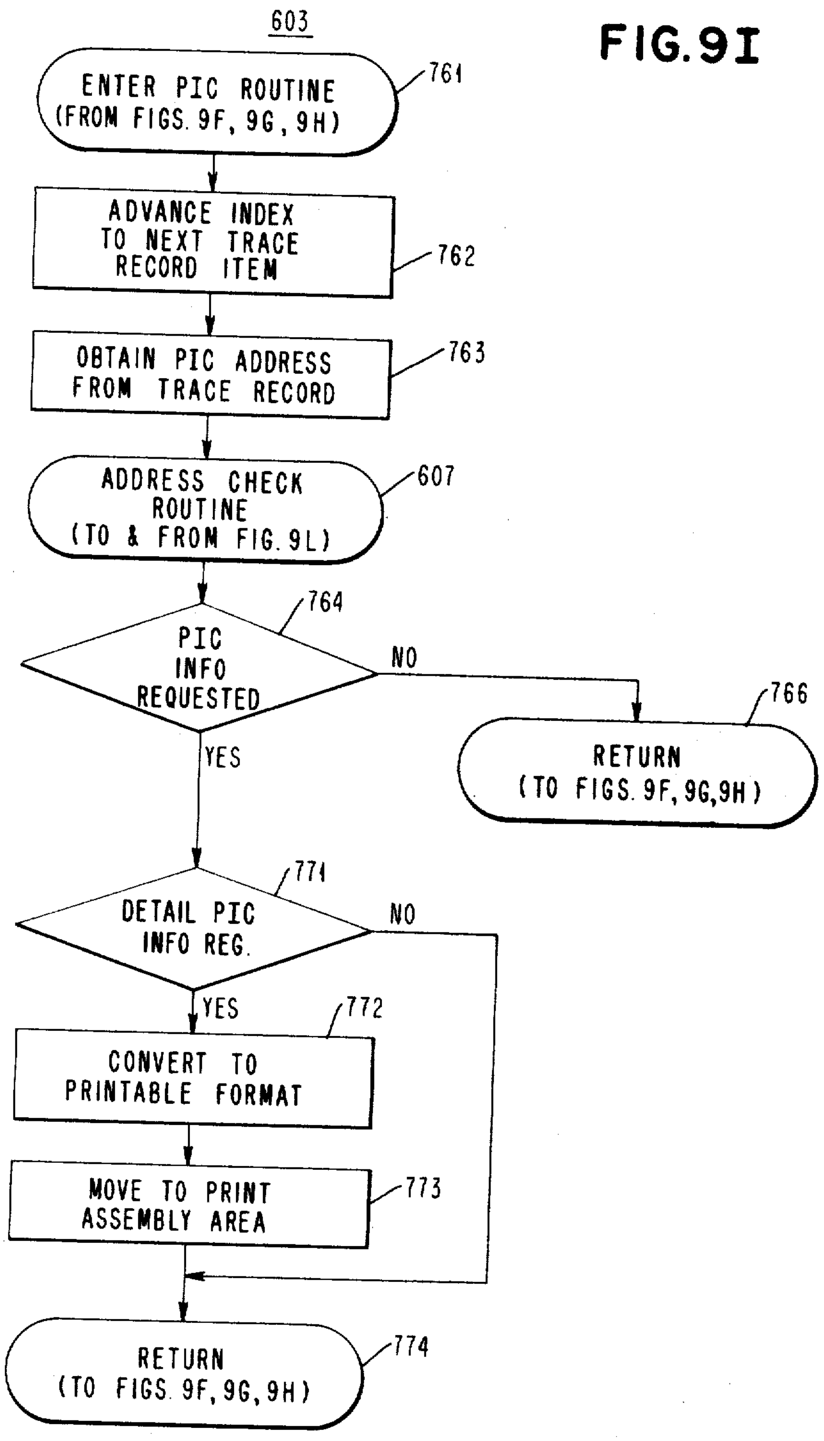

The routine 602E, labeled at 734, enters the PIC routine 603 on FIG. 9I, which when its execution is completed, returns to step 736 in FIG. 9G to adjust for the number of registers involved.

Step 736, for example, will compute the count for the number of registers involved in the type 4 instructions being analyzed by this routine. Step 736 also handles wrap-around situations for the specification of registers with load multiple or store multiple instructions. After step 736 is completed, step 604 is entered for processing within the effective address routine, 604 and return to step 711 in FIG. 9F so as to proceed as previously explained.

In the case of routine 602G, labeled at 739, it is executed by entering FIG. 9F at step 603 to execute the PIC routine in FIG. 9I.

In FIG. 9H, routines 602I and 602J are identical except for their exits, and for different work performed because of their different exits. Thus each enters from its label point 741 or 751 into the PIC routine 603 shown in FIG. 9I, and returns to FIG. 9H where the effective address routine 604 is entered twice but sequentially. (Once for each of the two addresses found in the type of instruction being handled in either of the two routines 602I or J.) The only difference between the two types of SS instructions is in the length fields, wherein a single length field is involved in instruction type 8 and two length fields are handled with the instruction type 9 of routine 602J.

In routine 602I, length routine 606 is executed once because of the single length parameter found in this instruction type. (The length parameter applies to both of its address fields.) The length routine 606 is found on FIG. 9K and when completed returns to FIG. 9F step 711, from which execution continues in the manner previously described.

In the case of routine 602J, the same steps were executed up to the completion of the execution of length routine 606. However the return point for routine 602J is a reentry at the beginning of the length routine 606 shown in routine 602I, so that the length routine 606 is entered a second time in order to handle the second length parameter in this SS type instruction. Upon the second repetition of the length routine 606 for the other parameter, the entry is then made to step 711 in FIG. 9F.

In FIG. 9I, the PIC routine 603 is entered and step 762 is first executed to advance the index to point to the next trace record item. Then step 763 obtains the PIC address from the trace record, and step 607 enters the address check routine in FIG. 9L which is then executed. It returns to step 764 which tests if PIC information was requested by the user, via keywords and reconcilations among keywords. If no request was made a NO exit is taken to step 766, which causes a return to the same routine from which an entry was made into the PIC routine. On the other hand if PIC information was requested, the YES exit is taken to step 771 which determines whether or not detailed PIC information was requested by the user in the manner previously explained. If not, the NO exit is taken which causes a return to the routine that called routine 603.

If step 771 uses its YES exit to step 772, the detailed information is converted to a printable format, and step 773 moves the information into the print assembly area from which it can later be outputted. Then the return is made to the calling routine from which the PIC routine 603 was entered.

Figure 9J:
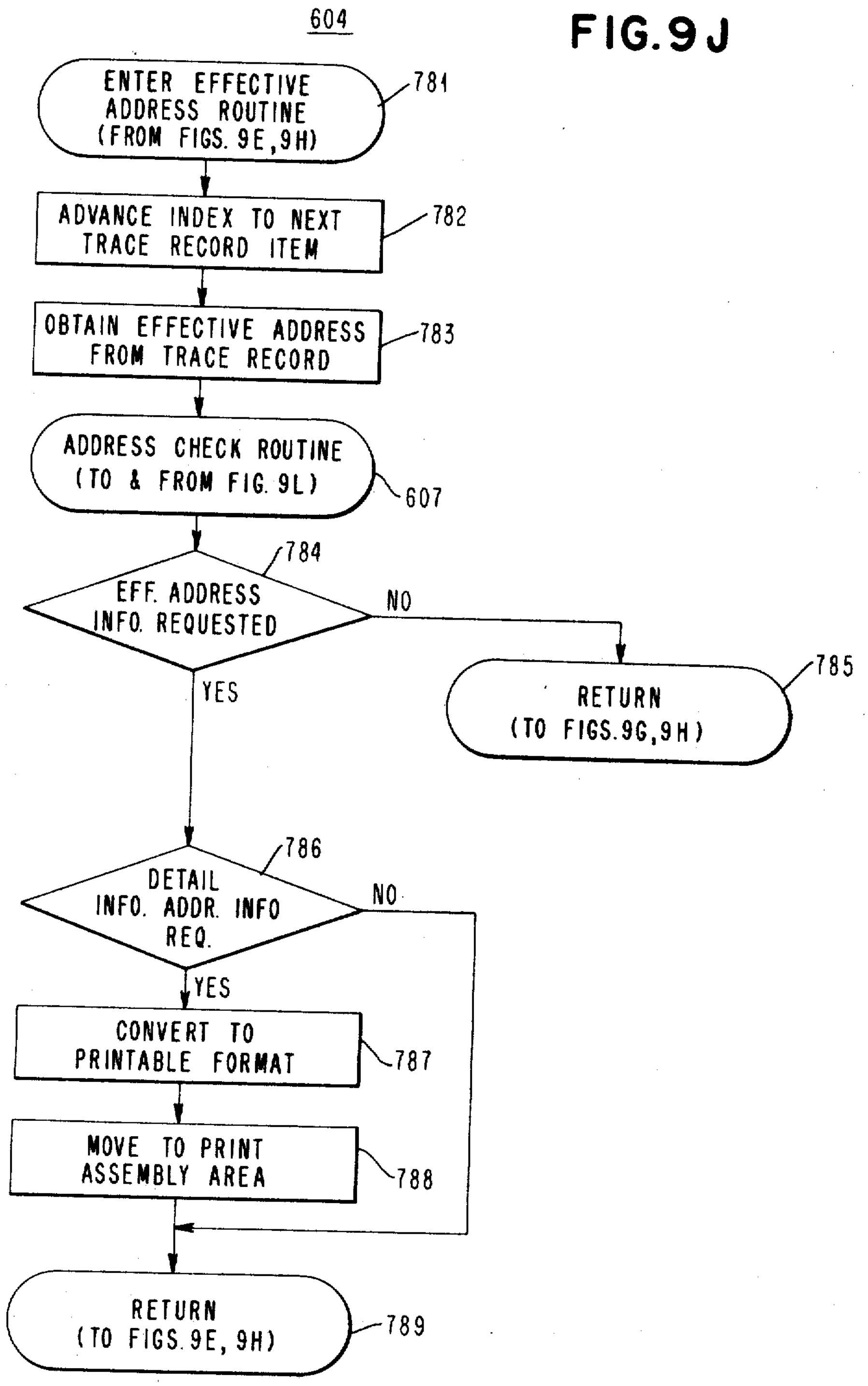

In FIG. 9J, the effective address routine 604 is illustrated. It is structured similarly to the PIC routine 603, explained in connection with FIG. 9I. Accordingly steps 782–789 in FIG. 9J are similar to steps 762–774 in FIG. 9I.

Figure 9K:
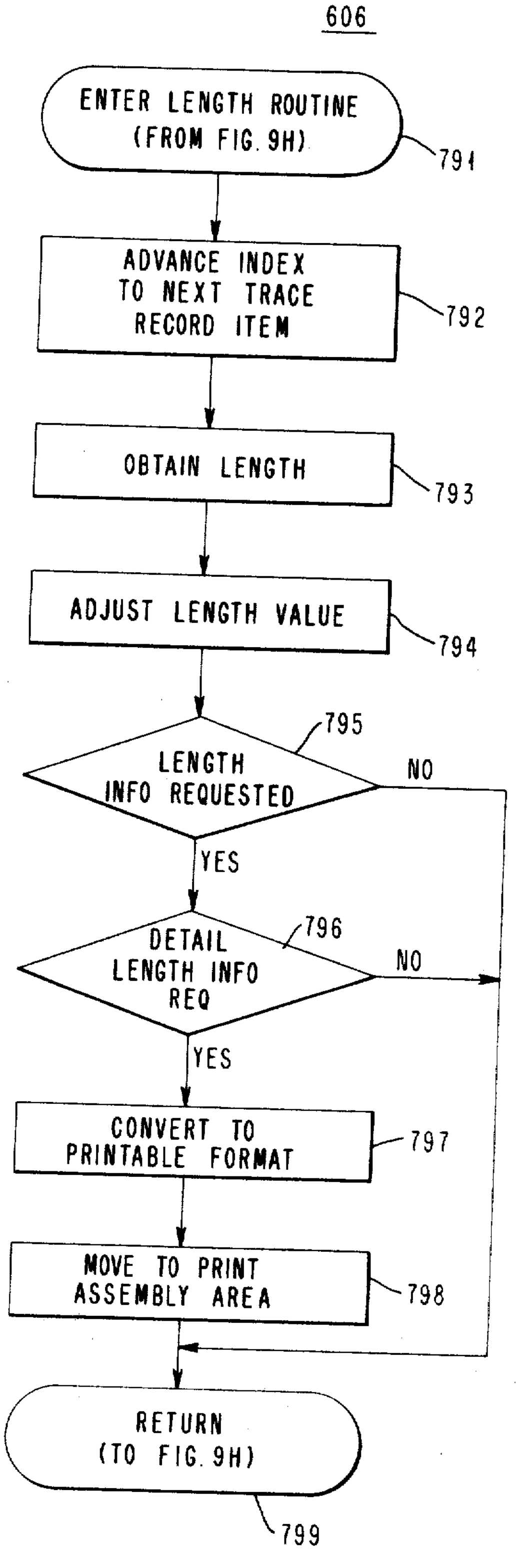

In FIG. 9K, the length routine 606 is shown in detail. It is also substantially similar to the PIC routine 603, explained in FIG. 9I. Except that in FIG. 9K the length of operands (in bytes) is considered while in FIGS. 9I, the effective address of an instruction is considered. Also in FIG. 9J the effective address of an operand is considered. Thus in FIG. 9K, steps 792–799 are substantially similar to steps 762–774 in FIG. 9I.

Figure 9L:
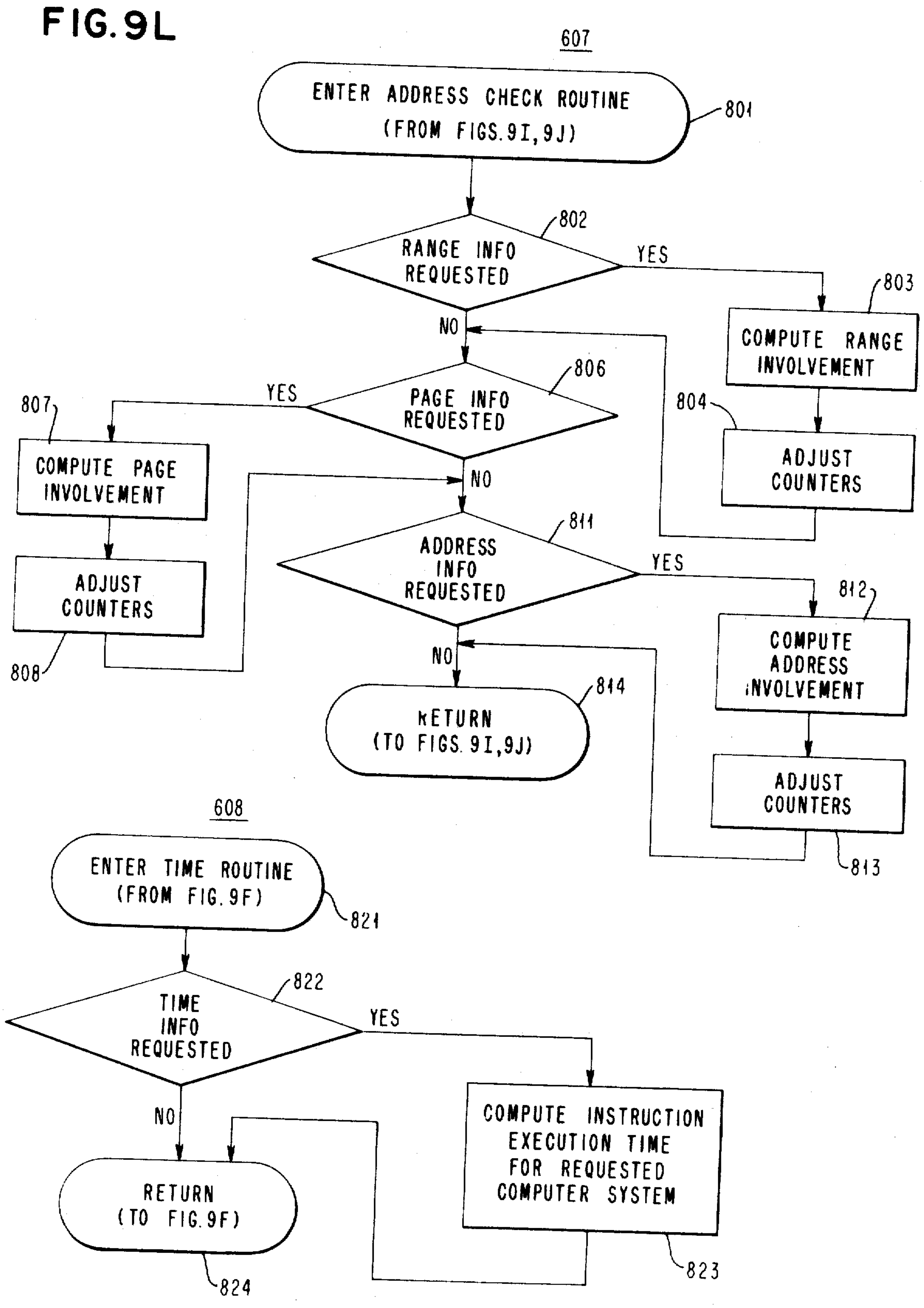

In FIG. 9L, the address check routine 607, when entered, can determine whether the particular address being analyzed falls within any of the ranges which may be specified by the user; any of the pages which may be specified by the user; and/or any of the addresses which may be specified by the user.

Step 802 is set up by the REQUEST RANGES=keyword, and accompanying parameters, and tests whether the address being analyzed falls within any of the specified ranges. If range information is specified, step 803 is entered via the YES exit to compute the range involvement and step 804 posts the information to the appropriate counters. This is done for each range indicated by the user (which for example may be up to 511 different ranges). Step 804 enters step 806. If no range information was requested step 806 is entered direct from step 802 via its NO exit.

Step 806 determines if any page information was requested. Page information is entered via a keyword, such as REQUEST PAGES=, and parameters are given regarding the number of pages, the size of each page, and the starting address of the first page. Pages are normally required in time sharing systems environments having virtual memory or relocate type operation.

If the YES exit is taken from steps 806, page involvement is computed by step 807, and its appropriate counters are posted accordingly by step 808 until all appropriate counters (for example up to 511)are updated. then step 808 enters step 811, which also may have been entered directly from step 806 if no page information had been requested, and accordingly the NO exit was taken.

Similarly, step 811 tests if address information had been requested for specified addresses (up to, for example, 256 different addresses). If YES, address equality is detected by step 812 and step 813 posts an appropriate counter with the number of times an equality is found for each respective specified address. Then a return is made to the calling routine. This also would be done if no address information had been requested, and the NO exit was taken from step 811.

The time routine 608, entered at point 821, is received by step 822 which determines if time information was requested by the user. If it was, its YES exit is taken to step 823 which computes the instruction execution time from a table of formulas for the respective instruction OP codes, including data involvement for the respective instructions. Computation is made for any of a large number of different types of computer systems on which the same instruction set is capable of execution. The TIME=keyword specifies the model for which the time computation will be made. As previously explained, this need not be for the same model of computer as that on which the tracing program was executed. A return is then taken to the calling routine.

If step 822 determines that time information was not requested, return to the calling routine is made immediately via its NO exit.

Figure 9M:
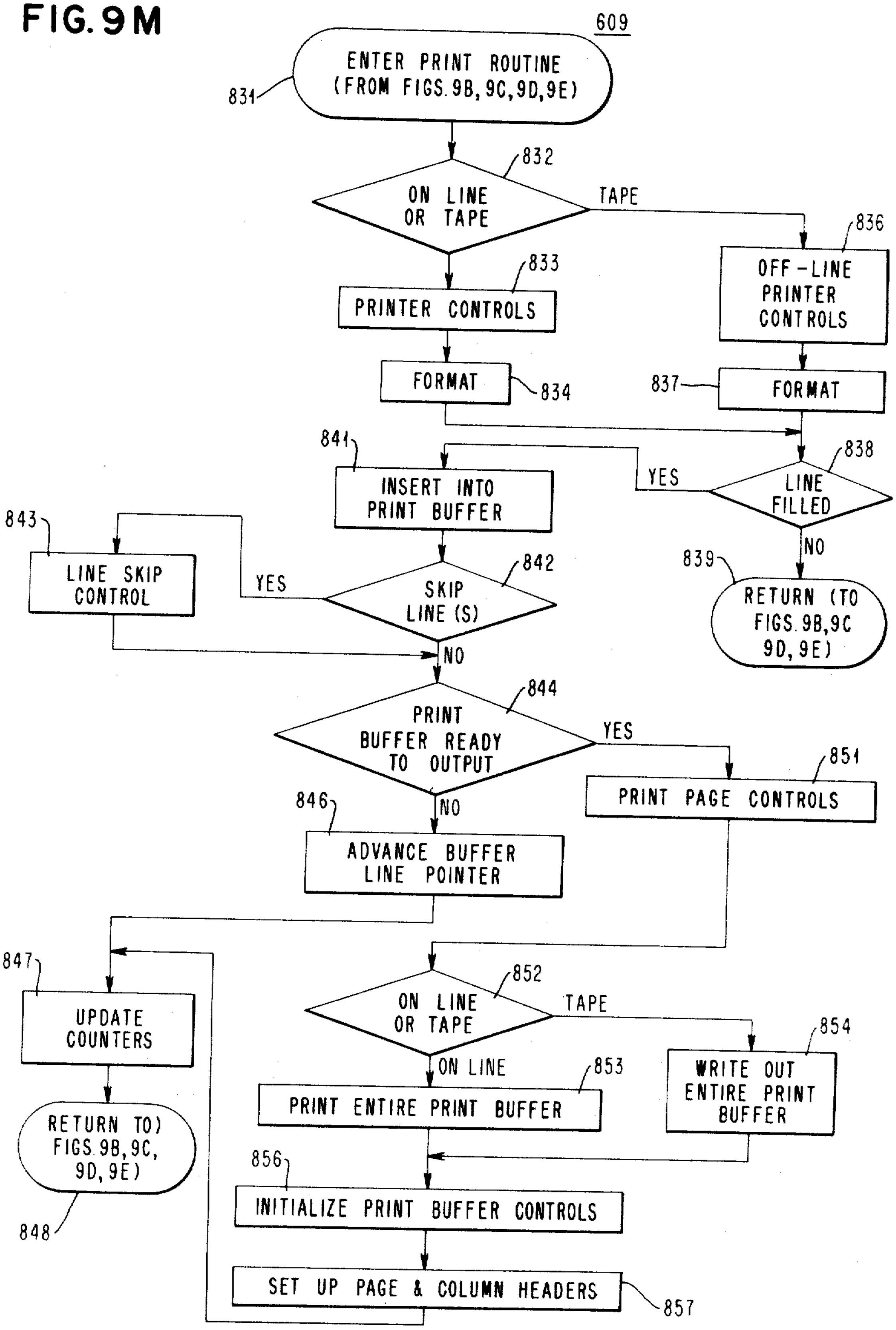

FIG. 9M describes the print routine which is entered at label 831 and received by step 832. This step 832 tests if the output is to go to tape or to a printer connected to the system "on line". If tape is chosen, the format provided to the tape will be a printable form which can directly drive a printer off line to provide identical printed output obtainable on line. The bit tested by step 832 is inputted via the keywords PRINT=TAPE, or PRINT=ONLINE,.

If on-line had been specified, the on-line exit is taken and step 833 is entered to set up printer controls for the on-line operation. This enables the printer to provide the information in the required manner. Then step 834 is entered to control the specific formatting which was only generally controlled previously. It now provides the form in the unique manner specified by the user for each respective report. Then step 838 is entered to detect when a line is filled.

On the other hand if step 832 finds that tape was specified, step 836 is entered via the tape exit to set up off-line printer controls since the operation of an online printer will normally be different from the operation of an on-line printer. Then step 837 is entered to provide the specific formatting, as previously mentioned in regard to step 834.

Then step 838 is entered to determine whether the line is completed and ready for printing. If the line is not filled, the NO exit is taken from step 838 to the calling routine to continue processing. This will ultimately cause the line to become full.

When step 838 finds the line is filled the YES exit is taken to step 841 to cause the line of data to be inserted into the print buffer for eventual outputting. Then step 842 is entered to determine if the format requires lines to be skipped singly, doubly, or in any other manner. If YES, step 843 is entered to set up the line skip control which is positioned at the beginning of the line that was just placed into the print buffer by step 841. Step 843 enters step 844, which also would be entered directly from step 842 via its NO exit if there were no lines to be skipped.

Step 844 determines if the print buffer is full, or otherwise ready to be outputted to the printer or other device such as tape. If it is not ready, its NO exit is taken to 846 which advances the buffer line pointer to point to the next line, so that the next line when completed can be placed in the next proper position in the print buffer. Then step 847 is entered to update counters within the print routine in preparation for generating the next line, setting up buffers, and formatting and editing. Then a return is taken to the calling routine to continue the operation.

On the other hand if step 844 finds that the buffer is ready, its YES exit is taken to step 851 which sets up print page controls that are stored in the first byte of the print buffer about to be emptied.

Step 852 is entered to check whether the user had specified on-line or tape output operation. If tape operation is specified, step 854 is entered, and the entire buffer is written out onto magnetic tape. However, if step 852 finds that on-line operation had been specified, then step 853 is entered to print one line at a time as an output until the entire print buffer is outputted. Overlapping in the operation may occur for the on-line printing, or tape, with the execution of the analysis program proper. Step 856 is entered from either step 853 or 854 to initialize the print buffer controls, so that a new print buffer can be made ready for the next set of data.

Step 857 then is entered to set up the print page and column headers for the next print page to be outputted. Step 847 is now entered to update all appropriate counters involved for the next operation, as previously explained, and a return is made to the calling routine.

The following source code, written in the IBM System/360 assembler language, contains formal examples of S/360 computer program routines containing features previously explained in connection with the flow diagrams.

The following code illustrates the Analysis Routine 17 represented in FIG. 2 which controls the transfer of an instruction from the program being traced to the common instruction area 17A as shown in FIG. 2:

```
L     M10,=A(JLDBYP+3) IS
        ADTRAC QUIESCENT
TM    0(M10),X'FF' YES. IF BY-PASS
        IS ON.
BM    JLDXRQ HANDLE
        QUIESCING.
L     M11,=A(JLDNOSW) OK TO
        PROCEED
CLI   0(M11),1
BNE   JLDXRQ IN QUIESCENT
        STATE.
```

```
          IC    M10,0(M2) GET OP. CODE.
          SRA   M10,4 DETERMINE TYPE.
          MVC   JLDX(1),0(M2) OBTAIN
                  TRACED CODE.
          L     M9,=A(UNADD) OBTAIN
                  BUFFER POINTER.
          L     M9,0(M9) OBTAIN ADDRESS
                  OF NEXT INST.
          BC    15,JLDXORC(M10) IN
                  BUFFER. SHOULD THERE
                  BE PROCES-
JLDXCRC   B     JLDXOR1 YES. BUT CHECK
                  ADDRESS VIOLATION.
          B     JLDXOR1 YES. BUT CHECK
                  ADDRESS VIOLATION.
          B     JLDXOR2 YES. BUT CHECK
                  ADDRESS VIOLATION.
JLDXCR1   S     M9,=F'4' ADJUST.
JLDXORZ   L     M9, 0(M9) OBTAIN
                  EFFECTIVE ADDRESS.
          N     M9,=X'00FFFFFF'
          C     M9,=A(ADTRACO) IS THERE
                  VIOLATION
          BNL   JLDXBY YES. DO NOT
                  PROCESS NOW.
          L     M9,=A(JLDXT) NO.
                  PROCEED.
JLDXRX0   IC    M10, 0(M9) PROCEED.
          BC    15,JLDXRX(M10) OBTAIN
                  INSTRUCTION TO BE
                  TRACED.
JLDXRX    B     JLDXBY
```

The following exemplary Analysis Tables 17B represented in FIG. 2 are used in conjunction with each other and the Analysis Routine 17 to select (i.e. determine) the address for the TIER 14 to which a branch is taken in order to begin the pre-execution analysis of the currently moved instruction to be traced.

The following exemplary table is used for initializing the Analysis Table 17B:

```
          DC    X'00000000'
          DC    X'00000000'
          DC    X'00000000'
          DC    X'00000000'
          DC    X'00000000'
          DC    X'00000000'
          DC    X'00000000'
          DC    X'00000000'
          DC    X'00000000'
          DC    X'00000000'
          DC    X'00000000'
          DC    X'00000000'
          DC    X'00000000'
          DC    X'00000000'
          DC    X'00000000'
          DC    X'00000000'
          DC    X'00000000'
          DC    X'00000000'
          DC    X'00000000'
          DC    X'00000000'
          DC    X'00000000'
          DC    X'00000000'
          DC    X'00000000'
          DC    X'00000068'
          DC    X'00500000'
          DC    X'00000000'
          DC    X'00000000'
          DC    X'00006868'
JLDXQRB   DC    X'04084C72'
JLDBYP    DC    X'00000000'        PROGRAM SWITCH
```

The following exemplary Analysis Table 17B identifies the S/360 mnemonic instructions and classifies them into specific TIER 14 types, in which each type uses a particular TIER:

| INSTRUCTION | TYPE |
|---|---|
| A | 15 |
| AD | 19 |
| ADR | 20 |
| AE | 19 |
| AER | 20 |
| AH | 15 |
| AL | 15 |
| ALR | 14 |
| AP | 32 |
| AR | 10 |
| AU | 19 |
| AUR | 20 |
| AW | 19 |
| AWR | 20 |
| BAL | 36 |
| BALR | 34 |
| BC | 40 |
| BCR | 41 |
| BCT | 37 |
| BCTR | 42 |
| BXH | 43 |
| BXLE | 43 |
| C | 16 |
| CD | 19 |
| CDR | 20 |
| CE | 19 |
| CER | 20 |
| CH | 16 |
| CL | 16 |
| CLC | 32 |
| CLI | 29 |
| CLR | 6 |
| CP | 32 |
| CR | 9 |
| CVB | 33 |
| CVD | 44 |
| D | 17 |
| DD | 18 |
| DDR | 22 |
| DE | 18 |
| DER | 22 |
| DP | 30 |
| DR | 12 |
| ED | 32 |
| EDMK | 51 |
| EX | 54 |
| HDR | 22 |
| HER | 22 |
| HIO | 50 |
| IC | 31 |

The following sets of tables are examples of code used to obtain offsets and indexing factors so as to properly select, transfer to, and process any class of TIER 14.

The following is an example of a transfer table which effects a branch to the selected TIER 14:

```
BC    15,TYPE34 04    BALR
BC    15,TYPE42 08    BCTR
BC    15,TYPE 41 0C   BCR
BC    15,TYPE49 10    SSK
BC    15,TYPE48 14    ISK
BC    15,TYPE21 18    SVC
BC    15,TYPE1 1C     LPR,LNR,LCR
BC    15,TYPE25 20    SSM
BC    15,TYPE3 24     LTR
BC    15,TYPE47 28    SPM
BC    15,TYPE5 2C     NR
BC    15,TYPE6 30     CLR
BC    15,TYPE7 34     OR
BC    15,TYPE39 38    XR
BC    15,TYPE8 3C     LR
BC    15,TYPE9 40     CR
BC    15,TYPE10 44    AR
BC    15,TYPE11 48    SR
BC    15,TYPE12 4C    MR
BC    15,TYPE12 50    DR
BC    15,TYPE14 54    ALR
BC    15,TYPE23 58    SLR
BC    15,TYPE22 5C    HDR,LDR
                        MRD,DDR
                        HER,LER,DER
BC    15,TYPE20 60    LPDR,LNDR
                        LTDR,LCDR
                        CDR,ADR,SD
                        AWR,SWR,LPER
                        LNER, TER,LCER
                        CER,AER,SER
                        MER AUR,SUR
BC    15,TYPE33 64    LH,CVB,L
BC    15,TYPE44 68    STC,CVD
BC    15,TYPE31 6C    IC,MH,LA
BC    15,TYPE54 70    EX
BC    15,TYPE36 74    BAL
BC    15,TYPE37 78    BCT
BC    15,TYPE40 7C    BC
BC    15,TYPE16 80    CH,CL,C
BC    15,TYPE15 84    AH,SH,N,O,X,A,S,A
                        L,SL
BC    15,TYPE17 88    M,D
BC    15,TYPE35 8C    LA
```

```
BC      15,TYPE18 90    STD,LD,MD,DD
                          STE,LE,ME,DE
BC      15,TYPE19 94    CD,AD,SD,AW,SW
                          CE,AE,SE,AU,SU
BC      15,TYPE24 98    MVI,WRD,RDD
BC      15,TYPE43 9C    BXH
BC      15,TYPE43 A0    BXLE
BC      15,TYPE26 A4    SRL,SLL
BC      15,TYPE38 A8    SRA,SLA
BC      15,TYPE27 AC    SRDL,SLDL
BC      15,TYPE28 B0    SRDA,SLDA
BC      15,TYPE46 B4    STM
BC      15,TYPE29 B8    TM,NI,CLI,0I,XI
BC      15,TYPE45 BC    LM
BC      15,TYPE50 C0    SI0,TI0,HI0,TCH
BC      15,TYPE30 C4    MVN,MVC
                          MVZ,TR,MVO
                          PACK,UNPK
                          MP,DP
BC      15,TYPE32 C8    NC,CLC,OC,XC
                          ED,ZAP,CP,AP,SP
```

The following coded table is an example of offsets used to enter into the proper branch instruction in a transfer table:

```
DC      X'60'   ADR
DC      X'60'   SDR
DC      X'5C'   MDR
DC      X'5C'   DDR
DC      X'60    AWR
DC      X'60'   SWR
DC      X'60'   LPER
DC      X'60'   LNER
DC      X'60'   LTER
DC      X'60'   LCER
DC      X'5C'   HER
DC      X'D4'   35      INVOP
DC      X'D4'   36      INVOP
DC      X'D4'   37      INVOP
DC      X'5C'   LER
DC      X'60'   CER
DC      X'60'   AER
DC      X'60'   SER
DC      X'5C'   MER
DC      X'5C'   DER
DC      X'60'   AUR
DC      X'60'   SUR
DC      X'DC'   STH
DC      X'8C'   LA
DC      X'68'   STC
DC      X'6C'   IC
DC      X'70'   EX
DC      X'74'   BAL
DC      X'78'   BCT
DC      X'7C'   BC
DC      X'64'   LH
DC      X'80'   CH
DC      X'84'   AH
DC      X'84'   SH
DC      X'6C'   MH
DC      X'D4'   4D      INVOP
DC      X'68'   CVD
DC      X'64'   CVB
DC      X'DC'   ST
DC      X'D4'   51      INVOP
DC      X'D4'   52      INVOP
DC      X'D4'   53      INVOP
DC      X'84'   N
DC      X'80'   CL
DC      X'84'   0
DC      X'84'   X
DC      X'64'   L
DC      X'80'   C
DC      X'84'   A
DC      X'84'   S
DC      X'88'   M
DC      X'88'   D
DC      X'84'   AL
DC      X'84'   SL
DC      X'90'   STD
```

The following coded tables provide exemplary indices for the analysis of the operation codes of the various instructions in the traced program 9:

```
MOD     DC      X'00000000'
        DC      X'0000C000'
        DC      X'0000C000'
        DC      X'0000C000'
```

```
        DC      X'0000C000'
        DC      X'0000C000'
        DC      X'0000C000'
        DC      X'0000C000'
        DC      X'0000C000'
        DC      X'0000C000'
        DC      X'0000C000'
        DC      X'0000C000'
        DC      X'0000C000'
        DC      X'0000C000'
        DC      X'0000C000'
        DC      X'0000C000'
        DC      X'0000C000'
MOE     DC      X'00009000'
        DC      X'C000900'
        DC      X'C0009000'
        DC      X'C0009000'
        DC      X'C0009000'
        DC      X'C0009000'
        DC      X'C0009000'
        DC      X'C0009000'
        DC      X'C0009000'
        DC      X'C0009000'
        DC      X'C0009000'
        DC      X'C0009000'
        DC      X'02000000'
        DC      X'02020202'
        DC      X'02020202'
        DC      X'02020202'
        DC      X'02000000'
        DC      X'02020202'
        DC      X'02020202'
        DC      X'00040004'
        DC      X'04040404'
        DC      X'04040404'
        DC      X'04000404'
        DC      X'00000000'
        DC      X'04040404'
        DC      X'04040404'
        DC      X'04040404'
        DC      X'00000000'
        DC      X'00000000'
        DC      X'04040404'
        DC      X'04040404'
        DC      X'00000000'
        DC      X'00000000'
        DC      X'04040404'
        DC      X'04040404'
        DC      X'04000400'
        DC      X'04040404'
        DC      X'04040404'
        DC      X'04040404'
        DC      X'00040004'
        DC      X'00040000'
        DC      X'04000000'
        DC      X'04040404'
        DC      X'00000000'
        DC      X'00000000'
        DC      X'00000000'
        DC      X'00000000'
        DC      X'00000000'
        DC      X'00000000'
        DC      X'00000000'
        DC      X'00000000'
        DC      X'00000000'
        DC      X'00000000'
        DC      X'00000000'
        DC      X'00000000'
        DC      X'00000000'
        52 DC   X'00060000'
        DC      X'00000000'
        DC      X'06060606'
        DC      X'00000000'
        DC      X'00000000'
        DC      X'00000000'
        DC      X'00000000'
        DC      X'00000000'
        DC      X'06060606'
        DC      X'06060000'
JLDXMV  DC      X'00000000'
        DC      X'00000000'
        DC      X'00000000'
        DC      X'00000000'
        DC      X'00000000'
        DC      X'00000000'
        DC      X'00000000'
        DC      X'00000000'
        DC      X'00000000'
        DC      X'00000000'
        DC      X'00000000'
        DC      X'00000000'
        DC      X'00000000'
        DC      X'00000000'
        DC      X'00000000'
        DC      X'00000000'
        DC      X'04000400'
```

```
         DC     X'00000000'
         DC     X'00000000'
         DC     X'00000000'
         DC     X'04000000'
         DC     X'00000000'
         DC     X'00000000'
         DC     X'00000000'
         DC     X'04000000'
         DC     X'00000000'
         DC     X'00000000'
         DC     X'00000000'
         DC     X'04000000'
         DC     X'00000000'
         DC     X'00000000'
         DC     X'00000000'
         DC     X'00000000'
         DC     X'00000000'
         DC     X'00000000'
         DC     X'00000000'
         DC     X'04000400'
         DC     X'04000404'
         DC     X'00000000'
         DC     X'00000000'
         DC     X'00000000'
         DC     X'00000000'
         DC     X'00000000'
         DC     X'00000000'
         DC     X'00000000'
         DC     X'00000000'
         DC     X'00000000'
         DC     X'00000000'
         DC     X'00000000'
         DC     X'00000000'
         DC     X'00000000'
         DC     X'00000000'
         DC     X'00060606'
         DC     X'06000606'
         DC     X'00000000'
         DC     X'00000000'
         DC     X'00000000'
         DC     X'00000000'
         DC     X'00000000'
         DC     X'00000000'
         DC     X'00060606'
         DC     X'00000000'
         DC     X'00000000'
         DC     X'00000000'
JLDXRTP  DC     X'00000000'
         DC     X'00000000'
         DC     X'00000000'
         DC     X'00000000'
         DC     X'00000000'
         DC     X'00000000'
         DC     X'00000000'
         DC     X'00000000'
         DC     X'00000000'
         DC     X'00000000'
         DC     X'00000000'
         DC     X'00000000'
         DC     X'00000000'
         DC     X'00000000'
         DC     X'00000000'
         DC     X'00000000'
         DC     X'00000000'
         DC     X'00000000'
         DC     X'00000000'
         DC     X'00000000'
         DC     X'00000000'
         DC     X'00000000'
         DC     X'00000000'
         DC     X'00000000'
         DC     X'00000000'
         DC     X'00000000'
         DC     X'00000000'
         DC     X'00000000'
         DC     X'00000000'
         DC     X'00000000'
         DC     X'00000000'
         DC     X'0000009A'
         DC     X'9A9A9A9A'
         DC     X'9A9A9A9A'
         DC     X'9A9A9A9A'
         DC     X'009A9A9A'
         DC     X'9A9A9A9A'
         DC     X'9A9A9A9A'
         DC     X'9A9A9A9A'
         DC     X'9A9A9A9A'
         DC     X'9A9A9A9A'
         DC     X'9A9A9A9A'
         DC     X'9A9A9A9A'
         DC     X'9A9A9A9A'
         DC     X'9A9A9A9A'
         DC     X'9A9A9A9A'
         DC     X'9A9A9A9A'
         DC     X'9A9A9A9A'
```

```
         DC     X'9A9A9A9A'
         DC     X'9A9A9A9A'
         DC     X'9A9A9A9A'
         DC     X'9A9A9A9A'
         DC     X'9A9A9A9A'
         DC     X'9A9A9A9A'
         DC     X'9A9A9A9A'
         DC     X'9A9A9A9A'
         DC     X'9A9A9A9A'
         DC     X'9A9A9A9A'
         DC     X'9A9A9A9A'
         DC     X'9A9A9A9A'
         DC     X'9A9A9A9A'
         DC     X'9A9A9A9A'
         DC     X'9A9A9A9A'
         DC     X'9A9A9A9A'
JLDXOFF  DC     X'00000000'
         DC     X'00000000'
         DC     X'00000000'
         DC     X'00000000'
         DC     X'00000000'
         DC     X'00000000'
         DC     X'00000000'
         DC     X'04040450'
         DC     X'00000000'
         DC     X'00000000'
         DC     X'00000000'
         DC     X'00000000'
         DC     X'00000000'
         DC     X'00000000'
         DC     X'00000000'
         DC     X'00000000'
         DC     X'00000000'
         DC     X'00000000'
         DC     X'00000000'
         DC     X'00000000'
         DC     X'00000000'
         DC     X'00000000'
         DC     X'00000000'
         DC     X'00000000'
         DC     X'00000000'
         DC     X'00000000'
         DC     X'00000000'
         DC     X'00000000'
         DC     X'00000000'
         DC     X'00000000'
         DC     X'00000000'
         DC     X'00000000'
         DC     X'00000000'
         DC     X'00000000'
         DC     X'00000000'
         DC     X'00000000'
```

Code for different parts of a typical TIER 14 represented in FIG. 2 is provided below in several sections.

The following section of code illustrates part 14A (pre-execution analysis) in a TIER 14 for a BALR instruction:

```
*        TYPE34   ENTER HERE FOR                BALR (05)
         LR       M11,M6
         SRL      M6,4 (0) SHIFT OUT R2
         SLL      M6,2 (0)
         LR       M10,MO
         N        M10,MOBALM
         O        M10,MOLNGI
         TM       MO2CHNG,X'OF'
         BC       14,*+14
         O        M10,MOMLR
         AR       M10,M3
         B        *+6
         OR       M10,INST
         AR       M10,M3
         NR       M11,M4
         BC       8,MOHERE IF R2 is 0,
                    BRANCH DOESN'T TAKE
         SLL      M11,2(0)
         L        M11,MOREG(M11) PICK UP
                    BRANCH-TO ADDRESS
         ST       M10,MOREG (M6) GIVE USER
                    HIS RESULT
```

The following section of code moves an instruction to be traced having a two byte length (e.g. BALR instruction) from the common area 17A into the reserved area TIEA 14B in the TIER routine 14. This completes the part of routine 14 which prepares for executing the traceable instruction, and which executes this instruction in the TIEA, the latter operation being represented in the code at the symbol JLDXRX2 (i.e. TIEA 14B).

```
         MVC   JLDXRX2 (2), 0(M2) COPY
                 THE INSTRUCTION TO BE
                 HANDLED.
         L     M9,=A(JLDXMRA) POINTERS
                 TO SAVE AREAS.
L              M10,0(M9)
         ST    M10,48
         STM   M0,M15,4(m9) SAVE ADTRAC
                 REGISTERS.
         LM    M0,M15,4(M10) OBTAIN
                 OBJECT REGISTERS.
JLDXRX2  DC    X'0000'EXECUTE THE
                 INSTRUCTION HERE.
         ST    M10,52
         L     M10,48
         STM   M0,M15,4(M10) SAVE
                 OBJECT REGISTERS.
         MVC   48(4,M10), 52
         L     M9,0(M10) RESTORE
                 ADTRAC REGISTERS.
         LM    M0,M15,4(M9)
         B     JLDXBY RETURN.
```

The following section of code represents the post-execution part of TIER 14, i.e. this section executes after the execution of the traceable instruction in TIEA 14B. Thus this code is an example of the post-execution portion 14D of TIER 14 in FIG. 3A. Portion 14D provides the computation of effective addresses used by the instruction to be traced, the determination of its instruction type, and the positioning of its output data and collects this tracing information in an output area which is recorded in a record to represent the trace information for the instruction in the TIEA:

```
         USING *, 10,4
         TM    JLDBYP+3,X'FF' BYPASS
         BM    UMNO2 YES. LEAVE
*                                     NO.
         CLI   JLDNOSW,1 SHOULD ALL
                 INSTRUCTIONS BE
                 EVALUATED
         BE    UMENTR YES. DO SO.
         ST    7,JLDSAV7 SAVE
                 INTERMEDIATE REGISTER.
         CLI   JLDSWN,1 SHOULD DATA BE
                 SAVED
         BNE   UMNO NO.
         L     7,JLDCTRLN YES. OBTAIN
                 LOOP CONTROL.
         BCT   7,UMYES PROCESS THE
                 DATA.
         L     7,JLDCTRL1 LOOP
                 EXHAUSTED. REFRESH
                 CONTROL.
         MVI   JLDSWN,0 RESET SWITCH.
         STM   3,4JLDSAV3 TEMPORARILY
                 STORE TRANSFER DATA.
         L     3,UNADD OBTAIN BUFFER
                 POINTER.
         L     4,=F'1' PROVIDE SAMPLING
                 END CODE.
         ST    4,0(3) INCLUDE IT IN
                 OUTPUT.
         LA    3,4(3) INCREMENT POINTER.
         ST    3,UNADD SAVE POINTER.
         LM    3,4JLDSAV3 RESTORE
                 TRANSFER DATA.
UMYES    st    7,JLDCTRLN SAVE LOOP
                 CONTROL.
         L     7,JLDSAV7 RESTORE
                 INTERMEDIATE REGISTER.
UMENTR   STM   1,12,UMREGSV SAVE
                 REGISTERS.
         LR    12,2 USUALLY THE I.C.
         L     3,IUNADD NEXT OUTPUT
                 LOCATION
UM1      ST    7,7 INSTRUCTION
                 PROCESSING
         LR    6,7 =F'0'
         IC    7,0(12) GET OPCODE
         IC    6,UTABLE (7) GET OPCODE
                 TYPE
         LNR   5,7
         ST    5,0(3) STORE TWO COMP OF
                 OP CODE IN OUT
         LA    3,4(3) MOVE POINTER UP
         LTR 6,6 OPCODE TYPE =F'0'
         BZ    UERR BRANCH IF TYPE IS 0
                 I.E. ILLEGAL
         TM    MO2CHNG,X'OF'IS THIS A
                 SUBJECT INSTRUCTION OF
         BO    UM11 AN EXECUTE
                 INSTRUCTION YES.
*                               NO. CONTINUE.
         ST    12,0(3) STORE I.C. IN
                 OUTPUT
UM10     LA    3,4(3) INCREMENT POINTER.
         BCT   6,*+8 R R TYPE
         B     UENDO END IF AN RR TYPE.
         LH    7,2(12) GET FIRST ADDRESS
         L     5,=X'0000F000'
         NR    5,7
         N     7,=X'0000FFF'
         SRA 5,10 5 HAS REGISTER
           NUMBER*4
         BZ    UM4
         A     5,ZMORA
         A     7,0 (5)
UM4      BCT   6,*+8
         BC    15,URX1
UENDO    S     3,=F'7' ADJUST FOR SVC
                 NUMBER.
         IC    7,1(12) INSERT SVC CODE.
         STC   7,0(3)
         LA    3,7(3)
         B     UEND CONTINUE.
*
*
*        FOR RX TYPE INSTRUCTIONS
           DATA IS
*        -OPCODE,INSTRUCTION
           COUNTER,EFFECTIVE
           ADDRESS
*
URX1     LH    5,0(12) FIND INDEX
         N     5,+X'0000000F'
         SLA   5,2(0) MULT BY 4
         BZ    URX2 NO INDEXING GIVEN
         A     5,ZMORA
         A     7,0( 5)
         ST    3,THST
         S     3,SVCMASK COMPUTE OP.
                 CODE ADDRESS IN
                 BUFFER.
         NI    0(3),X'00' INDICATE DOUBLE
                 INDEXING.
         L     3,THST
URX2     ST    7,0(3) STORE EFF ADDRESS
         A     3,=F'4'
         BC    15,UEND
*
8        DATA FORMAT FOR EX
           INSTRUCTION IS
*        -OPCODE,INSTRUCTION
           COUNTER
*
*        FOLLOWED BY THE DATA
           FOR THE EXED
           INSTRUCTION
*
UM11     L     2,MOMLR PROVIDE PSEUDO-
                 I.C.
         ST    2,0(3) PLACE IT IN OUTPUT
                 AREA.
         B     UM10 CONTINUE
                 PROCESSING.
```

The process then repeats in a similar manner for the next instruction in the program being traced.

While the invention has been particularly shown and described with reference to preferred embodiments thereof, it will be understood by those skilled in the art that the foregoing and other changes in form and details may be made therein without departing from the spirit and scope of the invention.

What is claimed is:

1. Within a computer system using instructions of variable length having operation codes that also indicate the instruction lengths; the computer system operation being controlled by a program tracing method; initially inputting into said computer system said program tracing method, a program to be traced and data to be processed by said program to be traced; said program tracing method including the steps of controlling a hardware instruction counter in said computer system for accessing each next required tracing instruction in said program tracing method, said program tracing method thereafter maintaining continuous control over said computer system, loading a programmed instruction counter with a direct or indirect address of a current instruction in said program to be traced, selecting one of a plurality of program tracing method routines by interpretation of an operation code in the current instruction determined by said loading step, moving the current instruction into an assigned area provided by the selected program tracing method routine obtained by said selecting step, executing said current instruction in said assigned area under control of the selected program tracing method routine, the execution of said current instruction being with said data to be processed and with data generated from execution of any prior instructions in said program to be traced, said executing step providing generated data for subsequent execution by said program to be traced, the data generated during said executing step by each instruction in said program to be traced being the same as data which would be generated by direct execution of said program to be traced with said data to be processed, machine-recording addresses in a tracing record for said current instruction executed by said executing step, and iteratively repeating the sequence of said loading step, said selecting step, said moving step, said executing step, and said machine-recording step for each next instruction indicated by the setting of said programmed instruction counter for said program to be traced, whereby no machine interrupt is required for tracing purposes by either the program tracing method or the program to be traced, and whereby no modification is required for tracing purposes to either the hardware or to said program to be traced.

2. Within a program tracing method as defined in claim 1 in which, the tracing operation is quiesced while said tracing program maintains control of said computer system, in which after said loading step, the following steps are included branching around said selecting step, said moving step, said executing step, and said machine-recording step for each next instruction of said program to be traced while being quiesced; and said branching step correspondingly modifying said iteratively repeating step, executing-in-place each next instruction indicated by the content of said programmed instruction counter for said program to be traced under control of said program tracing method, whereby said branching step quiesces the tracing operation.

3. Within a program tracing method as defined in claim 2, in which the following steps are provided before said branching step, testing a program control switch for a quiescence status indication, and whereby the tracing operation continues in the absence of said testing step sensing any quiescence status indication by said program control switch.

4. Within a program tracing method as defined in claim 2, in which the following steps are provided before said branching step resetting a control bit by external control at any time during execution of said program tracing method, activating said iteratively repeating step, and deactivating said branching step in response to said control bit being reset, whereby said program tracing method is activated to trace said program to be traced.

5. Within a program tracing method as defined in claim 2, in which the following steps are provided before said branching step setting a control bit by external control at any time during execution of said program tracing method, activating said branching step and said executing-in-place step in response to said control bit being set by said setting step, whereby said program tracing method is in a quiescent state as long as said control bit is set, in which each next instruction in said program to be traced is executed without being traced but is continuously under control of said program tracing method.

6. Within a program tracing method as defined in claim 2, in which the following steps are provided before said loading step inputting first and second parameters to control an on-count sampling period and an off-count sampling period, which are alternate periods in a tracing sampling cycle, machine-changing a current one of said on-count and off-count sampling periods in accordance with a machine-measured progression of said program to be traced, machine-testing a current state of a no-sampling bit to determine which one of said alternate periods is a current sampling period, and switching said no-sampling bit to an opposite state when said machine-testing step indicates expiration of the current sampling period, whereby during each tracing sampling cycle said program tracing method is in a quiescent state as long as said no-sampling bit indicates said off-count sampling period is current and is in an active tracing state as long as said no-sampling bit indicates said on-count sampling period is current, and whereby cyclic sampling periods of tracing are independent of any predetermined sequence of instructions in said program to be traced.

7. Within a program tracing method as defined in claim 6, in which said machine-changing step comprises machine-computing the time for machine-execution of the current instruction of the program to be traced to determine its machine-measured progression, and decrementing the current sampling period in response to the time indicated by said machine-computing step, whereby said first and second parameters are the periods of time for the on-count and off-count sampling periods, respectively.

8. Within a program tracing method as defined in claim 6, in which said machine-changing step includes machine-decrementing the current sampling count by one for each instruction to be executed in the program to be traced, whereby said first and second parameters are the numbers of instructions in the on-count and off-count sampling periods, respectively.

9. Within a program tracing method for use with a computer system using instructions of variable length having operation codes that also indicate the instruction lengths, comprising the steps of inputting to the computer system a tracing program, a program to be traced, and data to be processed by said program to be traced, setting a programmed instruction counter in said tracing program with a direct or indirect address to a current traceable instruction to be executed in said program to be traced, setting a hardware instruction counter in said computer system with an address of a current tracing instruction to be executed in said tracing program, initiating execution of said tracing program with initial settings of said hardware and programmed instruction counters to the first instruction in said tracing program and in said program to be traced, respectively, accessing the operation code of the current traceable instruction at the address in said programmed instruction counter, selecting a tracing program routine by interpretation of the operation code of the current traceable instruction, signalling if said traceable instruction indicates that its following instruction to be executed in said program to be traced is a sequentially or non-sequentially addressed instruction, recording any sequentially addressed instruction indicated by said signalling step from said program to be traced into one area in said tracing program routine, and recording any non-sequentially addressed instruction indicated by said signalling step into another area in said tracing program routine, executing any sequentially addressed instruction or any non-sequentially addressed instruction provided by said recording step within said tracing program routine without any required machine interrupt, setting into said programmed instruction counter the address of the next instruction to be executed in the program to be traced and generating a trace record based on data related to said sequentially addressed instruction as a result of said executing step.

10. Within a program tracing method as defined in claim 9, including before said accessing step the steps of examining for and servicing any computer interrupt signals caused by the addressed instruction in said program to be traced, said interrupt not being generated for tracing said addressed instruction, and said generating step providing a trace record that includes information provided by each computer interrupt generated in the program to be traced.

11. Within a program tracing method as defined in claim 10, in which said generating step further records into the trace record the location addresses within old and new status control words responding to a handled interrupt for said program to be traced.

12. Initialization for a program tracing method as defined in claim 9, in said inputting step further includes generating an address of a memory location for storing a control of quiescing and active tracing states of the tracing program, outputting the address of said memory location provided by said generating step for subsequent action, and setting a bit in said memory location to control the quiescing and active tracing states of said tracing program.

* * * * *